(12) United States Patent
Hayashi et al.

(10) Patent No.: US 6,440,561 B2
(45) Date of Patent: Aug. 27, 2002

(54) IRON OXIDE HYDROXIDE COMPOSITE PARTICLES, PIGMENT, PAINT AND RESIN COMPOSITION

(75) Inventors: Kazuyuki Hayashi; Mineko Ohsugi; Hiroko Morii, all of Hiroshima (JP)

(73) Assignee: Toda Kogyo Corporation, Hiroshima (JP)

( * ) Notice: Subject to any disclaimer, the term of this patent is extended or adjusted under 35 U.S.C. 154(b) by 103 days.

(21) Appl. No.: 09/731,987

(22) Filed: Dec. 8, 2000

(30) Foreign Application Priority Data

Dec. 10, 1999 (JP) ............................ 11-351915
Sep. 14, 2000 (JP) ............................ 2000-280265
Oct. 31, 2000 (JP) ............................ 2000-333786
Nov. 16, 2000 (JP) ............................ 2000-350232

(51) Int. Cl.$^7$ ................................ B32B 9/04
(52) U.S. Cl. .................. 428/407; 428/403; 428/405; 523/212; 427/219; 106/460
(58) Field of Search ................. 428/405, 407, 428/403; 523/212; 427/219; 106/460

(56) References Cited

U.S. PATENT DOCUMENTS 4,497,723 A * 2/1985 Ohlinger et al. ......... 252/62.56
5,686,012 A * 11/1997 Hayashi et al. .......... 252/62.56
5,882,395 A * 3/1999 Linde et al. .............. 106/460

* cited by examiner

Primary Examiner—Robert Dawson
Assistant Examiner—Christopher M Keehan
(74) Attorney, Agent, or Firm—Nixon & Vanderhye P.C.

(57) ABSTRACT

Iron oxide hydroxide composite particles having an average particle diameter of 0.005 to 1.0 $\mu$m, comprises:

iron oxide hydroxide particles as core particles, a coating formed on surface of said iron oxide hydroxide particles, comprising at least one organosilicon compound selected from the group consisting of:
 (1) organosilane compounds obtainable from alkoxysilane compounds, and
 (2) polysiloxanes or modified polysiloxanes, and an organic pigment coat formed on said coating layer comprising said organosilicon compound, in an amount of from 1 to 30 parts by weight based on 100 parts by weight of said iron oxide hydroxide particles. The iron oxide hydroxide composite particles of the present invention contain no harmful elements and exhibit not only excellent chemical resistances such as acid resistance and alkali resistance, but also excellent heat resistance.

35 Claims, No Drawings

IRON OXIDE HYDROXIDE COMPOSITE PARTICLES, PIGMENT, PAINT AND RESIN COMPOSITION

BACKGROUND OF THE INVENTION

The present invention relates to iron oxide hydroxide composite particles, a pigment composed of the same, a paint containing the pigment, a resin composition containing the pigment and a process for producing the iron oxide hydroxide composite particles. More particularly, the present invention relates to iron oxide hydroxide composite particles containing no harmful elements and exhibiting not only excellent chemical resistances such as acid resistance and alkali resistance, but also excellent heat resistance, a pigment such as a green-based pigment or a orange-based pigment, composed of the iron oxide hydroxide composite particles, a paint containing the pigment, a resin composition containing the pigment and a process for producing the iron oxide hydroxide composite particles.

At present, as green-based pigments, there have been widely used inorganic pigments such as chrome green, chromium oxide and zinc green, and organic pigments such as phthalocyanine green. Also, as orange-based pigments, there have been used chrome vermilion, chrome orange, permanent orange, benzidine orange or the like. These pigments have been extensively applied to colorants of resins, paints, printing inks or the like.

However, it is known that the inorganic pigments such as chrome green, chromium oxide and zinc green tend to be deteriorated in chemical resistances such as acid resistance and alkali resistance though they are excellent in light resistance, and are expensive.

In addition, the inorganic pigments such as chrome green, chromium oxide and zinc green contain harmful elements such as lead and chromium. For this reason, it has been strongly required to develop alternate materials for these green-based pigments from viewpoints of hygiene, safety and environmental protection.

On the other hand, the organic green-based pigments such as phthalocyanine green exhibit a high tinting strength and a clear hue. However, it is known that these organic pigments are deteriorated in light resistance, i.e., suffer from bronze-bleeding (so-called bronzing) upon outdoor exposure.

Chrome vermilion and chrome orange exhibit a very clear hue. However, it is known that these orange-based pigments are deteriorated in chemical resistances such acid resistance and alkali resistance as well as light resistance and heat resistance, and are extensive.

In addition, the inorganic orange-based pigments such as chrome vermilion and chrome orange also contain harmful elements such as lead and chromium. Therefore, it has been strongly required to develop alternate materials for these orange-based pigments from viewpoints of hygiene, safety and environmental protection.

It is also known that the organic orange-based pigments such as permanent orange and benzidine orange exhibit a clear hue, but are deteriorated in light resistance.

Further, resin compositions using thermoplastic resins such as polyolefins, for example, polyethylenes, polypropylenes, styrene polymers or the like, polyamides and ABS resins are usually molded at a temperature as high as not less than 200° C. For this reason, pigments added as colorants to these resin compositions are required to exhibit a good heat resistance.

In consequence, green and orange-based pigments added to these resin compositions are strongly required to have not only excellent chemical resistances and tinting strength but also excellent heat resistance.

Hitherto, in order to improve properties of the pigments, it has been attempted to use inorganic and organic pigments in combination. For example, there have been proposed methods of co-precipitating chrome yellow and phthalocyanine blue together or adhering organic pigments onto the surfaces of inorganic pigments (Japanese Patent Application Laid-Open (KOKAI) Nos. 4-132770(1992), 10-88032 (1998) and 11-181329(1999), etc.).

Thus, it has been strongly demanded to provide green and orange-based pigments exhibiting both excellent chemical resistances and excellent heat resistance without containing harmful elements. However, such pigments capable of satisfying these requirements have not been provided until now.

Namely, in the above method of co-precipitating chrome yellow and phthalocyanine blue together, the obtained pigments show a toxicity due to chrome yellow. Further, paints containing such pigments are insufficient in storage stability due to the use of co-precipitated pigments, so that coating films formed therefrom tend to suffer from bleeding.

In the method of precipitating organic pigments in the presence of inorganic pigments as described in Japanese Patent Application Laid-Open (KOKAI) No. 4-132770, the organic pigments are insufficient in adhesion to the inorganic pigments.

In the method of mechanically mixing and milling inorganic and organic pigments together as described in Japanese Patent Application Laid-Open (KOKAI) No. 10-88032 (1998), the organic pigments are also insufficient in adhesion to the inorganic pigments.

Further, in Japanese Patent Application Laid-Open (KOKAI) No. 11-181329(1999), there is described the method of adding organic pigments to a solution prepared by dissolving organopolysiloxane in cyclic silicone to disperse therein the pigments as fine particles, impregnating the fine organic pigments with high oil-absorption inorganic pigments, and then evaporating cyclic silicone from the pigments. In this method, the organic pigments are also insufficient in adhesion to the inorganic pigments.

Meanwhile, in Japanese Patent Application Laid-Open (KOKAI) No. 11-323174(1999), there are described iron-based black composite particles obtained by forming an organosilane coating layer on black iron oxide particles or black iron oxide hydroxide particles, and then forming a carbon black coat on the organosilane coating layer. Since the iron-based black composite particles are black iron oxide hydroxide composite particles having the carbon black coat, the iron-based black composite particles are quite different from composite particles having green or orange-based pigments.

As a result of the present inventors' earnest studies, it has been found that by mixing as core particles iron oxide hydroxide particles with at least one compound selected from the group consisting of:

(1) alkoxysilane compounds, and
(2) polysiloxanes or modified polysiloxanes, by using an apparatus capable of applying a shear force to the core particles, thereby coating the surface of the black iron oxide hydroxide particle with the compounds;

mixing the obtained iron oxide hydroxide particles coated with the compounds and organic blue or red-based pigment in an amount of 1 to 30 parts by weight based on 100 parts by weight of the core particles by using an apparatus capable of applying a shear force to the core particles, thereby forming organic blue or red-based pigment coat on the surface of a coating layer comprising the organosilicon compounds, the thus obtained iron oxide hydroxide composite particles are harmless pigments which are excellent not only in chemical resistances such as acid resistance and alkali resistance, but also in heat resistance. The present invention has been attained on the basis of the above finding.

SUMMARY OF THE INVENTION

An object of the present invention is to provide a harmless pigment such as a harmless green or orange-based pigment exhibiting not only excellent chemical resistances such as acid resistance and alkali resistance, but also high hiding power, high tinting powder and excellent heat resistance.

Another object of the present invention is to provide a fine pigment such as a green or orange-based fine pigment which contains no harmful elements and is improved not only in chemical resistances such as acid resistance and alkali resistance but also in heat resistance, and further is capable of producing a paint and a resin composition exhibiting an excellent transparency.

To accomplish the aim of the present invention, in a first aspect of the present invention, there are provided iron oxide hydroxide composite particles having an average particle diameter (average major axial diameter) of 0.005 to 1.0 $\mu$m, comprising:

iron oxide hydroxide particles as core particles, a coating formed on surface of the iron oxide hydroxide particles, comprising at least one organosilicon compound selected from the group consisting of:
(1) organosilane compounds obtainable from alkoxysilane compounds, and
(2) polysiloxanes or modified polysiloxanes, and
an organic pigment coat formed on the coating layer comprising the organosilicon compound, in an amount of from 1 to 30 parts by weight based on 100 parts by weight of the iron oxide hydroxide particles.

In a second aspect of the present invention, there are provided iron oxide hydroxide composite particles having an average particle diameter of 0.005 to 1.0 $\mu$m, comprising:

iron oxide hydroxide particles as core particles, a coat formed on at least a part of the surface of the iron oxide hydroxide particles, comprising at least one compound selected from the group consisting of hydroxides of aluminum, oxides of aluminum, hydroxides of silicon and oxides of silicon;

a coating formed on surface of the said coat, comprising at least one organosilicon compound selected from the group consisting of:
(1) organosilane compounds obtainable from alkoxysilane compounds, and
(2) polysiloxanes or modified polysiloxanes, and
an organic pigment coat formed on the coating layer comprising the organosilicon compound, in an amount of from 1 to 30 parts by weight based on 100 parts by weight of the iron oxide hydroxide particles.

In a third aspect of the present invention, there are provided iron oxide hydroxide composite particles having an average particle diameter of from 0.005 to less than 0.1 $\mu$m, comprising:

iron oxide hydroxide particles as core particles, a coating formed on surface of the iron oxide hydroxide particles, comprising at least one organosilicon compound selected from the group consisting of:
(1) organosilane compounds obtainable from alkoxysilane compounds, and
(2) polysiloxanes or modified polysiloxanes, and
an organic blue-based pigment coat formed on the coating layer comprising the organosilicon compound, in an amount of from 5 to 30 parts by weight based on 100 parts by weight of the iron oxide hydroxide particles.

In a fourth aspect of the present invention, there are provided iron oxide hydroxide composite particles having an average particle diameter of from 0.005 to less than 0.1 $\mu$m, comprising:

iron oxide hydroxide particles as core particles, a coat formed on at least a part of the surface of the iron oxide hydroxide particles, comprising at least one compound selected from the group consisting of hydroxides of aluminum, oxides of aluminum, hydroxides of silicon and oxides of silicon;

a coating formed on surface of the said coat, comprising at least one organosilicon compound selected from the group consisting of:
(1) organosilane compounds obtainable from alkoxysilane compounds, and
(2) polysiloxanes or modified polysiloxanes, and
an organic blue-based pigment coat formed on the coating layer comprising the organosilicon compound, in an amount of from 5 to 30 parts by weight based on 100 parts by weight of the iron oxide hydroxide particles.

In a fifth aspect of the present invention, there are provided iron oxide hydroxide composite particles having an average particle diameter of from 0.005 to less than 0.1 $\mu$m, comprising:

iron oxide hydroxide particles as core particles, a coating formed on surface of the iron oxide hydroxide particles, comprising at least one organosilicon compound selected from the group consisting of:
(1) organosilane compounds obtainable from alkoxysilane compounds, and
(2) polysiloxanes or modified polysiloxanes, and
an organic red-based pigment coat formed on the coating layer comprising the organosilicon compound, in an amount of from 1 to 30 parts by weight based on 100 parts by weight of the iron oxide hydroxide particles.

In a sixth aspect of the present invention, there are provided iron oxide hydroxide composite particles having an average particle diameter of from 0.005 to less than 0.1 $\mu$m, comprising:

iron oxide hydroxide particles as core particles, a coat formed on at least a part of the surface of the iron oxide hydroxide particles, comprising at least one compound selected from the group consisting of hydroxides of aluminum, oxides of aluminum, hydroxides of silicon and oxides of silicon;

a coating formed on surface of the said coat, comprising at least one organosilicon compound selected from the group consisting of:
(1) organosilane compounds obtainable from alkoxysilane compounds, and
(2) polysiloxanes or modified polysiloxanes, and an organic red-based pigment coat formed on the coating layer comprising the organosilicon compound, in an amount of from 1 to 30 parts by weight based on 100 parts by weight of the iron oxide hydroxide particles.

In a seventh aspect of the present invention, there are provided iron oxide hydroxide composite particles having an average particle diameter of from 0.1 to 1.0 µm, comprising:

iron oxide hydroxide particles as core particles, a coating formed on surface of the iron oxide hydroxide particles, comprising at least one organosilicon compound selected from the group consisting of:
(1) organosilane compounds obtainable from alkoxysilane compounds, and
(2) polysiloxanes or modified polysiloxanes, and an organic blue-based pigment coat formed on the coating layer comprising the organosilicon compound, in an amount of from 5 to 30 parts by weight based on 100 parts by weight of the iron oxide hydroxide particles.

In an eighth aspect of the present invention, there are provided iron oxide hydroxide composite particles having an average particle diameter of from 0.1 to 1.0 µm, comprising:

iron oxide hydroxide particles as core particles, a coat formed on at least a part of the surface of the iron oxide hydroxide particles, comprising at least one compound selected from the group consisting of hydroxides of aluminum, oxides of aluminum, hydroxides of silicon and oxides of silicon;

a coating formed on surface of the said coat, comprising at least one organosilicon compound selected from the group consisting of:
(1) organosilane compounds obtainable from alkoxysilane compounds, and
(2) polysiloxanes or modified polysiloxanes, and an organic blue-based pigment coat formed on the coating layer comprising the organosilicon compound, in an amount of from 5 to 30 parts by weight based on 100 parts by weight of the iron oxide hydroxide particles.

In a ninth aspect of the present invention, there are provided iron oxide hydroxide composite particles having an average particle diameter of from 0.1 to 1.0 µm, comprising:

iron oxide hydroxide particles as core particles, a coating formed on surface of the iron oxide hydroxide particles, comprising at least one organosilicon compound selected from the group consisting of:
(1) organosilane compounds obtainable from alkoxysilane compounds, and
(2) polysiloxanes or modified polysiloxanes, and an organic red-based pigment coat formed on the coating layer comprising the organosilicon compound, in an amount of from 1 to 30 parts by weight based on 100 parts by weight of the iron oxide hydroxide particles.

In a tenth aspect of the present invention, there are provided iron oxide hydroxide composite particles having an average particle diameter of from 0.1 to 1.0 µm, comprising:

iron oxide hydroxide particles as core particles, a coat formed on at least a part of the surface of the iron oxide hydroxide particles, comprising at least one compound selected from the group consisting of hydroxides of aluminum, oxides of aluminum, hydroxides of silicon and oxides of silicon;

a coating formed on surface of the said coat, comprising at least one organosilicon compound selected from the group consisting of:
(1) organosilane compounds obtainable from alkoxysilane compounds, and
(2) polysiloxanes or modified polysiloxanes, and an organic red-based pigment coat formed on the coating layer comprising the organosilicon compound, in an amount of from 1 to 30 parts by weight based on 100 parts by weight of the iron oxide hydroxide particles.

In an eleventh aspect of the present invention, there is provided a pigment comprising iron oxide hydroxide composite particles having an average particle diameter of 0.005 to 1.0 µm, comprising:

iron oxide hydroxide particles as core particles, a coating formed on surface of the iron oxide hydroxide particles, comprising at least one organosilicon compound selected from the group consisting of:
(1) organosilane compounds obtainable from alkoxysilane compounds, and
(2) polysiloxanes or modified polysiloxanes, and an organic pigment coat formed on the coating layer comprising the organosilicon compound, in an amount of from 1 to 30 parts by weight based on 100 parts by weight of the iron oxide hydroxide particles.

In a twelfth aspect of the present invention, there is provided a pigment comprising iron oxide hydroxide composite particles having an average particle diameter of 0.005 to 1.0 µm, comprising:

iron oxide hydroxide particles as core particles, a coat formed on at least a part of the surface of the iron oxide hydroxide particles, comprising at least one compound selected from the group consisting of hydroxides of aluminum, oxides of aluminum, hydroxides of silicon and oxides of silicon;

a coating formed on surface of the said coat, comprising at least one organosilicon compound selected from the group consisting of:
(1) organosilane compounds obtainable from alkoxysilane compounds, and
(2) polysiloxanes or modified polysiloxanes, and an organic pigment coat formed on the coating layer comprising the organosilicon compound, in an amount of from 1 to 30 parts by weight based on 100 parts by weight of the iron oxide hydroxide particles.

In a thirteenth aspect of the present invention, there is provided a green-based pigment comprising iron oxide hydroxide composite particles having an average particle diameter of 0.005 to 1.0 µm, comprising:

iron oxide hydroxide particles as core particles, a coating formed on surface of the iron oxide hydroxide particles, comprising at least one organosilicon compound selected from the group consisting of:
(1) organosilane compounds obtainable from alkoxysilane compounds, and
(2) polysiloxanes or modified polysiloxanes, and an organic blue-based pigment coat formed on the coating layer comprising the organosilicon compound, in an amount of from 5 to 30 parts by weight based on 100 parts by weight of the iron oxide hydroxide particles.

In fourteenth aspect of the present invention, there is provided an orange-based pigment comprising iron oxide hydroxide composite particles having an average particle diameter of 0.005 to 1.0 µm, comprising:

iron oxide hydroxide particles as core particles, a coating formed on surface of the iron oxide hydroxide particles, comprising at least one organosilicon compound selected from the group consisting of:
(1) organosilane compounds obtainable from alkoxysilane compounds, and (2) polysiloxanes or modified polysiloxanes, and an organic red-based pigment coat formed on the coating layer comprising the organosilicon compound, in an amount of from 1 to 30 parts by weight based on 100 parts by weight of the iron oxide hydroxide particles.

In a fifteenth aspect of the present invention, there is provided a paint comprising:

a paint base material, and a pigment comprising iron oxide hydroxide composite particles having an average particle diameter of 0.005 to 1.0 μm, comprising:

iron oxide hydroxide particles as core particles, a coating formed on surface of the iron oxide hydroxide particles, comprising at least one organosilicon compound selected from the group consisting of:

(1) organosilane compounds obtainable from alkoxysilane compounds, and (2) polysiloxanes or modified polysiloxanes, and an organic pigment coat formed on the coating layer comprising the organosilicon compound, in an amount of from 1 to 30 parts by weight based on 100 parts by weight of the iron oxide hydroxide particles.

In a sixteenth aspect of the present invention, there is provided a rubber or resin composition comprising:

a base material for rubber or resin composition, and a pigment comprising iron oxide hydroxide composite particles having an average particle diameter of 0.005 to 1.0 μm, comprising:

iron oxide hydroxide particles as core particles, a coating formed on surface of the iron oxide hydroxide particles, comprising at least one organosilicon compound selected from the group consisting of:

(1) organosilane compounds obtainable from alkoxysilane compounds, and (2) polysiloxanes or modified polysiloxanes, and an organic pigment coat formed on the coating layer comprising the organosilicon compound, in an amount of from 1 to 30 parts by weight based on 100 parts by weight of the iron oxide hydroxide particles.

DETAILED DESCRIPTION OF THE INVENTION

First, the pigment such as green or orange-based pigment according to the present invention will be explained below.

The pigment of the present invention is composed of iron oxide hydroxide composite particles which comprise iron oxide hydroxide particles as core particles, a coating layer of organosilicon compounds formed on the surface of the core particle, and an organic blue-based pigment or an organic red-based pigment adhered on the coating layer, and have an average major axial diameter of from 0.005 to 1.0 μm.

The above iron oxide hydroxide composite particles of the present invention are generally classified into:

(1) iron oxide hydroxide composite particles comprising iron oxide hydroxide particles as core particles, a coating layer of organosilicon compounds formed on the surface of the core particle, and an organic blue-based pigment or an organic red-based pigment adhered on the coating layer, and having an average major axial diameter of 0.1 to 1.0 μm; and (2) fine iron oxide hydroxide composite particles comprising fine iron oxide hydroxide particles as core particles, a coating layer of organosilicon compounds formed on the surface of the core particle, and an organic blue-based pigment or an organic red-based pigment adhered on the coating layer, and having an average major axial diameter of from 0.005 to less than 0.1 μm.

The iron oxide hydroxide particles used as core particles in the present invention are of an acicular shape or a rectangular shape. The "acicular" shape used herein may include a spindle shape and a rice-ball shape in addition to literally acicular or needle-like shape.

The iron oxide hydroxide particles used in the present invention include goethite (α-FeOOH) particles and lepidocrocite (γ-FeOOH) particles. In the consideration of heat resistance of the obtained pigments, iron oxide hydroxide particles obtained by subjecting iron oxide hydroxide particles to heat resistance-imparting treatments is preferred. More specifically, the preferred iron oxide hydroxide particles used as core particles in the present invention may include iron oxide hydroxide particles whose surfaces are coated with at least one compound selected from the group consisting of hydroxides of aluminum and oxides of aluminum; iron oxide hydroxide particles containing aluminum inside thereof; iron oxide hydroxide particles having a coating layer composed of an iron and aluminum oxide hydroxide composite on the surface thereof; and iron oxide hydroxide particles subjected to any two or more of the above heat resistance-imparting treatments.

In the case of the iron oxide hydroxide particles whose surfaces are coated with at least one compound selected from the group consisting of hydroxides of aluminum and oxides of aluminum, the aluminum content thereof is 0.1 to 20.0% by weight (calculated as Al) based on the weight of the iron oxide hydroxide particles coated. In the case of the iron oxide hydroxide particles containing aluminum inside thereof, the aluminum content thereof is 0.05 to 50% by weight (calculated as Al) based on the weight of the iron oxide hydroxide particles containing aluminum inside thereof. In the case of the iron oxide hydroxide particles having a coasting layer composed of an iron and aluminum oxide hydroxide composite on the surfaces thereof, the aluminum content thereof is 0.1 to 10% by weight (calculated as Al) based on the weight of the iron oxide hydroxide particles, and the iron content thereof is 0.1 to 30% by weight (calculated as Fe) based on the weight of the iron oxide hydroxide particles.

The iron oxide hydroxide particles used in the present invention have an average major axial diameter of 0.005 to 1.0 μm; an average minor axial diameter of 0.0025 to 0.5 μm; an aspect ratio of 2:1 to 20:1; a BET specific surface area value of 5 to 300 $m^2/g$; and a geometrical standard deviation of major axial diameters of 1.01 to 2.0. As to the hue of the iron oxide hydroxide particles, the L* value thereof is 40 to 80; the a* value thereof is −57.7 to +57.7 (a* value 0); and the b* value thereof is from more than 0 to +100; and the h value thereof is from more than 60° to less than 120°.

More specifically, the following two kinds of iron oxide hydroxide particles as classified based on average major axial diameter thereof, are individually explained.

(1) In the case of iron oxide hydroxide particles having an average major axial diameter of 0.1 to 1.0 μm:

The average major axial diameter of the iron oxide hydroxide particles (1) is usually 0.1 to 1.0 μm, preferably 0.15 to 0.9 μm.

When the average major axial diameter is more than 1.0 μm, the obtained pigments become coarse particles, resulting in deteriorated tinting strength.

The average minor axial diameter of the iron oxide hydroxide particles (1) is usually 0.05 to 0.5 μm, preferably 0.075 to 0.45 μm.

The aspect ratio (ratio of average major axial diameter to average minor axial diameter; hereinafter referred to merely as "aspect ratio") is usually not more than 20:1, preferably 2:1 to 15:1.

When the aspect ratio is more than 20:1, the particles may tend to be entangled or interlaced with each other, so that it may be difficult to uniformly form a coating layer of organosilicon compounds on the surface of each iron oxide hydroxide particle and uniformly adhere the organic pigment thereonto.

The geometrical standard deviation value of major axial diameters is usually not more than 2.0, preferably not more than 1.8, more preferably not more than 1.6.

When the geometrical standard deviation value is more than 2.0, a large amount of coarse particles may be present, so that the particles may be inhibited from being uniformly dispersed. As a result, it may be difficult to uniformly form a coating layer of organosilicon compounds on the surface of each iron oxide hydroxide particle and uniformly adhere the organic pigment thereonto. The lower limit of the geometrical standard deviation value is 1.01. It is difficult to industrially produce iron oxide hydroxide particles having a geometrical standard deviation value of less than 1.01.

The BET specific surface area value is usually 5 to 150 $m^2/g$, preferably 10 to 120 $m^2/g$, more preferably 15 to 100 $m^2/g$.

When the BET specific surface area value is less than 5 $m^2/g$, the iron oxide hydroxide particles may become coarse or tend to be sintered together. As a result, the obtained particles may become coarse, resulting in deteriorated tinting strength.

As to the hue of the iron oxide hydroxide particles (1), the $L^*$ value thereof is 40 to 80; the $a^*$ value thereof is −57.7 to +57.7 ($a^*$ value 0); the $b^*$ value thereof is from more than 0 to +100; and the h value thereof is from more than 60° to less than 120°. When any of the $L^*$, $a^*$, $b^*$ and h values is out of the above specified range, the aimed pigments such as green or orange-based pigments according to the present invention may not be obtained.

(2) In the case of iron oxide hydroxide fine particles having an average major axial diameter of from 0.005 μm to less than 0.1 μm:

The average major axial diameter thereof is usually from 0.005 μm to less than 0.1 μm. When the average major axial diameter is less than 0.005 μm, the particles may tend to be agglomerated together due to increase in intermolecular force therebetween. As a result, it may be difficult to uniformly form a coating layer of organosilicon compounds on the surface of each iron oxide hydroxide fine particle and uniformly adhere the organic pigment thereonto.

In the consideration of uniform formation of the coating layer of organosilicon compounds on the surface of each iron oxide hydroxide fine particle, uniform adhesion of the organic pigment thereonto, and the average major axial diameter is preferably 0.008 to 0.096 μm, more preferably 0.01 to 0.092.

The average minor axial diameter thereof is usually from 0.0025 to less than 0.05 μm, preferably 0.004 to 0.048 μm, more preferably 0.005 to 0.046 μm; the aspect ratio thereof is usually not more than 20:1, preferably not more than 15:1, more preferably not more than 10:1 (lower limit of the aspect ratio: 2:1); the BET specific surface area value thereof is usually 50 to 300 $m^2/g$, preferably 70 to 280 $m^2/g$, more preferably 80 to 250 $m^2/g$; and the geometrical standard deviation value of major axial diameters thereof is usually not more than 2.0, preferably not more than 1.8, more preferably not more than 1.6 (lower limit of the geometrical standard deviation value: 1.01).

When the average minor axial diameter is less than 0.0025 μm, the intermolecular force between the particles may become large due to fineness thereof, so that it may become difficult to uniformly form a coating layer of organosilicon compounds on the surface of each iron oxide hydroxide fine particle and uniformly adhere the organic pigment thereonto.

When the BET specific surface area value is more than 300 $m^2/g$, the intermolecular force between the particles may become large due to fineness thereof, so that it may be difficult to uniformly form a coating layer of organosilicon compounds on the surface of each iron oxide hydroxide fine particle and uniformly adhere the organic pigment thereonto.

As to the hue of the iron oxide hydroxide fine particles (2) used in the present invention, the $L^*$ value thereof is 40 to 80; the $a^*$ value thereof is −57.7 to +57.7 ($a^*$ value 0); the $b^*$ value thereof is from more than to +100; and the h value thereof is from more than 60° to less than 120°. When any of the $L^*$, $a^*$ and $b^*$ values is out of the above specified range, the aimed fine pigments such as green or orange-based fine pigments according to the present invention may not be obtained.

The iron oxide hydroxide fine particles (2) used in the present invention have a hiding power of preferably less than 600 $cm^2/g$, more preferably not more than 500 $cm^2/g$. When the hiding power is not less than 600 $cm^2/g$, the fine pigments obtained using the iron oxide hydroxide fine particles as core particles may show a too high hiding power.

As to the chemical resistances of the iron oxide hydroxide fine particles (2) used in the present invention, the acid resistance ($\Delta E^*$) thereof is preferably not more than 3.0, more preferably not more than 2.5; and the alkali resistance ($\Delta E^*$) thereof is preferably not more than 3.0, more preferably not more than 2.5, when measured by the evaluation methods described hereinafter. When any of the acid and alkali resistances ($\Delta E^*$) is more than 3.0, it may be difficult to obtain the aimed fine pigments such as green or orange-based fine pigments having excellent chemical resistances according to the present invention.

As to the heat resistance of the iron oxide hydroxide particles used in the present invention, the heat resistance temperature thereof is preferably not less than 180° C., more preferably not less than 185° C. In the consideration of the heat resistance of the obtained pigments such as green or orange-based pigments, the use of iron oxide hydroxide particles subjected to heat resistance-imparting treatments is preferred. In the case of the iron oxide hydroxide particles whose surfaces are coated with at least one compound selected from the group consisting of hydroxides of aluminum and oxides of aluminum, the heat resistance temperature thereof is about 240° C. In the case of the iron oxide hydroxide particles containing aluminum inside thereof, the heat resistance temperature thereof is about 245° C. Also, in the case of the iron oxide hydroxide particles having a coating layer composed of an aluminum and iron oxide hydroxide composite on the surfaces thereof, the heat resistance temperature thereof is about 250° C.

The coating formed on the surface of the core particle comprises at least one organosilicon compound selected from the group consisting of (1) organosilane compounds obtainable from alkoxysilane compounds; and (2) polysiloxanes and modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes").

The organosilane compounds (1) may be produced by drying or heat-treating alkoxysilane compounds represented by the formula (I):

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

The drying or heat-treatment of the alkoxysilane compounds may be conducted, for example, at a temperature of usually 40 to 200° C., preferably 60 to 150° C. for usually 10 minutes to 12 hours, preferably 30 minutes to 3 hours.

Specific examples of the alkoxysilane compounds may include methyltriethoxysilane, dimethyldiethoxysilane, phenyltriethyoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of organic pigments, methyltriethoxysilane, phenyltriethyoxysilane, methyltrimethoxysilane, dimethyldimethoxysilane and isobutyltrimethoxysilane are preferred, and methyltriethoxysilane and methyltrimethoxysilane are more preferred.

As the polysiloxanes (2), there may be used those compounds represented by the formula (II):

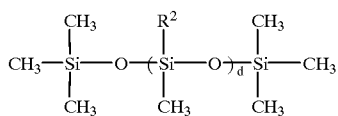

wherein $R^2$ is H— or $CH_3$—, and d is an integer of 15 to 450.

Among these polysiloxanes, in view of the desorption percentage and the adhering effect of the organic pigments, polysiloxanes having methyl hydrogen siloxane units are preferred.

As the modified polysiloxanes (2-A), there may be used:
(a) polysiloxanes modified with polyethers represented by the formula (III):

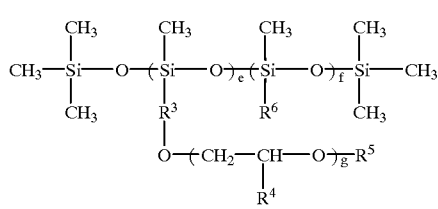

wherein $R^3$ is —($CH_2$—)$_h$—; $R^4$ is —($CH_2$—)$_i$—$CH_3$; $R^5$ is —OH, —COOH, —CH=$CH_2$, —C($CH_3$)=$CH_2$ or —($CH_2$—)$_j$—$CH_3$; $R^6$ is —($CH_2$—)$_k$—$CH_3$; g and h are an integer of 1 to 15; i, j and k are an integer of 0 to 15; e is an integer of 1 to 50; and f is an integer of 1 to 300;

(b) polysiloxanes modified with polyesters represented by the formula (IV):

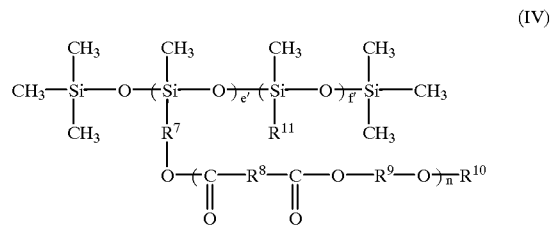

wherein $R^7$, $R^8$ and $R^9$ are —($CH_2$—)$_q$— and may be the same or different; $R^{10}$ is —OH, —COOH, —CH=$CH_2$, —C($CH_3$)=$CH_2$ or —($CH_2$—)$_r$—$CH_3$; $R^{11}$ is —($CH_2$—)$_s$—$CH_3$; n and q are an integer of 1 to 15; r and s are an integer of 0 to 15; e' is an integer of 1 to 50; and f' is an integer of 1 to 300;

(c) polysiloxanes modified with epoxy compounds represented by the formula (V):

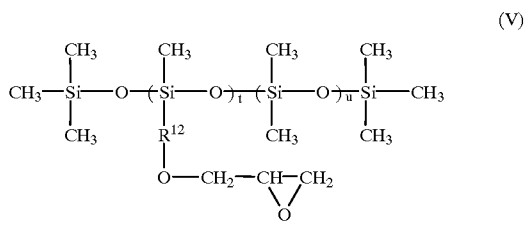

wherein $R^{12}$ is —($CH_2$—)$_v$—; v is an integer of 1 to 15; t is an integer of 1 to 50; and u is an integer of 1 to 300; or a mixture thereof.

Among these modified polysiloxanes (2-A), in view of the desorption percentage and the adhering effect of the organic pigments, the polysiloxanes modified with the polyethers represented by the formula (III), are preferred.

As the terminal-modified polysiloxanes (2-B), there may be used those represented by the formula (VI):

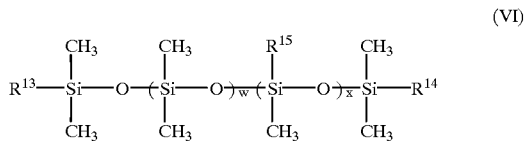

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —($CH_2$—)$_y$—; y is an integer of 1 to 15; w is an integer of 1 to 200; and x is an integer of 0 to 100.

Among these terminal-modified polysiloxanes, in view of the desorption percentage and the adhering effect of the organic pigments, the polysiloxanes whose terminals are modified with carboxylic acid groups are preferred.

The coating amount of the organosilicon compounds is usually 0.02 to 5.0% by weight, preferably 0.03 to 4.0% by weight, more preferably 0.05 to 3.0% by weight (calculated as Si) based on the weight of the iron oxide hydroxide particles coated with the organosilicon compounds.

When the coating amount of the organosilicon compounds is less than 0.02% by weight, it may be difficult to adhere the organic pigments in a predetermined.

When the coating amount of the organosilicon compounds is more than 5.0% by weight, the organic pigments can be adhered in a predetermined. Therefore, it is unnecessary and meaningless to coat the core particles with such a large amount of the organosilicon compounds.

As to the organic pigments used in the present invention, organic blue-based pigments and organic red-based pigments may be exemplified. The amount of the organic pigment such as organic blue-based pigments and organic red-based pigments adhered on the coating layer composed of organosilicon compounds is usually 1 to 30 parts based on 100 parts by weight of the iron oxide hydroxide particles.

As the organic blue-based pigments used in the present invention, there may be used phthalocyanine-based pigments such as metal-free phthalocyanine blue, phthalocyanine blue (copper phthalocyanine) and fast sky blue (sulfonated copper phthalocyanine), and alkali blue pigments, or the like. In the consideration of the hue of the obtained green-based fine pigments, among these pigments, the use of phthalocyanine blue is preferred.

In particular, in the consideration of light resistance, the use of low-chlorinated copper phthalocyanine, NC-type (non-crystallization-type) copper phthalocyanine or NC-type low-chlorinated copper phthalocyanine is preferred.

The amount of the organic blue-based pigment adhered is preferably 5 to 30 parts by weight based on 100 parts by weight of the iron oxide hydroxide particles.

When the amount of the organic blue-based pigment adhered is out of the above-mentioned range, it may be difficult to obtain the aimed green-based pigment of the present invention. The amount of the organic blue-based pigment adhered is more preferably 7.5 to 25 parts by weight based on 100 parts by weight of the iron oxide hydroxide particles.

As the organic red-based pigments used in the present invention, there may be used quinacridone-based pigments such as quinacridone red, azo-based pigments such as permanent red, condensed azo-based pigments such as condensed azo red, and perylene-based pigments such as perylene red. In the consideration of heat resistance and light resistance of the obtained orange-based pigments, the use of quinacridone-based pigments is preferred.

The amount of the organic red-based pigment adhered is usually 1 to 30 parts by weight based on 100 parts by weight of the iron oxide hydroxide particles. When the amount of the organic red-based pigment adhered is less than 1 part by weight or more than 30 parts by weight, it may be difficult to obtain the aimed orange-based pigment of the present invention. The amount of the organic red-based pigment adhered is preferably 3 to 25 parts by weight based on 100 parts by weight of the iron oxide hydroxide particles.

Phe shape and size of the green or orange-based pigments of the present invention considerably varies depending upon those of the iron oxide hydroxide particles as core particles, and usually have an analogous configuration to that of the iron oxide hydroxide particles.

For example, the green or orange-based pigment according to the present invention has an average major axial diameter of 0.005 to 1.0 $\mu$m; an average minor axial diameter of 0.0025 to 0.5 $\mu$m; an aspect ratio of 2.0:1 to 20:1; a BET specific surface area value of 6 to 300 m$^2$/g; a geometrical standard deviation value of major axial diameters of 1.01 to 2.0; and a desorption percentage of the organic pigment of not more than 15%. As to the heat resistance of the green or orange-based pigment, the heat resistance temperature thereof is higher by +5 to +40° than that of the iron oxide hydroxide particles. As to the chemical resistances of the green or orange-based pigment, the acid resistance ($\Delta E^*$ value) thereof is not more than 1.5, and the alkali resistance thereof is not more than 1.5, when evaluated by the method specified hereinafter.

Next, the properties of the green or orange-based pigments used on the present invention are more concretely explained as follows.

(1) In the case where iron oxide hydroxide particles having an average major axial diameter of 0.1 to 1.0 $\mu$m are used as core particles:

The green or orange-based pigment according to the present invention has an average major axial diameter of usually 0.1 to 1.0 $\mu$m, preferably 0.15 to 0.9 $\mu$m.

When the average major axial diameter of the green or orange-based pigment is more than 1.0 $\mu$m, the pigment particles may be larger, resulting in deteriorated tinting strength.

The green or orange-based pigment according to the present invention is of an acicular or rectangular shape.

The green or orange-based pigment according to the present invention has an aspect ratio of usually not more than 20:1, preferably 2:1 to 15:1, more preferably 2:1 to 10:1. When the aspect ratio of the green or orange-based pigment is more than 20:1, the pigment particles may tend to be entangled or interlaced with each other, resulting in poor dispersibility in vehicles or resin compositions as well as increased viscosity of the coating solution.

The green or orange-based pigment according to the present invention suitably has a geometrical standard deviation value of particle sizes of not more than 2.0. When the geometrical standard deviation value of particle sizes of the green or orange-based pigment is more than 2.0, a considerable amount of coarse particles are present, so that it may be difficult to uniformly disperse the pigment in vehicles or resin compositions. In the consideration of uniform dispersion in vehicles or resin compositions, the geometrical standard deviation value of particle sizes of the green or orange-based pigment is preferably not more than 1.8, more preferably not more than 1.6. In the consideration of industrial productivity, the lower limit of the geometrical standard deviation value of particle sizes of the green or orange-based pigment is 1.01, since it is difficult to industrially produce those pigments having a geometrical standard deviation value of less than 1.01.

The green or orange-based pigment according to the present invention has a BET specific surface area value of usually 6 to 160 M$^2$/g, preferably 11 to 130 m$^2$/g, more preferably 16 to 110 m$^2$/g. When the BET specific surface area value of the green or orange-based pigment is less than 6 m$^2$/g, the obtained green or orange-based pigment particles may be coarser, resulting in deteriorated tinting strength.

The green or orange-based pigment according to the present invention has a desorption percentage of the organic pigment of preferably not more than 15%, more preferably not more than 12%. When the desorption percentage of the organic pigment is more than 15%, the pigment particles may tend to be inhibited from being uniformly dispersed in vehicles or resin compositions due to desorbed organic pigment particles. Further, a portion of the surface of the iron oxide hydroxide core particle from which the organic pigment is desorbed, is exposed to outside, so that the obtained iron oxide hydroxide composite particles fail to exhibit a uniform hue.

Especially, as to the hue of the green-based pigment according to the present invention, the L* value thereof is 25 to 80; the a* value thereof is from −100 to less than 0; the b* value thereof is −100 to +100; and the h value thereof is 120° to 240°.

In addition, as to the hue of the orange-based pigment according to the present invention, the L* value thereof is 25 to 80; the a* value thereof is from more than 0 to +100; the b* value thereof is from more than 0 to +100; and the h value thereof is 30° to 60°.

As to the heat resistance of the green or orange-based pigment according to the present invention, the heat resistance temperature thereof is higher by +5 to +40° than that of the iron oxide hydroxide particles as core particles.

The green or orange-based pigment according to the present invention has a tinting strength of preferably not less than 115%, more preferably not less than 120%, when measured by the evaluation method specified hereinafter.

The green or orange-based pigment according to the present invention has a hiding power of preferably not less than 1,750 cm$^2$/g, more preferably not less than 1,800 cm$^2$/g, when measured by the evaluation method specified hereinafter.

As to the chemical resistances of the green or orange-based pigment according to the present invention, the acid resistance ($\Delta E^*$ value) thereof is preferably not more than 1.5, more preferably not more than 1.2; and the alkali resistance ($\Delta E^*$ value) thereof is preferably not more than 1.5, more preferably not more than 1.2, when measured by the evaluation method specified hereinafter.

(2) In the case where iron oxide hydroxide particles having an average major axial diameter of from 0.005 µm to less than 0.1 µm are used as core particles:

The green or orange-based fine pigment of the present invention has an average major axial diameter of from usually 0.005 µm to less than 0.1 µm, preferably 0.008 to 0.096 µm, more preferably 0.01 to 0.092 µm.

When the average major axial diameter of the green or orange-based fine pigment is less than 0.005 µm, the intermolecular force between the pigment particles may be increased due to fineness thereof, so that the particles may tend to be agglomerated together, resulting in poor dispersibility in vehicles or resin compositions.

The green or orange-based fine pigment of the present invention is also of an acicular or rectangular shape.

The green or orange-based fine pigment of the present invention has an aspect ratio of preferably not more than 20:1, more preferably 2:1 to 15:1, still more preferably 2:1 to 10:1. When the aspect ratio of the green or orange-based pigment is more than 20:1, the pigment particles may tend to be entangled or interlaced with each other, resulting in poor dispersibility in vehicles or resin compositions as well as increased viscosity of the obtained coating solution.

The green or orange-based fine pigment according to the present invention has an average minor axial diameter of usually from 0.0025 µm to less than 0.05 µm, preferably 0.004 to 0.048 µm, more preferably 0.005 to 0.046 µm. When the average minor axial diameter of the green or orange-based fine pigment is less than 0.0025 µm, the intermolecular force between the pigment particles may be increased due to fineness thereof, so that the particles may tend to be agglomerated together, resulting in poor dispersibility in vehicles or resin compositions.

The green or orange-based fine pigment according to the present invention suitably has a geometrical standard deviation value of particle sizes of usually not more than 2.0. When the geometrical standard deviation value of particle sizes of the green or orange-based fine pigment is more than 2.0, a considerable amount of coarse particles may be present, so that it may be difficult to uniformly disperse the fine pigment particles in vehicles or resin compositions. In the consideration of uniform dispersion in vehicles or resin compositions, the geometrical standard deviation value of particle sizes of the green or orange-based fine pigment is preferably not more than 1.8, more preferably not more than 1.6. In the consideration of industrial productivity, the lower limit of the geometrical standard deviation value of particle sizes of the green or orange-based fine pigment is 1.01, since it is difficult to industrially produce those pigments having a geometrical standard deviation value of less than 1.01.

The green or orange-based fine pigment according to the present invention has a BET specific surface area value of usually 50 to 300 m$^2$/g, preferably 70 to 280 m$^2$/g, more preferably 80 to 250 m$^2$/g. When the BET specific surface area value of the green or orange-based fine pigment is less than 50 m$^2$/g, the obtained green or orange-based fine pigment particles may be coarser, resulting in too high hiding power. As a result, coating films or resin compositions obtained using the green or orange-based fine pigment may fail to exhibit a sufficient transparency. On the other hand, when the BET specific surface area value of the green or orange-based fine pigment is more than 300 m$^2$/g, the intermolecular force between the fine pigment particles may be increased due to fineness thereof, so that the particles may tend to be agglomerated together, resulting in poor dispersibility in vehicles or resin compositions.

The organic pigment constituting the green or orange-based fine pigment according to the present invention has a desorption percentage of the organic pigment of usually not more than 15%, preferably not more than 12%. When the desorption percentage of the organic pigment is more than 15%, the fine pigment particles tends to be inhibited from being uniformly dispersed in vehicles or resin compositions due to desorbed organic pigment particles. Further, a portion of the surface of the iron oxide hydroxide fine particles as core particle from which the organic pigment particles are desorbed, is exposed to outside, so that the obtained iron oxide hydroxide composite fine particles fail to exhibit a uniform hue.

Especially, as to the hue of the green-based fine pigment according to the present invention, the L* value thereof is usually 25 to 80; the a* value thereof is usually from −100 to less than 0; the b* value thereof is −100 to +100; and the h value thereof is usually 120 to 240°.

In addition, as to the hue of the orange-based fine pigment according to the present invention, the L* value thereof is usually 25 to 80; the a* value thereof is usually from more than 0 to +100; the b* value thereof is usually from more than 0 to +100; and the h value thereof is usually from 30° to 60°.

As to the heat resistance of the green or orange-based fine pigment according to the present invention, the heat resistance temperature thereof is usually higher by +5 to +40° than that of the iron oxide hydroxide fine particles as core particles, and is preferably not less than 210° C., more preferably not less than 215° C.

The green or orange-based fine pigment according to the present invention has a tinting strength of preferably not less than 115%, more preferably not less than 120%, when measured by the evaluation method specified hereinafter.

The green or orange-based fine pigment according to the present invention has a hiding power of preferably less than 600 cm$^2$/g, more preferably not more than 500 cm$^2$/g. When the hiding power of the green or orange-based fine pigment is not less than 600 cm$^2$/g, coating films or resin compositions obtained using the green or orange-based fine pigment may fail to exhibit a sufficient transparency due to a too high hiding power thereof.

As to the chemical resistances of the green or orange-based fine pigment according to the present invention, the acid resistance (ΔE* value) thereof is preferably not more than 1.5, more preferably not more than 1.3; and the alkali resistance (ΔE* value) thereof is preferably not more than 1.5, more preferably not more than 1.3, when measured by the evaluation method specified hereinafter.

Before forming the coating layer comprising the organosilicon compound onto the iron oxide hydroxide particles, the surfaces of the core particles may be preliminarily coated with at least one compound selected from the group consisting of hydroxides of aluminum, oxides of aluminum, hydroxides of silicon and oxides of silicon (hereinafter referred to merely as "hydroxides and/or oxides of aluminum and/or silicon"). When the coating layer is formed on the surfaces of the core particles, the desorption percentage of the organic pigment from the surfaces of the iron oxide hydroxide particles can be reduced as compared to those having no coating layer, and the heat resistance of the obtained composite particles can be slightly increased.

The total coating amount of the hydroxides and/or oxides of aluminum and/or silicon is 0.01 to 20% by weight (calculated as Al, Si or a sum of Al and Si) based on the weight of the coated iron oxide hydroxide particles.

When the coating amount of the hydroxides and/or oxides of aluminum and/or silicon is less than 0.01% by weight, the effect of reducing the desorption percentage of the organic pigment may not be obtained. Since a sufficient effect of reducing the desorption percentage of the organic pigment can be obtained by adjusting the coating amount of the hydroxides and/or oxides of aluminum and/or silicon to 0.01 to 20% by weight, it is unnecessary and meaningless to coat the core particles with the hydroxides and/or oxides of aluminum and/or silicon in an amount of more than 20% by weight.

The green or orange-based pigment in which the iron oxide hydroxide particles coated with the hydroxides and/or oxides of aluminum and/or silicon are used as core particles, are substantially identical in particle size, geometrical standard deviation value, BET specific surface area value, hue, tinting strength, hiding power and chemical resistances to those used for the core particles having no coating layer composed of the hydroxides and/or oxides of aluminum and/or silicon. Also, by forming such a coating layer composed of the hydroxides and/or oxides of aluminum and/or silicon on the core particles, the desorption percentage of the organic pigment is improved, i.e., can be reduced to preferably not more than 12%, more preferably not more than 10%, and the heat resistance of the obtained composite particles becomes higher by +5 to +30° C. than those obtained by using the core particles having no coating layer composed of the hydroxides and/or oxides of aluminum and/or silicon.

Next, the paint containing the green or orange-based pigment according to the present invention, is described.

The paint containing the green or orange-based pigment according to the present invention has a storage stability (ΔE* value) of usually not more than 1.5, a gloss of 70 to 115% (in a coating film), a heat resistance temperature of usually not less than 220° C. (in a coating film), an acid resistance (ΔG value) as a chemical resistances of usually not more than 12% (in a coating film), an alkali resistance (ΔG value) as a chemical resistances of usually not more than 12% (in a coating film), and a L* value of usually 25 to 85 (in a coating film).

(A) Paint Containing the Green-Based Piment Having an Average Major Axial Diameter of 0.1 to 1.0 μm The paint containing the green-based pigment according to the present invention has a storage stability (ΔE* value) of usually not more than 1.5, preferably not more than 1.2. When a coating film is produced by using the solvent-based paints, the gloss of the coating film is usually 75 to 110%, preferably 80 to 110%; and the heat resistance temperature of the coating film is usually not less than 240° C., preferably not less than 245° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the paint, it is preferred that the L* value thereof is 25 to 85; the a* value thereof is from −100 to less than 0; the b* value thereof is −100 to +100; and the h value thereof is usually 120 to 240°.

The paint containing the green-based pigment obtained by using the core particles coated with the hydroxides and/or oxides of aluminum and/or silicon according to the present invention, has a storage stability (ΔE* value) of usually not more than 1.5, preferably not more than 1.2. When a coating film is produced by using the solvent-based paints, the gloss of the coating film is usually 80 to 115%, preferably 85 to 115%; and the heat resistance temperature of the coating film is usually not less than 245° C., preferably not less than 250° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the paint, it is preferred that the L* value thereof is 25 to 85; the a* value thereof is from −100 to less than 0; the b* value thereof is −100 to +100; and the h value thereof is usually 120 to 240°.

The water-based paint containing the green-based pigment according to the present invention, has a storage stability (ΔE* value) of usually not more than 1.5, preferably not more than 1.2. When a coating film is produced by using the water-based paints, the gloss of the coating film is usually 70 to 110%, preferably 75 to 110%; and the heat resistance temperature of the coating film is usually not less than 235° C., preferably not less than 240° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the water-based paint, it is preferred that the L* value thereof is 25 to 85; the a* value thereof is from −100 to less than 0; the b* value thereof is −100 to +100; and the h value thereof is usually 120 to 240°.

The water-based paint containing the green-based pigment obtained by using as the core particles iron oxide hydroxide particles coated with the hydroxides and/or oxides of aluminum and/or silicon according to the present invention, has a storage stability (ΔE* value) of usually not more than 1.5, preferably not more than 1.2. When a coating film is produced by using the water-based paints, the gloss of the coating film is usually 75 to 115%, preferably 80 to 115%; and the heat resistance temperature of the coating film is usually not less than 240° C., preferably not less than 245° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the water-based paint, it is preferred that the L* value thereof is 25 to 85; the a* value thereof is from −100 to less than 0; the b* value thereof is −100 to +100; and the h value thereof is usually 120 to 240°.

(B) Paint Containing the Orange-Based Pigment Having an Average Major Axial Diameter of 0.1 to 1.0 μm The paint containing the orange-based pigment according to the present invention has a storage stability (ΔE* value) of usually not more than 1.5, preferably not more than 1.2. When a coating film is produced by using the solvent-based paints, the gloss of the coating film is usually 75 to 110%, preferably 80 to 110%; and the heat resistance temperature of the coating film is usually not less than 240° C., preferably not less than 245° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the paint, it is preferred that the L* value thereof is 25 to 85; the a* value thereof is from more than 0 to +100; the b* value thereof is from more than 0 to +100; and the h value thereof is 30 to 60°.

The paint containing the orange-based pigment obtained by using as the core particles iron oxide hydroxide particles coated with the hydroxides and/or oxides of aluminum and/or silicon according to the present invention, has a storage stability (ΔE* value) of usually not more than 1.5, preferably not more than 1.2. When a coating film is produced by using the solvent-based paints, the gloss of the coating film is usually 80 to 115%, preferably 85 to 115%; and the heat resistance temperature of the coating film is usually not less than 245° C., preferably not less than 250° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the paint, it is preferred that the L* value thereof is 25 to 85; the a* value thereof is from more than 0 to +100; the b* value thereof is from more than 0 to +100; and the h value thereof is 30 to 60°.

The water-based paint containing the orange-based pigment according to the present invention, has a storage stability (ΔE* value) of usually not more than 1.5, preferably not more than 1.2. When a coating film is produced by using the water-based paints, the gloss of the coating film is usually 70 to 110%, preferably 75 to 110%; and the heat resistance temperature of the coating film is usually not less than 235° C., preferably not less than 240° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the water-based paint, it is preferred that the L* value thereof is 25 to 85; the a* value thereof is from more than 0 to +100; the b* value thereof is from more than 0 to +100; and the h value thereof is 30 to 60°.

The water-based paint containing the orange-based pigment obtained by using as the core particles iron oxide hydroxide particles coated with the hydroxides and/or oxides of aluminum and/or silicon according to the present invention, has a storage stability (ΔE* value) of usually not more than 1.5, preferably not more than 1.2. When a coating film is produced by using the water-based paints, the gloss of the coating film is usually 75 to 115%, preferably 80 to 115%; and the heat resistance temperature of the coating film is usually not less than 240° C., preferably not less than 245° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the water-based paint, it is preferred that the L* value thereof is 25 to 85; the a* value thereof is from more than 0 to +100; the b* value thereof is from more than 0 to +100; and the h value thereof is 30 to 60°.

(C) Paint Containing the Green-Based Fine Pigment Having an Average Major Axial Diameter of from 0.005 to Less Than 0.1 μm The paint containing the green-based fine pigment according to the present invention has a storage stability (ΔE* value) of usually not more than 1.5, preferably not more than 1.3. When a coating film is produced by using the solvent-based paints, the gloss of the coating film is usually 75 to 110%, preferably 80 to 110%; and the heat resistance temperature of the coating film is usually not less than 220° C., preferably not less than 225° C. As to the chemical resistances of the coating film, the acid resistance (ΔG value) thereof is usually not more than 12%, more preferably not more than 10%; and the alkali resistance (ΔG value) thereof is usually not more than 12%, preferably not more than 10%. As to the hue of the coating film produced from the paint, it is preferred that the L* value thereof is 25 to 85; the a* value thereof is from −100 to less than 0; and the b* value thereof is −100 to +100; and the h value thereof is 120 to 240°. As to the transparency of the coating film, the linear absorption thereof is preferably not more than 0.05 μm$^{-1}$.

The paint containing the green-based fine pigment obtained by using as the core particles iron oxide hydroxide particles coated with the hydroxides and/or oxides of aluminum and/or silicon according to the present invention, has a storage stability (ΔE* value) of usually not more than 1.5, preferably not more than 1.3. When a coating film is produced by using the solvent-based paints, the gloss of the coating film is usually 80 to 115%, preferably 85 to 115%; and the heat resistance temperature of the coating film is usually not less than 230° C., preferably not less than 235° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the paint, it is preferred that the L* value thereof is 25 to 85; the a* value thereof is from −100 to less than 0; the b* value thereof is −100 to +100; and the h value thereof is 120 to 240°. As to the transparency of the coating film, the linear absorption thereof is preferably not more than 0.05 μm$^{-1}$.

The water-based paint containing the green-based fine pigment according to the present invention, has a storage stability (ΔE* value) of usually not more than 1.5, preferably not more than 1.3. When a coating film is produced by using the water-based paints, the gloss of the coating film is usually 70 to 110%, preferably 75 to 110%; and the heat resistance temperature of the coating film is usually not less than 220° C., preferably not less than 225° C. As to the chemical resistances of the coating film, the acid resistance (ΔG value) thereof is usually not more than 12%, preferably not more than 10%; and the alkali resistance (ΔG value) thereof is usually not more than 12%, preferably not more than 10%. As to the hue of the coating film produced from the water-based paint, it is preferred that the L* value thereof is 25 to 85; the a* value thereof is from −100 to less than 0; and the b* value thereof is −100 to +100. As to the transparency of the coating film, the linear absorption thereof is preferably not more than 0.05 μm$^{-1}$.

The water-based paint containing the green-based fine pigment obtained by using as the core particles iron oxide hydroxide particles coated with the hydroxides and/or oxides of aluminum and/or silicon according to the present invention, has a storage stability ($\Delta E^*$ value) of usually not more than 1.5, preferably not more than 1.3. When a coating film is produced by using the water-based paints, the gloss of the coating film is usually 75 to 115%, preferably 80 to 115%; and the heat resistance temperature of the coating film is usually not less than 230° C., preferably not less than 235° C. As to the chemical resistances of the coating film, the acid resistance ($\Delta G$ value) thereof is usually not more than 12%, preferably not more than 10%; and the alkali resistance ($\Delta G$ value) thereof is usually not more than 12%, preferably not more than 10%. As to the hue of the coating film produced from the water-based paint, it is preferred that the $L^*$ value thereof is 25 to 85; the $a^*$ value thereof is from −100 to less than 0; and the $b^*$ value thereof is −100 to +100; and the h value thereof is 120 to 240°. As to the transparency of the coating film, the linear absorption thereof is preferably not more than 0.05 $\mu m^{-1}$.

(D) Paint Containing the Orange-Based Fine Pigment Having an Average Major Axial Diameter of from 0.005 $\mu m$ to Less Than 0.1 $\mu m$ The paint containing the orange-based fine pigment according to the present invention, has a storage stability ($\Delta E^*$ value) of usually not more than 1.5, preferably not more than 1.3. When a coating film is produced by using the solvent-based paints, the gloss of the coating film is usually 75 to 110%, preferably 80 to 110%; and the heat resistance temperature of the coating film is usually not less than 220° C., preferably not less than 225° C. As to the chemical resistances of the coating film, the acid resistance ($\Delta G$ value) thereof is usually not more than 12%, preferably not more than 10%; and the alkali resistance ($\Delta G$ value) thereof is usually not more than 12%, preferably not more than 10%. As to the hue of the coating film produced from the paint, it is preferred that the $L^*$ value thereof is 25 to 85; the $a^*$ value thereof is from more than 0 to +100; the $b^*$ value thereof is from more than 0 to +100; and the h value thereof is 30 to 60°. As to the transparency of the coating film, the linear absorption thereof is preferably not more than 0.05 $\mu m^{-1}$.

The paint containing the orange-based fine pigment obtained by using as the core particles iron oxide hydroxide particles coated with the hydroxides and/or oxides of aluminum and/or silicon according to the present invention, has a storage stability ($\Delta E^*$ value) of usually not more than 1.5, preferably not more than 1.3. When a coating film is produced by using the solvent-based paints, the gloss of the coating film is usually 80 to 115%, preferably 85 to 115%; and the heat resistance temperature of the coating film is usually not less than 230° C., preferably not less than 235° C. As to the chemical resistances of the coating film, the acid resistance ($\Delta G$ value) thereof is usually not more than 12%, preferably not more than 10%; and the alkali resistance ($\Delta G$ value) thereof is usually not more than 12%, preferably not more than 10%. As to the hue of the coating film produced from the paint, it is preferred that the $L^*$ value thereof is 25 to 85; the $a^*$ value thereof is from more than 0 to +100; the $b^*$ value thereof is from more than 0 to +100; and the h value thereof is 30 to 60°. As to the transparency of the coating film, the linear absorption thereof is preferably not more than 0.05 $\mu m^{-1}$.

The water-based paint containing the orange-based fine pigment according to the present invention, has a storage stability ($\Delta E^*$ value) of usually not more than 1.5, preferably not more than 1.3. When a coating film is produced by using the water-based paints, the gloss of the coating film is usually 70 to 110%, preferably 75 to 110%; and the heat resistance temperature of the coating film is usually not less than 220° C., preferably not less than 225° C. As to the chemical resistances of the coating film, the acid resistance ($\Delta G$ value) thereof is usually not more than 12%, preferably not more than 10%; and the alkali resistance ($\Delta G$ value) thereof is usually not more than 12%, preferably not more than 10%. As to the hue of the coating film produced from the water-based paint, it is preferred that the $L^*$ value thereof is 25 to 85; the $a^*$ value thereof is from more than to +100; the $b^*$ value thereof is from more than to +100; and the h value thereof is 30 to 60°. As to the transparency of the coating film, the linear absorption thereof is preferably not more than 0.05 $\mu m^{-1}$.

The water-based paint containing the orange-based fine pigment obtained by using as the core particles iron oxide hydroxide particles coated with the hydroxides and/or oxides of aluminum and/or silicon according to the present invention, has a storage stability ($\Delta E^*$ value) of usually not more than 1.5, preferably not more than 1.3. When a coating film is produced by using the water-based paints, the gloss of the coating film is usually 75 to 115%, preferably 80 to 115%; and the heat resistance temperature of the coating film is usually not less than 230° C., preferably not less than 235° C. As to the chemical resistances of the coating film, the acid resistance ($\Delta G$ value) thereof is usually not more than 12%, preferably not more than 10%; and the alkali resistance ($\Delta G$ value) thereof is usually not more than 12%, preferably not more than 10%. As to the hue of the coating film produced from the water-based paint, it is preferred that the $L^*$ value thereof is 25 to 85; the $a^*$ value thereof is from more than 0 to +100; the $b^*$ value thereof is from more than 0 to +100; and the h value thereof is 30 to 60°. As to the transparency of the coating film, the linear absorption thereof is preferably not more than 0.05 $\mu m^{-1}$.

In the paint of the present invention, the lower limit of the amount of the green or orange-based pigment blended therein usually 0.5 part by weight, preferably 1.0 part by weight, more preferably 2.0 parts by weight based on 100 parts by weight of a paint base material; and the upper limit of the amount of the green or orange-based pigment blended therein is usually 100 parts by weight, preferably 80 parts by weight, more preferably 50 parts by weight based on 100 parts by weight of the paint base material.

The paint based material contains green or orange-based pigments, resins and solvents, and may optionally contain defoamers, extender pigments, dryers, surfactants, hardeners, auxiliaries and the like, if required.

As the resins contained in the paint base material, there may be exemplified those ordinarily used for solvent-based paints such as acrylic resins, alkyd resins, polyester resins, polyurethane resins, epoxy resins, phenol resins, melamine resins, amino resins or the like. Also, as the resins for water-based paints, there may be exemplified ordinarily used ones such as water-soluble alkyd resins, water-soluble melamine resins, water-soluble acrylic resins, water-soluble urethane emulsion resins or the like.

As the solvents for solvent-based paints, there may be exemplified those ordinarily used for solvent-based paints such as toluene, xylene, thinner, butyl acetate, methyl acetate, methyl isobutyl ketone, butyl cellosolve, ethyl cellosolve, butyl alcohol, aliphatic hydrocarbons and mixtures thereof.

Also, as the solvents for water-based paints, there may be exemplified water, butyl cellosolve, butyl alcohol or the like which are ordinarily used for water-based paints, or mixtures thereof.

As the defoamer, there may be used commercially available products such as NOPCO 8034 (tradename), SN DEFOAMER 477 (tradename), SN DEFOAMER 5013 (tradename), SN DEFOAMER 247 (tradename) or SN DEFOAMER 382 (tradename) (all produced by SUN NOPCO LTD.); ANTIFOAM 08 (tradename) or EMULGEN 903 (tradename) (both produced by KAO CO., LTD.); or the like.

Next, the rubber or resin composition colored with the pigment according to the present invention will be described.

(A) Resin Composition Containing the Green-Based Pigment Having an Average Major Axial Diameter of 0.1 to 1.0 μm The resin composition colored with the green-based pigment according to the present invention has a dispersing condition of usually rank 4 or 5, preferably rank 5 when visually observed and evaluated by the method described hereinafter; and a heat resistance temperature of usually not less than 215° C., preferably not less than 220° C. As to the hue of the resin composition, it is preferred that the L* value thereof is 25 to 85; the a* value thereof is from −100 to less than 0; and the b* value thereof is −100 to +100; and the h value thereof is 120 to 240°.

The resin composition colored with the green-based pigment obtained by using as the core particles iron oxide hydroxide particles coated with the hydroxides and/or oxides of aluminum and/or silicon according to the present invention, has a dispersing condition of usually rank 4 or 5, preferably rank 5 when visually observed and evaluated by the method described hereinafter; and a heat resistance temperature of usually not less than 220° C., preferably not less than 225° C. As to the hue of the resin composition, it is preferred that the L* value thereof is 25 to 85; the a* value thereof is from −100 to less than 0; the b* value thereof is −100 to +100; and the h value thereof is 120 to 240°.

(B) Resin Composition Containing the Orange-Based Pigment Having an Average Major Axial Diameter of 0.1 to 1.0 μm The resin composition colored with the orange-based pigment according to the present invention has a dispersing condition of usually rank 4 or 5, preferably rank 5 when visually observed and evaluated by the method described hereinafter; and a heat resistance temperature of usually not less than 215° C., preferably not less than 220° C. As to the hue of the resin composition, it is preferred that the L* value thereof is 25 to 85; the a* value thereof is from more than 0 to +100; the b* value thereof is from more than 0 to +100; and the h value thereof is 30 to 60° C.

The resin composition colored with the orange-based pigment obtained by using as the core particles iron oxide hydroxide particles coated with the hydroxides and/or oxides of aluminum and/or silicon according to the present invention, has a dispersing condition of usually rank 4 or 5, preferably rank 5 when visually observed and evaluated by the method described hereinafter; and a heat resistance temperature of usually not less than 220° C., preferably not less than 225° C. As to the hue of the resin composition, it is preferred that the L* value thereof is 25 to 85; the a* value thereof is from more than 0 to +100; the b* value thereof is from more than 0 to +100; and the h value thereof is 30 to 60° C.

(C) Resin Composition Containing the Green-Based Fine Pigment Having an Average Major Axial Diameter of from 0.005 μm to Less Than 0.1 μm The resin composition colored with the green-based fine pigment according to the present invention has a dispersing condition of usually rank 4 or 5, preferably rank 5 when visually observed and evaluated by the method described hereinafter; and a heat resistance temperature of usually not less than 210° C., preferably not less than 215° C. As to the hue of the resin composition, it is preferred that the L* value thereof is 25 to 85; the a* value thereof is from −100 to less than 0; the b* value thereof is −100 to +100; and the h value thereof is 120 to 240°. As to the transparency of the resin composition, the linear absorption thereof is preferably not more than 0.05 $\mu m^{-1}$.

The resin composition colored with the green-based fine pigment obtained by using as the core particles iron oxide hydroxide particles coated with the hydroxides and/or oxides of aluminum and/or silicon according to the present invention, has a dispersing condition of usually rank 4 or 5, preferably rank 5 when visually observed and evaluated by the method described hereinafter; and a heat resistance temperature of usually not less than 215° C., preferably not less than 220° C. As to the hue of the resin composition, it is preferred that the L* value thereof is 25 to 85; the a* value thereof is from −100 to less than 0; the b* value thereof is −100 to +100; and the h value thereof is 120 to 240°. As to the transparency of the resin composition, the linear absorption thereof is preferably not more than 0.05 $\mu m^{-1}$.

(D) Resin Composition Containing the Orange-Based Fine Pigment Having an Average Major Axial Diameter of from 0.005 to Less Than 0.1 μm The resin composition colored with the orange-based fine pigment according to the present invention has a dispersing condition of usually rank 4 or 5, preferably rank 5 when visually observed and evaluated by the method described hereinafter; and a heat resistance temperature of usually not less than 210° C., preferably not less than 215° C. As to the hue of the resin composition, it is preferred that the L* value thereof is 25 to 85; the a* value thereof is from more than 0 to +100; the b* value thereof is from more than 0 to +100: and the h value thereof is 30 to 60°. As to the transparency of the resin composition, the linear absorption thereof is preferably not more than 0.05 $\mu m^{-1}$.

The resin composition colored with the orange-based fine pigment obtained by using as the core particles iron oxide hydroxide particles coated with the hydroxides and/or oxides of aluminum and/or silicon according to the present invention, has a dispersing condition of usually rank 4 or 5, preferably rank 5 when visually observed and evaluated by the method described hereinafter; and a heat resistance temperature of usually not less than 215° C., preferably not less than 220° C. As to the hue of the resin composition, it is preferred that the L* value thereof is 25 to 85; the a* value thereof is from more than 0 to +100; the b* value thereof is from more than 0 to +100; and the h value thereof is 30 to 60°. As to the transparency of the resin composition, the linear absorption thereof is preferably not more than 0.05 $\mu m^{-1}$.

In the resin composition according to the present invention, the amount of the green or orange-based pigment blended is usually 0.01 to 200 parts by weight based on 100 parts by weight of the rubber or resins composition.

In the case where the green or orange-based pigment having a particle size of 0.1 to 1.0 μm is used:

In the rubber or resin composition of the present invention, the amount of the green or orange-based pigment blended is usually 0.5 to 200 parts by weight based on 100 parts by weight of the rubber or resin composition. In the consideration of good handling property of the resin composition, the amount of the green or orange-based pigment blended is preferably 1.0 to 150 parts by weight, more preferably 2.5 to 100 parts by weight based on 100 parts by weight of the rubber or resin composition.

In the case where the green or orange-based fine pigment having a particle size of from 0.005 μm to less than 0.1 μm is used:

In the rubber or resin composition according to the present invention, the amount of the green or orange-based fine pigment blended is usually 0.01 to 50 parts by weight based on 100 parts by weight of the rubber or resin composition. In the consideration of good handling property of the resin composition, the amount of the green or orange-based fine pigment blended is preferably 0.05 to 45 parts by weight, more preferably 0.1 to 40 parts by weight based on 100 parts by weight of the rubber or resin composition.

The based material of the rubber or resin composition according to the present invention contains green or orange-based fine pigments and known thermoplastic resins, and may optionally contain various additives such as lubricants, plasticizers, antioxidants, ultraviolet light absorbers or the like, if required.

As the rubber or resins of the composition, there may be exemplified natural rubbers, synthetic rubbers, thermoplastic resins (e.g., polyolefins such as polyethylenes, polypropylenes, polybutenes and polyisobutylenes, polyvinyl chlorides, styrene polymers and polyamides) or the like.

The amount of the additives added is not more than 50% by weight based on the total weight of the green or orange-based fine pigments and resins. When the amount of the additives added is more than 50% by weight, the obtained rubber or resin composition is deteriorated in moldability.

The resin composition according to the present invention may be produced by preliminarily intimately mixing a raw resin material and the green or orange-based fine pigment together and applying a strong shear force to the mixture by a kneader or an extruder to deaggregate agglomerates of the green or orange-based fine pigment and uniformly disperse the individual green or orange-based fine pigment particles in the resin. The thus produced resin composition may be formed into an appropriate shape according to the application thereof upon use.

Next, the process for producing the green or orange-based pigment according to the present invention, is described.

The green or orange-based pigment of the present invention can be produced by mixing iron oxide hydroxide particles with alkoxysilane compounds or polysiloxanes to coat the surfaces of the iron oxide hydroxide particles with the alkoxysilane compounds or polysiloxanes; and then mixing the iron oxide hydroxide particles coated with the alkoxysilane compounds or polysiloxanes, with an organic pigment.

The coating of the iron oxide hydroxide particles with the alkoxysilane compounds, the polysiloxanes, the modified polysiloxanes, or the terminal-modified polysiloxanes, may be conducted (i) by mechanically mixing and stirring the iron oxide hydroxide particles together with the alkoxysilane compounds, the polysiloxanes, the modified polysiloxanes, or the terminal-modified polysiloxanes; or (ii) by mechanically mixing and stirring both the components together while spraying the alkoxysilane compounds, the polysiloxanes, the modified polysiloxanes, or the terminal-modified polysiloxanes onto the iron oxide hydroxide particles. In these cases, substantially whole amount of the alkoxysilane compounds, the polysiloxanes, the modified polysiloxanes, or the terminal-modified polysiloxanes added can be applied onto the surfaces of the iron oxide hydroxide particles.

In addition, by conducting the above-mentioned mixing or stirring treatment (i) of the iron oxide hydroxide particles as core particles together with the alkoxysilane compounds, at least a part of the alkoxysilane compounds coated on the iron oxide hydroxide particles as core particles may be changed to the organosilane compounds. In this case, there is also no affection against the formation of the organic pigment coat thereon.

In order to uniformly coat the surfaces of the iron oxide hydroxide particles with the alkoxysilane compounds, the polysiloxanes, the modified polysiloxanes, or the terminal-modified polysiloxanes, it is preferred that the iron oxide hydroxide particles s are preliminarily diaggregated by using a pulverizer.

As apparatus (a) for mixing and stirring treatment (i) of the core particles with the alkoxysilane compounds, the polysiloxanes, the modified polysiloxanes, or the terminal-modified polysiloxanes to form the coating layer thereof, and as apparatus (b) for mixing and stirring treatment (ii) of the organic pigment with the core particles whose surfaces are coated with the alkoxysilane compounds, the polysiloxanes, the modified polysiloxanes, or the terminal-modified polysiloxanes to form the organic pigment coat, there may be preferably used those apparatus capable of applying a shear force to the particles, more preferably those apparatuses capable of conducting the application of shear force, spaturate force and compressed force at the same time.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes, or the terminal-modified polysiloxanes as uniformly as possible, the conditions of the above mixing or stirring treatment may be appropriately controlled such that the linear load is usually 2 to 200 Kg/cm (19.6 to 1960 N/cm), preferably 10 to 150 Kg/cm (98 to 1470 N/cm), more preferably 15 to 100 Kg/cm (147 to 980 N/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, or the terminal-modified polysiloxanes added, is preferably 0.15 to 45 parts by weight based on 100 parts by weight of the iron oxide hydroxide particles. When the amount of the alkoxysilane compounds, the polysiloxanes, the modified polysiloxanes or the terminal-modified polysiloxanes added is less than 0.15 part by weight, it may become difficult to adhere the organic pigment in such an amount enough to obtain the iron oxide hydroxide composite particles according to the present invention. On the other hand, when the amount of the alkoxysilane compounds, the polysiloxanes, the modified polysiloxanes or the terminal-modified polysiloxanes added is more than 45 parts by weight, since a sufficient amount of the organic pigment can be adhered on the surface of the coating layer, it is meaningless to add more than 45 parts by weight.

Next, the organic pigment are added to the iron oxide hydroxide particles coated with the alkoxysilane compounds, the polysiloxanes, the modified polysiloxanes, or the terminal-modified polysiloxanes, and the resultant mixture is mixed and stirred to form the organic pigment coat on the surfaces of the coating layer composed of the alkoxysilane compounds, the polysiloxanes, the modified polysiloxanes or the terminal-modified polysiloxanes. The drying or heat-treatment may be conducted.

It is preferred that the organic pigment are added little by little and slowly, especially about 5 to 60 minutes.

In order to form organic pigment coat onto the coating layer composed of the alkoxysilane compounds, the polysiloxanes, the modified polysiloxanes, or the terminal-modified polysiloxanes as uniformly as possible, the conditions of the above mixing or stirring treatment can be appropriately controlled such that the linear load is usually 2 to 200 Kg/cm (19.6 to 1960 N/cm), preferably 10 to 150 Kg/cm (98 to 1470 N/cm), more preferably 15 to 100 Kg/cm (147 to 980 N/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The preferable amount of the organic blue-based pigment added is 5 to 30 parts by weight based on 100 parts by weight of the iron oxide hydroxide particles. When the amount of the organic blue-based pigment added is more than 30 parts by weight, the aimed green-based pigment of the present invention may not be obtained.

The preferable amount of the organic red-based pigment added is 1 to 30 parts by weight based on 100 parts by weight of the iron oxide hydroxide particles. When the amount of the organic red-based pigment added is out of the above specified range, the aimed orange-based pigment of the present invention may not be obtained.

The heating temperature used in the drying and heating steps is usually 40 to 200° C., preferably 60 to 150° C. The treating time of these steps is usually from 10 minutes to 12 hours, preferably from 30 minutes to 3 hours.

When the obtained green or orange-based pigment is subjected to the above drying and heating steps, the alkoxysilane compounds used as the coating thereof are finally converted into organosilane compounds.

If required, prior to mixing and stirring with the alkoxysilane compounds or polysiloxanes, the iron oxide hydroxide particles may be preliminarily coated with at least one compound selected from the group consisting of hydroxides of aluminum, oxides of aluminum, hydroxides of silicon and oxides of silicon to form an intermediate coating layer thereon.

At least a part of the surface of the iron oxide hydroxide particles may be coated with at least one compound selected from the group consisting of hydroxides of aluminum, oxides of aluminum, hydroxides of silicon and oxides of silicon (hereinafter referred to merely as "hydroxides and/or oxides of aluminum and/or silicon"), if required, in advance of mixing and stirring with the alkoxysilane compounds, the polysiloxanes, the modified polysiloxanes or the terminal-modified polysiloxanes.

The coating of the hydroxides and/or oxides of aluminum and/or silicon may be conducted by adding an aluminum compound, a silicon compound or both the compounds to a water suspension in which the iron oxide hydroxide particles are dispersed, followed by mixing and stirring, and further adjusting the pH value of the suspension, if required, thereby coating the surfaces of the iron oxide hydroxide particles with hydroxides and/or oxides of aluminum and/or silicon. The thus obtained iron oxide hydroxide particles coated with the hydroxides and/or oxides of aluminum and/or silicon are then filtered out, washed with water, dried and pulverized. Further, the iron oxide hydroxide particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the iron oxide hydroxide particles. When the amount of the aluminum compound added is less than 0.01% by weight, it may be difficult to sufficiently coat the surfaces of the iron oxide hydroxide particles with hydroxides and/or oxides of aluminum, thereby failing to improve the effective reduction of the organic pigment desorption percentage. On the other hand, when the amount of the aluminum compound added is more than 20% by weight, the coating effect is saturated and, therefore, it is meaningless to add such an excess amount of the aluminum compound.

As the silicon compounds, there may be exemplified #3 water glass, sodium orthosilicate, sodium metasilicate or the like.

The amount of the silicon compound added is 0.01 to 20% by weight (calculated as $SiO_2$) based on the weight of the iron oxide hydroxide particles. When the amount of the silicon compound added is less than 0.01% by weight, it may be difficult to sufficiently coat the surfaces of the iron oxide hydroxide particles with hydroxides and/or oxides of silicon, thereby failing to improve the effective reduction of the organic pigment desorption percentage. On the other hand, when the amount of the silicon compound added is more than 20% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the iron oxide hydroxide particles.

The point of the present invention lies in the following. That is, the green or orange-based pigment obtained by coating the surfaces of iron oxide hydroxide particles having an average particle size of 0.1 to 1.0 $\mu$m with organosilicon compounds and then adhering an organic blue or red-based pigment onto the surface of coating composed of the organosilicon compounds, is a harmless green or orange-based pigment capable of exhibiting excellent chemical resistances, high hiding power and tinting strength, and improved heat resistance.

Another point of the present invention lies in the following. That is, the green or orange-based fine pigment obtained by coating the surfaces of iron oxide hydroxide particles having an average particle size of from 0.005 to less than 0.1 $\mu$m with organosilicon compounds and then adhering an organic blue or red-based pigment onto the surface of coating composed of the organosilicon compounds, is a harmless green or orange-based fine pigment capable of exhibiting excellent chemical resistances, excellent tinting strength and improved heat resistance.

The reason why the pigment exhibiting a green color can be obtained by the present invention, is considered as follows. That is, similarly to such a principle that a film exhibiting a green color is obtained by overlapping a blue film on a yellow film, when the iron oxide hydroxide particles having a yellow color is coated with the organic blue-based pigment having a low hiding power, the obtained composite particles can exhibit a green color.

Also, the reason why the pigment exhibiting an orange color can be obtained by the present invention, is considered as follows. That is, similarly to such a principle that a film exhibiting an orange color is obtained by overlapping a red film on a yellow film, when the iron oxide hydroxide particles having a yellow color is coated with the organic red-based pigment having a low hiding power, the obtained composite particles can exhibit an orange color.

The reason why the green or orange-based pigment of the present invention is excellent in chemical resistances, is considered as follows. That is, the iron oxide hydroxide particles as core particles themselves are excellent in chemical resistances. Further, by selecting the organic blue or red-based pigment to be adhered onto the particles from those pigments having excellent chemical resistances, the obtained green or orange-based pigment can also exhibit excellent chemical resistances as a whole.

The reason why the green or orange-based pigment of the present invention has excellent tinting strength, is considered as follows. That is, the organic blue or red-based pigment is strongly fixed onto the surfaces of the iron oxide hydroxide particles having excellent tinting strength through the coating layer composed of the organosilicon compounds to form composite particles. As a result, the obtained green or orange-based pigment can also exhibit an excellent tinting strength.

The reason why the green or orange-based pigment of the present invention has an excellent heat resistance, is considered as follows. That is, the iron oxide hydroxide particles which are inherently deteriorated in heat resistance, are coated with the organosilicon compounds having an excellent heat resistance. Further, the organic blue or red-based pigment having an excellent heat resistance is fixed onto the surface of the coating layer composed of the organosilicon compounds. As a result, the obtained green or orange-based pigment can be enhanced in heat resistance.

The organic green or orange-based pigment according to the present invention contains no harmful elements and compounds and, therefore, can show not only excellent hygiene and safety, but also is effective for environmental protection.

Also, the green or orange-based pigment having an average major axial diameter of 0.1 to 1.0 $\mu$m according to the present invention, has high tinting strength, and excellent heat resistance and chemical resistances, and are harmless.

In the paint and resin composition of the present invention, there is used the green or orange-based pigment which is not only excellent in heat resistance and chemical resistances but also harmless. Therefore, the paint and resin composition of the present invention is suitable as green or orange paints and resin compositions which are free from environmental pollution.

The green or orange-based fine pigment having an average major axial diameter of from 0.005 to less than 0.1 $\mu$m according to the present invention, is harmless and enhanced in chemical resistances and heat resistance. Further, by using such a green or orange-based fine pigment, it is possible to obtain paints and resin compositions having an excellent transparency. Therefore, the green or orange-based fine pigment of the present invention is suitable as coloring pigments for resins, paints and printing inks.

The paint and resin composition of the present invention are produced using the green or orange-based fine pigment which has excellent heat resistance and chemical resistances, and is harmless. Therefore, the paint and resin composition of the present invention are suitable as green or orange paints and resin compositions which are free from environmental pollution and have an excellent transparency.

EXAMPLES

The present invention is described in more detail by Examples and Comparative Examples, but the Examples are only illustrative and, therefore, not intended to limit the scope of the present invention.

Various properties were measured by the following methods.

(1) The average major axial diameter and average minor axial diameter of the particles were respectively expressed by average values (measured in a predetermined direction) of about 350 particles which were sampled from a micrograph obtained by magnifying an original electron micrograph by four times in each of the longitudinal and transverse directions.

(2) The aspect ratio of the particles was expressed by a ratio of average major axial diameter to average minor axial diameter thereof.

(3) The geometrical standard deviation of major axial diameters of the particles was expressed by values obtained by the following method. That is, the major axial diameters were measured from the above magnified electron micrograph. The actual major axial diameters and the number of the particles were obtained from the calculation on the basis of the measured values. On a logarithmic normal probability paper, the major axial diameters were plotted at regular intervals on the abscissa-axis and the accumulative number (under integration sieve) of particles belonging to each interval of the major axial diameters were plotted by percentage on the ordinate-axis by a statistical technique.

The major axial diameters corresponding to the number of particles of 50% and 84.13%, respectively, were read from the graph, and the geometrical standard deviation (under integration sieve) was measured from the following formula:

Geometrical standard deviation={major axial diameter corresponding to 84.13% under integration sieve)/ {major axial diameter (geometrical average diameter) corresponding to 50% under integration sieve}

The closer to 1 the geometrical standard deviation value, the more excellent the particle size distribution of the major axial diameters of the particles.

(4) The specific surface area was expressed by values measured by a BET method.

(5) The amounts of Al and Si which were present within iron oxide hydroxide particles or on the surfaces thereof; the amount of Al contained in the aluminum and iron oxide hydroxide composite of adhered onto the surfaces of the iron oxide hydroxide particles; and the amount of Si contained in the coating layer composed of organosilicon compounds, were measured by a fluorescent X-ray spectroscopy device "3063 M-type" (manufactured by RIGAKU DENKI KOGYO CO., LTD.) according to JIS K0119 "General rule of fluorescent X-ray analysis".

Meanwhile, the amount of Si contained in oxides of silicon, hydroxides of silicon and organosilicon compounds coated on the surfaces of the iron oxide hydroxide particles, is expressed by the value obtained by subtracting the amount of Si measured prior to the respective treatment steps from that measured after the respective treatment steps.

(6) The amount (wt. %) of Fe contained in aluminum and iron oxide hydroxide composite which was coated on the surfaces of the iron oxide hydroxide particles, is expressed by the value obtained by the following method.

That is, 0.25 g of the iron oxide hydroxide particles was weighed and charged into a 100 ml conical flask, and then mixed with 33.3 ml of ion exchange water. The flask was placed in a water bath heated to 60° C., and the contents of the flask were stirred for 20 minutes by a magnetic stirrer, thereby obtaining a suspension.

Next, the suspension was mixed with 16.7 ml of a 12N-hydrochloric acid solution and further stirred for 20 minutes. As a result, a portion of the coat of aluminum and iron oxide hydroxide composite adhered on the surface of each iron oxide hydroxide particle which portion extends from an outer surface of the coat up to approximately a mid point of the distance between the outer surface of the coat and an outer surface of each iron oxide hydroxide particle, and has a substantially uniform composition, was dissolved out with the acid from the outermost surface of the coated particle toward the inside thereof (This fact was already confirmed by many experiments). Thereafter, the suspension containing components dissolved-out by the acid was subjected to suction filtration using a 0.1 $\mu$m-membrane filter. The amounts (ppm) of Al and Fe in the obtained filtrate were measured by an inductively-coupled plasma atomic emission spectrometer (SPS-4000 manufactured by Seiko Denshi Kogyo Co., Ltd.).

Further, the amount of Fe contained in the aluminum and iron oxide hydroxide composite was calculated from the weight percentage of Al to Fe obtained from the measured amounts of Al and Fe in the filtrate and the amount (% by weight) of Al in the aluminum and iron oxide hydroxide composite obtained by the above-mentioned fluorescent X-ray analysis, according to the following formula (i):

Amount of Fe (% by weight)=Amount of Al (% by weight)/Weight ratio of Al to Fe (7) The amount of the organic pigment adhered on the iron oxide hydroxide composite particles was obtained by measuring the carbon content thereof using "HORIBA METAL CARBON/SULFUR ANALYZER EMIA-2200 MODEL" (manufactured by Horiba Seisakusho Co., Ltd.).

(8) The desorption percentage of the organic pigment adhered on the iron oxide hydroxide composite particles, is expressed by the value measured by the following method. The closer to 0% the desorption percentage of the organic pigment, the less the amount of the organic pigment desorbed from the surface of the iron oxide hydroxide composite particles.

Three grams of the iron oxide hydroxide composite particles and 40 ml of ethanol were placed in a precipitation tube, and subjected to ultrasonic dispersion for 20 minutes. The obtained dispersion was allowed to stand for 120 minutes, thereby separating the dispersion into the iron oxide hydroxide composite particles and the organic pigment desorbed therefrom due to the difference in precipitating speed therebetween. Subsequently, the iron oxide hydroxide composite particles were mixed again with 40 ml of ethanol, and subjected to ultrasonic dispersion for 20 minutes. The obtained dispersion was allowed to stand for 120 minutes, thereby separating the dispersion into the iron oxide hydroxide composite particles and the organic pigment. The thus separated iron oxide hydroxide composite particles were dried at 80° C. for one hour to measure the amount of the organic pigment desorbed therefrom. The desorption percentage (%) of the organic pigment is calculated according to the following formula:

Desorption percentage (%) of organic pigment = {(Wa−We)/Wa}×100 wherein Wa represents an amount of the organic pigment adhered onto the iron oxide hydroxide composite particles; and We represents an amount of the organic pigment adhered onto the iron oxide hydroxide composite particles after desorption test.

(9) The hue of each of the iron oxide hydroxide particles, the organic pigment and the green or orange-based pigment, were measured by the following method.

That is, 0.5 g of each sample and 0.5 ml of castor oil were intimately kneaded together by a Hoover's muller to form a paste. 4.5 g of clear lacquer was added to the obtained paste and was intimately mixed to form a paint. The paint was applied on a cast-coated paper by using a 150 $\mu$m (6-mil) applicator to produce a coating film piece (having a film thickness of about 30 $\mu$m). The thus obtained coating film piece was measured by a Multi-spectro-colour-meter MSC-IS-2D (manufactured by SUGA TESTING MACHINES MANUFACTURING CO., LTD.) to determine L*, a* and b* values thereof.

Meanwhile, the h value is expressed by the value calculated from the above measured a* and b* values according to the following formulae:

$h=\tan^{-1}(b^*/a^*)$ $(a^*>0, b^*\leq 0)$;

$h=180+\tan^{-1}(b^*/a^*)$ $(a^*<0)$; and $h=360+\tan^{-1}(b^*/a^*)$ $(a^*>0, b^*<0)$

(10) The heat resistance of each of the iron oxide hydroxide particles, the organic pigment and the iron oxide hydroxide composite particles, was expressed by the temperature read out from a DSC chart obtained by subjecting a test sample to differential scanning calorimetry (DSC) using a thermal analyzing apparatus SSC-5000 (manufactured by SEIKO DENSHI KOGYO Co., Ltd.), which temperature was read at a crossing point of two tangential lines on two curves constituting the first one of two infection points which form a peak on the DSC chart.

(11–1) The tinting strengths of the green-based pigment were measured by the following method.

That is, a primary color enamel and a vehicle enamel prepared by the following methods were respectively applied on a cast-coated paper by using a 150 $\mu$m (6-mil) applicator to produce coating film pieces. The thus obtained coating film pieces were measured by a Multi-spectro-colour-meter MSC-IS-2D (manufactured by SUGA TESTING MACHINES MANUFACTURING CO., LTD.) to determine the L* values thereof. The difference between the measured L* values was expressed by ΔL*.

Based on the thus measured ΔL* value and the ΔLs* value obtained from chrome green (Comparative Example 6) as a reference sample, the tinting strength (%) was calculated according to the following formula:

Tinting strength (%)=100+{(ΔLs*−ΔL*)×10}

(11–2) The tinting strength of the orange-based pigment was measured by the following method.

That is, a primary color enamel and a vehicle enamel prepared by the following methods were respectively applied on a cast-coated paper by using a 150 $\mu$m (6-mil) applicator to produce coating film pieces. The thus obtained coating film pieces were measured by a Multi-spectro-colour-meter MSC-IS-2D (manufactured by SUGA TESTING MACHINES MANUFACTURING CO., LTD.) to determine the L* values thereof. The difference between the measured L* values was expressed by ΔL*.

Next, the organic red-based pigment and the iron oxide hydroxide particles were simply blended together at the same mixing ratio as used for the production of the orange-based pigment, thereby preparing a mixed pigment as a reference sample for the orange-based pigment. The thus prepared reference sample was used to produce coating film pieces of the primary color enamel and the vehicle enamel by the same method as used above, and then the obtained coating film pieces were measured by the same method as above to determine L* values of the respective coating film pieces. The difference between the measured L* values was expressed by ΔLs*.

Based on the thus obtained ΔL* and ΔLs* values for the orange-based pigment and the reference sample, respectively, the tinting strength (%) was calculated according to the following formula:

Tinting strength (%)=100+{(ΔLs* −ΔL*)×10}

Preparation of Primary Color Enamel 10 g of the above sample, 16 g of amino alkyd resin and 6 g of a thinner were blended together. The obtained mixture was charged together with 90 g of 3 mmϕ glass beads into a 140-ml glass bottle, and then mixed and dispersed together for 45 minutes using a paint shaker. Thereafter, 50 g of amino alkyd resin was added to the obtained dispersion, and further dispersed together for 5 minutes using a paint shaker, thereby preparing a primary color enamel.

Preparation of Vehicle Enamel 12 g of the above-prepared primary color enamel and 40 g of AMIRAC WHITE (titanium dioxide-dispersed amino alkyd resin) were blended together, and then mixed and dispersed together for 15 minutes using a paint shaker, thereby preparing a vehicle enamel.

(12) The hiding power of the organic pigment and the green or orange-based pigment is expressed by the value measured by the criptometer method according to paragraph 8.2 of JIS K5101, using the above obtained primary color enamel.

(13) The acid resistance of the iron oxide hydroxide particles and the iron oxide hydroxide composite particles was measured by the following method.

That is, 10 g of sample particles were immersed in a 5% sulfuric acid solution for 10 minutes. Thereafter, the sample particles were taken out of the sulfuric acid solution, washed with water and then dried. The thus dried particles were used to form a coating film by the same method as described above. The L*, a* and b* values of the coating film were measured, and the acid resistance was expressed by the value of color difference ΔE* calculated according to the following formula:

ΔE* value=$((\Delta L^*)^2+(\Delta a^*)^2+(\Delta b^*)^2)^{1/2}$ wherein ΔL* represents the difference between the L* values before and after immersing the sample particles in acid or alkali; Δa* represents the difference between the a* values before and after immersing the sample particles in acid or alkali; and Δb* represents the difference between the a* values before and after immersing the sample particles in acid or alkali.

The smaller the ΔE* value, the more excellent the acid resistance.

(14) The alkali resistance of the iron oxide hydroxide particles and the iron oxide hydroxide composite particles was measured by the following method.

That is, 10 g of sample particles were immersed in a 1% sodium hydroxide solution for 15 minutes. Thereafter, the sample particles were taken out of the sodium hydroxide solution, washed with water and then dried. The thus dried particles were used to form a coating film by the same method as described above. The L*, a* and b* values of the coating film were measured, and the alkali resistance was expressed by the value of color difference ΔE* calculated according to the following formula:

ΔE* value=$((\Delta L^*)^2+(\Delta a^*)^2+(\Delta b^*)^2)^{1/2}$ wherein ΔL* represents the difference between the L* values before and after immersing the sample particles in acid or alkali; Δa* represents the difference between the a* values before and after immersing the sample particles in acid or alkali; and Δb* represents the difference between the a* values before and after immersing the sample particles in acid or alkali.

The smaller the ΔE* value, the more excellent the alkali resistance.

(15) The hue of the coating film obtained by using the solvent-based paint or water-based paint containing the green or orange-based pigment was determined by the following method.

That is, the paint produced by the method described hereinafter, was respectively coated on a cold-rolled steel plate (0.8 mm×70 mm×150 mm: JIS G-3141) and then dried to form a coating film having a thickness of 150 μm thereon, thereby preparing a coating film test piece. Also, the hue of the resin composition colored with the green or orange-based pigment was determined using a colored resin plate prepared by the method described hereinafter. The L*, a* and b* values of the thus prepared coating film test piece and colored resin plate were measured by using a Multi-spectrocolour-meter MSC-IS-2D (manufactured by SUGA TESTING MACHINES MANUFACTURING CO., LTD.).

Meanwhile, the h value of the paint or resin composition was calculated from the measured a* and b* values according to the above-specified formula:

h=$\tan^{-1}(b^*/a^*)$ (a*>0, b*≦0);

h=$180+\tan^{-1}(b^*/a^*)$ (a*<0); and h=$360+\tan^{-1}(b^*/a^*)$ (a*>0, b*<0)

(16) The gloss of a coating film formed obtained by using the paint containing the green or orange-based pigment, was measured by irradiating light onto the above coating film test pieces at an incident angle of 60°, using a glossmeter UGV-5D (manufactured by SUGA TESTING MACHINES MANUFACTURING CO., LTD.).

The higher the gloss, the more excellent the dispersibility of the paint containing the green or orange-based pigment.

(17) The transparency of the solvent-based paint or water-based paint containing the green or orange-based fine pigment, was determined using a coating film having a thickness of 150 μm (6 mil) which was prepared by applying each paint prepared by the method described hereinafter onto a 100 μm-thick clear base film.

Also, the transparency of the rubber or resin composition was determined using a resin plate prepared by the method described hereinafter.

In order to determine the transparency of the paint or resin composition, the light transmittance of the coating film or the resin plate was measured by a self-recording photoelectric spectrophotometer "UV-2100" (manufactured by Shimadzu Seisakusho Co., Ltd.). Based on the measured light transmittance, the linear absorption thereof was calculated according to the following formula:

Linear absorption ($\mu m^{-1}$)=ln(1/t)/FT wherein t represents a light transmittance at λ=900 nm; and FT is a thickness of the coating film or the resin plate used for the measurement.

The smaller the linear absorption, the higher the light transmittance of the paint or resin composition, i.e., the higher the transparency thereof.

(18-1) The heat resistance of a coating film formed from the solvent-based paint or water-based paint containing the green or orange-based pigment is determined as follows.

That is, the above prepared coating film test piece was placed in an electric furnace, and while varying the temperature of the electric furnace, heat-treated for 15 minutes at each temperature. The hues (L* value, a* value and b* value) of the coating film test piece before and after heat treatment at each temperature were respectively measured by a Multi-spectro-colour-meter MSC-IS-2D (manufactured by SUGA TESTING MACHINES MANUFACTURING CO., LTD.).

Based on the measured values before the heat treatment as standard values, the ΔE* value was calculated according to the below-mentioned formula. On the semi-logarithmic graph paper, the heating temperatures were plotted on the abscissa-axis, and the ΔE* values were plotted on the ordinate-axis. The temperature at which the ΔE* value was identical to just 1.5, was determined as the heat-resisting temperature of the coating film.

$\Delta E^*$ value $=((\Delta L^*)^2 +(\Delta a^*)^2 +(\Delta b^*)^2)^{1/2}$ wherein ΔL* represents a difference between L* values of the coating film before and after the heat treatment; Δa* represents a difference between a* values of the coating film before and after the heat treatment; and Δb* represents a difference between b* values of the coating film before and after the heat treatment.

(18-2) The heat resistance of a coating film formed from the solvent-based paint or water-based paint containing the green or orange-based fine pigment is determined as follows.

That is, a paint prepared by the method described hereinafter was applied onto a transparent glass plate (0.8 mm (thickness)×70 mm (width)×150 mm (length)). The coated glass plate was placed in an electric furnace, and while varying the temperature of the electric furnace, heat-treated for 15 minutes at each temperature. The hues (L* value, a* value and b* value) of the coated glass plate on a standard white back plate before and after heat treatment at each temperature were respectively measured by a Multi-spectro-colour-meter MSC-IS-2D (manufactured by SUGA TESTING MACHINES MANUFACTURING CO., LTD.) according to JIS Z 8729.

Based on the measured values before the heat treatment as standard values, the ΔE* value was calculated according to the above-mentioned formula. On the semi-logarithmic graph paper, the heating temperatures were plotted on the abscissa-axis, and the ΔE* values were plotted on the ordinate-axis. The temperature at which the ΔE* value was identical to just 1.5, was determined as the heat-resisting temperature of the coating film.

$\Delta E^*$ value$=((\Delta L^*)^2 +(\Delta a^*)^2 +(\Delta b^*)^2)^{1/2}$ wherein ΔL* represents a difference between L* values of the coating film before and after the heat treatment; Δa* represents a difference between a* values of the coating film before and after the heat treatment; and Δb* represents a difference between b* values of the coating film before and after the heat treatment.

(19) The heat resistance of a rubber or resin composition containing the green or orange-based pigment was determined as follow. That is, a resin plate prepared by the method described hereinafter was cut into 5 cm square, was placed in a hot press, and while varying the temperature of the hot press and applying a load of 98 MPa (1 ton/cm$^2$) thereto, heat-treated for 10 minutes at each temperature. The hues (L* value, a* value and b* value) of the resin plate before and after heat treatment at each temperature were respectively measured. Based on the measured values before the heat treatment as standard values, the ΔE* value was calculated according to the above-mentioned formula. On the semi-logarithmic graph paper, the heating temperatures were plotted on the abscissa-axis, and the ΔE* values were plotted on the ordinate-axis. The temperature at which the ΔE* value was identical to just 1.5, was determined as the heat-resisting temperature of the resin composition.

$\Delta E^*$ value $=((\Delta L^*)^2 +(\Delta a^*)^2 +(\Delta b^*)^2)^{1/2}$ wherein ΔL* represents a difference between L* values of the coating film before and after the heat treatment; Δa* represents a difference between a* values of the coating film before and after the heat treatment; and Δb* represents a difference between b* values of the coating film before and after the heat treatment.

(20-1) The storage stability of a paint containing the green or orange-based pigment was determined by the following method.

That is, the paint produced by dispersing a mill base prepared by blending the below-mentioned components together at the predetermined mixing ratio, for 90 minutes, was coated on a cold-rolled steel plate (0.8 mm×70 mm×150 mm: JIS G-3141) and then dried to form a coating film having a thickness of 150 μm thereon. The hue (L*, a* and b* values) of the thus obtained coating film was measured. Further, after the paint was allowed to stand at 25° C. for one week, the paint was applied onto a cold-rolled steel plate and then dried to form a coating film by the same method as described above. Then, the hue (L*, a* and b* values) of the obtained coating film were also measured. Based on the thus measured L*, a* and b* values, the ΔE* value was calculated according to the below-mentioned formula:

$\Delta E^*$ value $((\Delta L^*)^2 +(\Delta a^*)^2 +(\Delta b^*)^2)^{1/2}$ wherein ΔL* represents a difference between L* values of the compared coating films prepared from the respective paints before and after the keeping test; Δa* represents a difference between a* values of the compared coating films prepared from the respective paints before and after the keeping test; and Δb* represents a difference between b* values of the compared coating films prepared from the respective paints before and after the keeping test.

(20-2) The storage stability of a paint containing the green or orange-based fine pigment was determined as follows.

That is, the paint prepared by the method described hereinafter, was applied onto a clear base film and then dried to form a coating film having a thickness of 150 μm (6 mil) thereon. The L*, a* and b* values of the obtained coating film were measured. Further, after the paint was allowed to stand at 25° C. for one week, the paint was applied onto a clear base film and then dried to form a coating film by the same method as described above. Then, the L*, a* and b* values of the obtained coating film were also measured. Based on the thus measured L*, a* and b* values, the ΔE* value was calculated according to the below-mentioned formula:

$\Delta E^*$ value$=((\Delta L^*)^2 +(\Delta a^*)^2 +(\Delta b^*)^2)^{1/2}$ wherein ΔL* represents a difference between L* values of the compared coating films prepared from the respective paints before and after the keeping test; Δa* represents a difference between a* values of the compared coating films prepared from the respective paints before and after the keeping test; and Δb* represents a difference between b* values of the compared coating films prepared from the respective paints before and after the keeping test.

(21) The acid resistance of a coating film was measured by the following method.

That is, the coated plate was prepared by the same method as used above for the evaluation of heat resistance. The gloss of the coated plate was measured. Then, the coated plate suspended by a thread was immersed by about 120 mm in depth into a 5 wt. % aqueous sulfuric acid solution filled in a 1,000-ml beaker, and was allowed to stand in the suspended condition at 25° C. for 24 hours.

Next, the coated plate was removed from the aqueous sulfuric acid solution and gently washed with flowing water. After water attached to the coated plate was removed by shaking, the gloss of the coated plate was measured at a central portion thereof. Based on the measured gloss values before and after the immersion, the change in gloss ($\Delta G$ value) was calculated, thereby evaluating the acid resistance of the coating film. The smaller the $\Delta G$ value, the more excellent the acid resistance of the coating film.

(22) The alkali resistance of a coating film was measured by the following method. That is, the coated plate was prepared by the same method as used above for the evaluation of heat resistance. The gloss of the coated plate was measured. Then, the coated plate suspended by a thread was immersed by about 120 mm in depth into a 1 wt. % aqueous sodium hydroxide solution filled in a 1,000-ml beaker, and was allowed to stand in the suspended condition at 25° C. for 24 hours.

Next, the coated plate was removed from the aqueous sodium hydroxide solution and gently washed with flowing water. After water attached to the coated plate was removed by shaking, the gloss of the coated plate was measured at a central portion thereof. Based on the measured gloss values before and after the immersion, the change in gloss ($\Delta G$ value) was calculated, thereby evaluating the alkali resistance of the coating film. The smaller the $\Delta G$ value, the more excellent the alkali resistance of the coating film.

(23) The viscosity at 25° C. of the paint prepared by the method described hereinafter, was measured at a shear rate (D) of 1.92 sec$^{-1}$ by E-type viscometer (cone plate-type viscometer) EMD-R (manufactured by TOKYO KEIKI CO., LTD.).

(24) The dispersibility of the green or orange-based pigment in resin composition was evaluated by visually counting the number of undispersed aggregate particles on a surface of the colored resin plate produced by the method described hereinafter, and by classifying the results into the following five ranks. The 5th rank represents the most excellent dispersing condition.

Rank 1: not less than 50 undispersed aggregate particles per 1 cm$^2$ were recognized;

Rank 2: 10 to 49 undispersed aggregate particles per 1 cm$^2$ were recognized;

Rank 3: 5 to 9 undispersed aggregate particles per 1 cm$^2$ were recognized;

Rank 4: 1 to 4 undispersed aggregate particles per 1 cm$^2$ were recognized;

Rank 5: No undispersed aggregate particles were recognized.

EXAMPLE 1

<Production of Green-Based Pigment>

11.0 kg of goethite particles (particle shape: acicular shape; average major axial diameter: 0.40 $\mu$m; aspect ratio: 5.3:1; geometrical standard deviation value: 1.44; BET specific surface area value: 18.8 m$^2$/g; L* value: 59.3; a* value: 16.5; b* value: 53.9; h value: 73.0°; heat resistance temperature: 198° C.), were charged into an edge runner "MPUV-2 Model" (tradename, manufactured by MATSUMOTO CHUZO TEKKOSHO CO., LTD.). Then, a methyltriethoxysilane solution prepared by mixing and diluting 220 g of methyltriethoxysilane (tradename: TSL8123, produced by GE Toshiba Silicone Co., Ltd.) with 200 ml of ethanol was added to the goethite particles while operating the edge runner. The resultant mixture was mixed and stirred at a linear load of 392 N/cm (40 Kg/cm) and a stirring speed of 22 rpm for 20 minutes.

Next, 825 g of an organic blue pigment A (kind: copper phthalocyanine blue; particle shape: granular shape; average major axial diameter: 0.06 $\mu$m; hiding power: 240 cm$^2$/g; L* value: 17.7; a* value: 9.7; b* value: -23.4; h value: 292.5°; heat resistance temperature: 256° C.), were added to the above mixture for 10 minutes while operating the edge runner. Further, the obtained mixture was mixed and stirred at a linear load of 392 N/cm (40 Kg/cm) and a stirring speed of 22 rpm for 20 minutes to form a coating layer composed of the organic blue pigment A on the methyltriethoxysilane coat, thereby obtaining a green-based pigment. The obtained green-based pigment was heat-treated at 105° C. for 60 minutes by using a drier.

The obtained green-based pigment was acicular particles having an average major axial diameter of 0.40 $\mu$m, an aspect ratio of 5.3:1, a geometrical standard deviation value of 1.44, a BET specific surface area value of 20.1 m$^2$/g, a L* value of 39.9, an a* value of -13.2, a b* value of 19.8, a h value of 123.7°, a tinting strength of 141% and a hiding power of 1,950 cm$^2$/g. As to the chemical resistances of the green-based pigment, the acid resistance ($\Delta E^*$ value) thereof was 0.99, and the alkali resistance ($\Delta E^*$ value) thereof was 0.86. As to the heat resistance of the green-based pigment, the heat resistance temperature thereof was 227° C. The desorption percentage of the organic blue pigment from the green-based pigment was 7.0% by weight. The amount of a coating layer composed of organosilane compounds produced from methyltriethoxysilane was 0.29% by weight (calculated as Si). The amount of the coating layer composed of the organic blue pigment A was 4.61% by weight (calculated as C) (corresponding to 7.5 parts by weight based on 100 parts by weight of the goethite core particles).

As a result of the observation of electron micrograph, almost no organic blue pigment A liberated was recognized, so that it was confirmed that a substantially whole amount of the organic blue pigment A added was adhered on the coating layer composed of the organosilane compounds produced from methyltriethoxysilane.

EXAMPLE 2

<Production of Solvent-Based Paint Containing Green-Based Pigment>

10 g of the green-based pigment produced in Example 1, was blended with an amino alkyd resin and a thinner at the following weight ratio, and charged into a 140-ml glass bottle together with 90 g of 3 mm$\phi$ glass beads. Next, the obtained mixture was mixed and dispersed for 90 minutes by a paint shaker, thereby preparing a mill base.

| Composition of Mill Base: | |
| --- | --- |
| Green-based pigment | 12.2 parts by weight |
| Amino alkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a solvent-based paint containing the green-based pigment.

| Composition of paint: | |
|---|---|
| Mill base | 39.0 parts by weight |
| Amino Alkyd resin (AMILAC No. 1026, KANSAI PAINT CO., LTD.) | 61.0 parts by weight |

The thus obtained solvent-based paint showed a viscosity of 1,452 cP. As to the storage stability of the solvent-based paint, the $\Delta E^*$ value thereof was 0.92.

Then, the solvent-based paint was applied onto a cold-rolled steel plate (0.8 mm×70 mm×150 mm; JIS G-3141) and then dried to form a coating film having a thickness of 150 $\mu$m thereon. The thus obtained coating film showed a gloss of 87% and a heat resistance temperature of 249° C. As to the hue of the coating film, the $L^*$ value thereof was 40.2; the $a^*$ value thereof was −12.4; the $b^*$ value thereof was 20.5; and the h value thereof was 121.2°. As to the chemical resistances of the coating film, the acid resistance ($\Delta G$ value) thereof was 9.3%, and the alkali resistance ($\Delta G$ value) thereof was 7.9%.

EXAMPLE 3

<Production of Water-Based Paint Containing Green-Based Pigment>

7.62 g of the green-based pigment obtained in Example 1, was blended with a water-soluble alkyd resin at the following weight ratio, and charged into a 140-ml glass bottle together with 90 g of 3 mm$\phi$ glass beads. Next, the obtained mixture was mixed and dispersed for 90 minutes by a paint shaker, thereby preparing a mill base.

| Composition of Mill Base: | |
|---|---|
| Green-based pigment | 12.4 parts by weight |
| Water-soluble alkyd resin (tradename: "S-118", produced by DAI-NIPPON INK KAGAKU KOGYO CO., LTD.) | 9.0 parts by weight |
| Defoamer (tradename: "NOPCO 8034", produced by SUN NOPCO LTD.) | 0.1 parts by weight |
| Water | 4.8 parts by weight |
| Butyl cellosolve | 4.1 parts by weight |

The above-prepared mill base was blended with paint components at the following weight ratio, and the obtained mixture was further mixed and dispersed for 15 minutes by a paint shaker, thereby obtaining a water-soluble paint.

| Composition of paint: | |
|---|---|
| Mill base | 30.4 parts by weight |
| Water-soluble alkyd resin (tradename: S-118, produced by DAI-NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO LTD.) | 0.1 parts by weight |
| Water | 9.1 parts by weight |
| Butyl cellosolve | 1.6 parts by weight |

The thus obtained water-based paint showed a viscosity of 2,118 cP. As to the storage stability of the water-based paint, the $\Delta E^*$ value thereof was 1.00.

Then, the water-based paint was applied onto a cold-rolled steel plate (0.8 mm×70 mm×150 mm; JIS G-3141) and then dried to form a coating film having a thickness of 150 $\mu$m thereon. The thus obtained coating film showed a gloss of 82% and a heat resistance temperature of 247° C. As to the hue of the coating film, the $L^*$ value thereof was 40.7; the $a^*$ value thereof was −12.6; the $b^*$ value thereof was 20.9; and the h value thereof was 121.1°. As to the chemical resistances of the coating film, the acid resistance ($\Delta G$ value) thereof was 9.6%, and the alkali resistance ($\Delta G$ value) thereof was 8.8%.

EXAMPLE 4

<Production of Resin Composition>

2.5 g of the green-based pigment obtained in Example 1, and 47.5 g of a polyvinyl chloride resin 103EP8D (produced by NIPPON ZEON CO., LTD.) were weighed and charged into a 100 ml beaker, and intimately mixed together by a spatula, thereby obtaining mixed particles.

0.5 g of calcium stearate was added to the mixed particles. The mixed particles were slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and subjected to a pressure molding while applying a pressure of 1 ton/cm$^2$ thereto, thereby obtaining a colored resin plate having a thickness of 1 mm. The thus-produced colored resin plate had a dispersing condition of rank 5 and a heat resistance temperature of 223° C. As to the hue of the resin plate, the $L^*$ value thereof was 42.2; the $a^*$ value thereof was −10.8; the $b^*$ value thereof was 17.9; and the h value thereof was 121°.

EXAMPLE 5

<Production of Orange-Based Pigment>

11.0 kg of goethite particles (particle shape: acicular shape; average major axial diameter: 0.40 $\mu$m; aspect ratio: 5.3:1; geometrical standard deviation value: 1.44; BET specific surface area value: 18.8 m$^2$/g; $L^*$ value: 59.3; $a^*$ value: 16.5; $b^*$ value: 53.9; h value: 73.0°; heat resistance temperature: 198° C.), were charged into an edge runner "MPUV-2 Model" (tradename, manufactured by MATSUMOTO CHUZO TEKKOSHO CO., LTD.). Then, a methyltriethoxysilane solution prepared by mixing and diluting 220 g of methyltriethoxysilane (tradename: TSL8123, produced by GE Toshiba Silicone Co., Ltd.) with 200 ml of ethanol was added to the goethite particles while operating the edge runner. The resultant mixture was mixed and stirred at a linear load of 392 N/cm (40 Kg/cm) and a stirring speed of 22 rpm for 20 minutes.

Next, 825 g of an organic red pigment D (kind: quinacridone red; particle shape: granular shape; average major axial diameter: 0.58 $\mu$m; hiding power: 480 cm$^2$/g; heat resistance temperature: 488° C.; $L^*$ value: 37.0; $a^*$ value: 51.9; $b^*$ value: 20.6; h value: 21.6°), were added to the above mixture for 10 minutes while operating the edge runner. Further, the obtained mixture was mixed and stirred at a linear load of 392 N/cm (40 Kg/cm) and a stirring speed of 22 rpm for 20 minutes to form a coating layer composed of the organic red pigment D on the methyltriethoxysilane coat, thereby obtaining an orange-based pigment. The obtained orange-based pigment was heat-treated at 105° C. for 60 minutes by using a drier.

The obtained orange-based pigment was acicular particles having an average major axial diameter of 0.40 μm, an aspect ratio of 5.3:1, a geometrical standard deviation value of 1.44, a BET specific surface area value of 21.2 m$^2$/g, a L* value of 46.3, an a* value of 37.1, a b* value of 42.6, a h value of 48.9°, a tinting strength of 137% and a hiding power of 1,970 cm$^2$/g. As to the chemical resistances of the orange-based pigment, the acid resistance (ΔE* value) thereof was 0.97, and the alkali resistance (ΔE* value) thereof was 0.85. As to the heat resistance of the orange-based pigment, the heat resistance temperature thereof was 229° C. The desorption percentage of the organic red pigment from the orange-based pigment was 6.9%. The amount of a coating layer composed of organosilane compounds produced from methyltriethoxysilane was 0.30% by weight (calculated as Si). The amount of the coating layer composed of the organic red pigment D was 5.30% by weight (calculated as C) (corresponding to 7.5 parts by weight based on 100 parts by weight of the goethite core particles).

As a result of the observation of electron micrograph, almost no organic red pigment D liberated was recognized, so that it was confirmed that a substantially whole amount of the organic red pigment D added was adhered on the coating layer composed of the organosilane compounds produced from methyltriethoxysilane.

EXAMPLE 6

<Production of Solvent-Based Paint Containing Orange-Based Pigment>

10 g of the orange-based pigment produced in Example 5, was blended with an amino alkyd resin and a thinner at the following weight ratio, and charged into a 140-ml glass bottle together with 90 g of 3 mmϕ glass beads. Next, the obtained mixture was mixed and dispersed for 90 minutes by a paint shaker, thereby preparing a mill base.

| Composition of Mill Base: | |
|---|---|
| Orange-based pigment | 12.2 parts by weight |
| Amino alkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a solvent-based paint containing the orange-based pigment.

| Composition of paint: | |
|---|---|
| Mill base | 39.0 parts by weight |
| Amino alkyd resin (AMILAC No. 1026, produced by KANSAI PAINT CO., LTD.) | 61.0 parts by weight |

The thus obtained solvent-based paint showed a viscosity of 1,315 cP. As to the storage stability of the solvent-based paint, the ΔE* value thereof was 0.86.

Then, the solvent-based paint was applied onto a cold-rolled steel plate (0.8 mm×70 mm×150 mm; JIS G-3141) and then dried to form a coating film having a thickness of 150 μm thereon. The thus obtained coating film showed a gloss of 87% and a heat resistance temperature of 250° C. As to the hue of the coating film, the L* value thereof was 48.0; the a* value thereof was 36.5; the b* value thereof was 42.1; and the h value thereof was 49.1°. As to the chemical resistances of the coating film, the acid resistance (ΔG value) thereof was 8.7%, and the alkali resistance (ΔG value) thereof was 7.7%.

EXAMPLE 7

<Production of Water-Based Paint Containing Orange-Based Pigment>

7.62 g of the orange-based pigment obtained in Example 5, was blended with a water-soluble alkyd resin and the like at the following weight ratio, and charged into a 140-ml glass bottle together with 90 g of 3 mmϕ glass beads. Next, the obtained mixture was mixed and dispersed for 90 minutes by a paint shaker, thereby preparing a mill base.

| Composition of Mill Base: | |
|---|---|
| Orange-based pigment | 12.4 parts by weight |
| Water-soluble alkyd resin (tradename: "S-118", produced by DAI-NIPPON INK KAGAKU KOGYO CO., LTD.) | 9.0 parts by weight |
| Defoamer (tradename: "NOPCO 8034", produced by SUN NOPCO LTD.) | 0.1 parts by weight |
| Water | 4.8 parts by weight |
| Butyl cellosolve | 4.1 parts by weight |

The above-prepared mill base was blended with paint components at the following weight ratio, and the obtained mixture was further mixed and dispersed for 15 minutes by a paint shaker, thereby obtaining a water-soluble paint.

| Composition of paint: | |
|---|---|
| Mill base | 30.4 parts by weight |
| Water-soluble alkyd resin (tradename: S-118, produced by DAI-NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO LTD.) | 0.1 parts by weight |
| Water | 9.1 parts by weight |
| Butyl cellosolve | 1.6 parts by weight |

The thus obtained water-based paint showed a viscosity of 2,434 cP. As to the storage stability of the water-based paint, the ΔE* value thereof was 0.98.

Then, the water-based paint was applied onto a cold-rolled steel plate (0.8 mm×70 mm×150 mm; JIS G-3141) and then dried to form a coating film having a thickness of 150 μm thereon. The thus obtained coating film showed a gloss of 82% and a heat resistance temperature of 248° C. As to the hue of the coating film, the L* value thereof was 48.5; the a* value thereof was 36.7; the b* value thereof was 42.0; and the h value thereof was 48.9°. As to the chemical resistances of the coating film, the acid resistance (ΔG value) thereof was 9.4%, and the alkali resistance (ΔG value) thereof was 8.2%.

EXAMPLE 8

<Production of Resin Composition>

2.5 g of the orange-based pigment obtained in Example 5, and 47. 5 g of a polyvinyl chloride resin 103EP8D (produced by NIPPON ZEON CO., LTD.) were weighed and charged into a 100 ml beaker, and intimately mixed together by a spatula, thereby obtaining mixed particles.

0.5 g of calcium stearate was added to the mixed particles. The mixed particles were slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and subjected to a pressure molding while applying a pressure of 98 MPa (1 ton/cm$^2$) thereto, thereby obtaining a colored resin plate having a thickness of 1 mm. The thus-produced colored resin plate had a dispersing condition of rank 5 and a heat resistance temperature of 224° C. As to the hue of the resin plate, the L* value thereof was 49.4; the a* value thereof was 36.2; the b* value thereof was 41.9; and the h value thereof was 49.20.

EXAMPLE 9

<Production of Green-Based Fine Pigment>

11.0 kg of goethite fine particles (particle shape: acicular shape; average major axial diameter: 0.0710 μm; average minor axial diameter: 0.0081 μm; aspect ratio: 8.8:1; geometrical standard deviation value: 1.38; BET specific surface area value: 159.8 m$^2$/g; aluminum content: 0.83% by weight; L* value: 51.6; a* value: 31.4; b* value: 61.7; h value: 63.0°; acid resistance (ΔG value): 1.92; alkali resistance (ΔG value): 1.75; hiding power: 152 cm$^2$/g; heat resistance temperature: 245° C.), were charged into an edge runner "MPUV-2 Model" (tradename, manufactured by MATSUMOTO CHUZO TEKKOSHO CO., LTD.). Then, a methyltriethoxysilane solution prepared by mixing and diluting 220 g of methyltriethoxysilane (tradename: TSL8123, produced by GE Toshiba Silicone Co., Ltd.) with 200 ml of ethanol was added to the goethite fine particles while operating the edge runner. The resultant mixture was mixed and stirred at a linear load of 392 N/cm (40 Kg/cm) and a stirring speed of 22 rpm for 20 minutes.

Next, 1,100 g of an organic blue pigment A (kind: copper phthalocyanine blue; particle shape: granular shape; average major axial diameter: 0.06 μm; hiding power: 240 cm$^2$/g; L* value: 17.7; a* value: 9.7; b* value: -23.4; h value: 292.5°; heat resistance temperature: 256° C.), were added to the above mixture for 10 minutes while operating the edge runner. Further, the obtained mixture was mixed and stirred at a linear load of 392 N/cm (40 Kg/cm) and a stirring speed of 22 rpm for 20 minutes to form a coating layer composed of the organic blue pigment A on the methyltriethoxysilane coat. Then, the obtained particles were heat-treated at 105° C. for 60 minutes by using a dryer, thereby obtaining a green-based fine pigment.

The obtained green-based fine pigment was acicular particles having an average major axial diameter of 0.0722 μm, an average minor axial diameter of 0.0082 μm, an aspect ratio of 8.8:1, a geometrical standard deviation value of 1.33, a BET specific surface area value of 153.6 m$^2$/g, a L* value of 31.6, an a* value of -8.7, a b* value of 0.3, a h value of 178.0°, a tinting strength of 123% and a hiding power of 159 cm$^2$/g. As to the chemical resistances of the green-based fine pigment, the acid resistance (ΔE* value) thereof was 1.14, and the alkali resistance (ΔE* value) thereof was 1.06. As to the heat resistance of the green-based fine pigment, the heat resistance temperature thereof was 257° C. The desorption percentage of the organic blue pigment from the green-based fine pigment was 7.1%. The amount of a coating layer composed of organosilane compounds produced from methyltriethoxysilane was 0.30% by weight (calculated as Si). The amount of the coating layer composed of the organic blue pigment A was 5.99 % by weight (calculated as C) (corresponding to 10 parts by weight based on 100 parts by weight of the goethite core fine particles).

As a result of the observation of electron micrograph, almost no organic blue pigment A liberated was recognized. Therefore, it was confirmed that a substantially whole amount of the organic blue pigment A added was adhered on the coating layer composed of the organosilane compounds produced from methyltriethoxysilane.

EXAMPLE 10

<Production of Solvent-Based Paint Containing Green-Based Fine Pigment>

5 g of the green-based fine pigment produced in Example 9 was blended with the below-mentioned paint base materials at the following weight ratio in a 250-ml glass bottle. Next, the obtained mixture was mixed and dispersed together with 160 g of 3 mmφ glass beads for 120 minutes by a paint shaker, thereby preparing a solvent-based paint.

| Composition of Solvent-based Paint: | |
|---|---|
| Green-based fine pigment | 9.9 parts by weight |
| Melamine resin (tradename: SUPER-PEKKAMINE J-820-60, produced by DAI-NIPPON INK KAGAKU KOGYO CO., LTD.) | 19.8 parts by weight |
| Alkyd resin (tradename: BEKKOSOLE 1307-60EL, produced by DAI-NIPPON INK KAGAKU KOGYO CO., LTD.) | 39.6 parts by weight |
| Xylene | 29.7 parts by weight |
| Butanol | 1.0 part by weight |

The thus obtained solvent-based paint showed a viscosity of 1,676 cP. As to the storage stability of the solvent-based paint, the ΔE* value thereof was 0.87.

The solvent-based paint was applied onto a clear base film and then dried to form a coating film having a thickness of 150 μm (6 mil) thereon. The thus obtained coating film showed a gloss of 86.1%. As to the hue of the coating film, the L* value thereof was 32.3; the a* value thereof was -16.3; the b* value thereof was 2.0; and the h value thereof was 173.0°. The linear absorption of the coating film was 0.0184 μm$^{-1}$.

Then, the solvent-based paint was applied onto a transparent glass plate (0.8 mm in thickness×70 mm in width× 150 mm in length) to form a coating film having a thickness of 150 μm (6 mil) thereon. As to the chemical resistances of the obtained coating film, the acid resistance (ΔG value) thereof was 8.2%, and the alkali resistance (ΔG value) thereof was 7.7%.

Then, the heat resistance of the coating film was determined as follows. That is, five coated plates were prepared using the solvent-based paint by the same method as described above. The respective coated plates were placed within Geer ovens heated to 210° C., 230° C., 250° C, 270° C. and 290° C., respectively, and heat-treated therein for 15 minutes. Thereafter, the coated plates were removed from the ovens to measure the hue values thereof. Based on the hue values before the heat treatment as standard values, the ΔE* value of each coated plate was measured. From the relationship between the heat-treating temperature and the ΔE* value, it was recognized that the temperature at which the ΔE* value was identical to just 1.5, was 269° C.

EXAMPLE 11

<Production of Water-Based Paint Containing Green-Based Fine Pigment>

5 g of the green-based fine pigment produced in Example 9 was blended with the below-mentioned paint base materials at the following weight ratio in a 250-ml glass bottle. Next, the obtained mixture was mixed and dispersed together with 160 g of 3 mmφ glass beads for 120 minutes by a paint shaker, thereby preparing a water-based paint.

| Composition of Water-based Paint: | |
| --- | --- |
| Green-based fine pigment | 10.1 parts by weight |
| Water-soluble melamine resin (tradename: S-695, produced by DAI-NIPPON INK KAGAKU KOGYO CO., LTD.) | 9.3 parts by weight |
| Water-soluble alkyd resin (tradename: S-118, produced by DAI-NIPPON INK KAGAKU KOGYO CO., LTD.) | 40.7 parts by weight |
| Defoamer (tradename: "NOPCO 8034", produced by SUN NOPCO LTD.) | 0.2 part by weight |
| Water | 28.2 parts by weight |
| Butyl cellosolve | 11.5 parts by weight |

The thus obtained water-based paint showed a viscosity of 2,184 cP. As to the storage stability of the water-based paint, the ΔE* value thereof was 0.92.

The water-based paint was applied onto a clear base film and then dried to form a coating film having a thickness of 150 μm (6 mil) thereon. The thus obtained coating film showed a gloss of 82.3%. As to the hue of the coating film, the L* value thereof was 32.9; the a* value thereof was −16.2; the b* value thereof was 2.1; and the h value thereof was 172.6°. The linear absorption of the coating film was 0.0199 μm$^{-1}$.

Then, the water-based paint was applied onto a transparent glass plate (0.8 mm in thickness×70 mm in width×150 mm in length) to form a coating film having a thickness of 150 μm (6 mil) thereon. As to the chemical resistances of the obtained coating film, the acid resistance (ΔG value) thereof was 8.7%, and the alkali resistance (ΔG value) thereof was 8.0%.

Then, the heat resistance of the coating film was determined as follows. That is, five coated plates were prepared using the water-based paint by the same method as described above. The respective coated plates were placed within Geer ovens heated to 210° C., 230° C., 250° C., 270° C. and 290° C., respectively, and heat-treated therein for 15 minutes. Thereafter, the coated plates were removed from the ovens to measure the hue values thereof. Based on the hue values before the heat treatment as standard values, the ΔE* value of each coated plate was measured. From the relationship between the heat-treating temperature and the ΔE* value, it was recognized that the temperature at which the ΔE* value was identical to just 1.5, was 264° C.

EXAMPLE 12

<Production of Resin Composition>

0.5 g of the green-based fine pigment obtained in Example 9, and 49. 5 g of a polyvinyl chloride resin 103EP8D (produced by NIPPON ZEON CO., LTD.) were weighed and charged into a 100 ml beaker, and intimately mixed together by a spatula, thereby obtaining mixed particles.

1.0 g of calcium stearate was added to the mixed particles. The mixed particles were slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and subjected to a pressure molding while applying a pressure of 98 MPa (1 ton/cm$^2$) thereto, thereby obtaining a colored resin plate having a thickness of 1 mm. As to the hue of the resin plate, the L* value thereof was 32.4; the a* value thereof was −12.6; the b* value thereof was 2.4; and the h value thereof was 169.2°. The thus-produced colored resin plate had a dispersing condition of rank 5 and a linear absorption of 0.0192 μm$^{-1}$.

Then, the heat resistance of the resin composition was determined as follows. That is, five colored resin plates were prepared using the resin composition and cut into 5 cm square to prepare 5 test specimens. The respective test specimens were placed within hot presses heated to 185° C., 200° C., 215° C., 230° C. and 245° C., respectively, and heat-treated therein for 10 minutes while applying a pressure of 98 MPa (1 ton/cm$^2$) thereto. Thereafter, the resin plates were removed from the presses to measure the hue values thereof. Based on the hue values before the heat treatment as standard values, the ΔE* value of each resin plate was measured. From the relationship between the heat-treating temperature and the ΔE* value, it was recognized that the temperature at which the ΔE* value was identical to just 1.5, was 231° C.

EXAMPLE 13

<Production of Orange-Based Fine Pigment>

11.0 kg of goethite fine particles (particle shape: acicular shape; average major axial diameter: 0.0710 μm; average minor axial diameter: 0.0081 μm; aspect ratio: 8.8:1; geometrical standard deviation value: 1.38; BET specific surface area value: 159.8 m$^2$/g; aluminum content: 0.83% by weight; L* value: 51.6; a* value: 31.4; b* value: 61.7; h value: 63.0°; acid resistance: 1.92; alkali resistance: 1.75; hiding power: 152 cm$^2$/g; heat resistance temperature: 245° C.), were charged into an edge runner "MPUV-2 Model" (tradename, manufactured by MATSUMOTO CHUZO TEKKOSHO CO., LTD.). Then, a methyltriethoxysilane solution prepared by mixing and diluting 220 g of methyltriethoxysilane (tradename: TSL8123, produced by GE Toshiba Silicone Co., Ltd.) with 200 ml of ethanol was added to the goethite fine particles while operating the edge runner. The resultant mixture was mixed and stirred at a linear load of 441 N/cm (45 Kg/cm) and a stirring speed of 22 rpm for 30 minutes.

Next, 1,100 g of an organic red pigment D (kind: quinacridone red; particle shape: granular shape; average major axial diameter: 0.58 μm; hiding power: 480 cm$^2$/g; L* value:

37.0; a* value: 51.9; b* value: 20.6; h value: 21.6°; heat resistance temperature: 488° C.), was added to the above mixture for 10 minutes while operating the edge runner. Further, the obtained mixture was mixed and stirred at a linear load of 441 N/cm (45 Kg/cm) and a stirring speed of 22 rpm for 30 minutes to form a coating layer composed of the organic red pigment A on the methyltriethoxysilane coat. Then, the obtained particles were heat-treated at 105° C. for 60 minutes by using a dryer, thereby obtaining orange-based fine pigment.

The obtained orange-based fine pigment was acicular particles having an average major axial diameter of 0.0720 μm, an average minor axial diameter of 0.0084 μm, an aspect ratio of 8.6:1, a geometrical standard deviation value of 1.38, a BET specific surface area value of 162.1 $m^2/g$, a L* value of 35.2, an a* value of 49.8, a b* value of 40.2, a h value of 38.9°, a tinting strength of 129% and a hiding power of 161 $cm^2/g$. As to the chemical resistances of the orange-based fine pigment, the acid resistance (ΔE* value) thereof was 1.09, and the alkali resistance (ΔE* value) thereof was 1.04. As to the heat resistance of the orange-based fine pigment, the heat resistance temperature thereof was 254° C. The desorption percentage of the organic red pigment from the orange-based fine pigment was 7.0%. The amount of a coating layer composed of organosilane compounds produced from methyltriethoxysilane was 0.30% by weight (calculated as Si). The amount of the coating layer composed of the organic red pigment D was 6.89% by weight (calculated as C) (corresponding to 10 parts by weight based on 100 parts by weight of the goethite core fine particles).

As a result of the observation of electron micrograph, almost no organic red pigment D liberated was recognized. Therefore, it was confirmed that a substantially whole amount of the organic red pigment D added was adhered on the coating layer composed of the organosilane compounds produced from methyltriethoxysilane.

EXAMPLE 14

<Production of Solvent-Based Paint Containing Orange-Based Fine Pigment>

5 g of the orange-based fine pigment produced in Example 13 was blended with the below-mentioned paint base materials at the following weight ratio in a 250-ml glass bottle. Next, the obtained mixture was mixed and dispersed together with 160 g of 3 mmφ glass beads for 120 minutes by a paint shaker, thereby preparing a solvent-based paint.

| Composition of Solvent-based Paint: | |
| --- | --- |
| Orange-based fine pigment | 9.9 parts by weight |
| Melamine resin (tradename: SUPER-PEKK-AMINE J-820-60, produced by DAI-NIPPON INK KAGAKU KOGYO CO., LTD.) | 19.8 parts by weight |
| Alkyd resin (tradename: BEKKOSOLE 1307-60EL, produced by DAI-NIPPON INK KAGAKU KOGYO CO., LTD.) | 39.6 parts by weight |
| Xylene | 29.7 parts by weight |
| Butanol | 1.0 parts by weight |

The thus obtained solvent-based paint showed a viscosity of 3,119 cP. As to the storage stability of the solvent-based paint, the ΔE* value thereof was 0.95.

The solvent-based paint was applied onto a clear base film and then dried to form a coating film having a thickness of 150 μm (6 mil) thereon. The thus obtained coating film showed a gloss of 82.2%. As to the hue of the coating film, the L* value thereof was 36.0; the a* value thereof was 49.5; the b* value thereof was 40.6; and the h value thereof 39.4°. The linear absorption of the coating film was 0.0202 $\mu m^{-1}$.

Then, the solvent-based paint was applied onto a transparent glass plate (0.8 mm in thickness×70 mm in width× 150 mm in length) to form a coating film having a thickness of 150 μm (6 mil) thereon. As to the chemical resistances of the obtained coating film, the acid resistance (ΔG value) thereof was 8.5%, and the alkali resistance (ΔG value) thereof was 8.0%.

Then, the heat resistance of the coating film was determined as follows. That is, five coated plates were prepared using the solvent-based paint by the same method as described above. The respective coated plates were placed within Geer ovens heated to 210° C., 230° C., 250° C., 270° C. and 290° C., respectively, and heat-treated therein for 15 minutes. Thereafter, the coated plates were removed from the ovens to measure the hue values thereof. Based on the hue values before the heat treatment as standard values, the ΔE* value of each coated plate was measured. From the relationship between the heat-treating temperature and the ΔE* value, it was recognized that the temperature at which the ΔE* value was identical to just 1.5, was 259° C.

EXAMPLE 15

<Production of Water-Based Paint Containing Orange-Based Fine Pigment>

5 g of the orange-based fine pigment produced in Example 13 was blended with the below-mentioned paint base materials at the following weight ratio in a 250-ml glass bottle. Next, the obtained mixture was mixed and dispersed together with 160 g of 3 mmφ glass beads for 120 minutes by a paint shaker, thereby preparing a water-based paint.

| Composition of Water-based Paint: | |
| --- | --- |
| Orange-based fine pigment | 10.1 parts by weight |
| Water-soluble melamine resin (tradename: S-695, produced by DAI-NIPPON INK KAGAKU KOGYO CO., LTD.) | 9.3 parts by weight |
| Water-soluble alkyd resin (tradename: S-118, produced by DAI-NIPPON INK KAGAKU KOGYO CO., LTD.) | 40.7 parts by weight |
| Defoamer (tradename: "NOPCO 8034", produced by SUN NOPCO LTD.) | 0.2 parts by weight |
| Water | 28.2 parts by weight |
| Butyl cellosolve | 11.5 parts by weight |

The thus obtained water-based paint showed a viscosity of 3,209 cP. As to the storage stability of the water-based paint, the ΔE* value thereof was 0.92.

The water-based paint was applied onto a clear base film and then dried to form a coating film having a thickness of 150 μm (6 mil) thereon. The thus obtained coating film showed a gloss of 78.8%. As to the hue of the coating film, the L* value thereof was 36.1; the a* value thereof was 49.4; the b* value thereof was 40.2; and the h value thereof was 39.1°. The linear absorption of the coating film was 0.0215 $\mu m^{-1}$.

Then, the water-based paint was applied onto a transparent glass plate (0.8 mm in thickness×70 mm in width×150 mm in length) to form a coating film having a thickness of 150 μm (6 mil) thereon. As to the chemical resistances of the obtained coating film, the acid resistance (ΔG value) thereof was 8.7%, and the alkali resistance (ΔG value) thereof was 8.1%.

Then, the heat resistance of the coating film was determined as follows. That is, five coated plates were prepared using the water-based paint by the same method as described above. The respective coated plates were placed within Geer ovens heated to 210° C., 230° C., 250° C., 270° C. and 290° C., respectively, and heat-treated therein for 15 minutes. Thereafter, the coated plates were removed from the ovens to measure the hue values thereof. Based on the hue values before the heat treatment as standard values, the $\Delta E^*$ value of each coated plate was measured. From the relationship between the heat-treating temperature and the $\Delta E^*$ value, it was recognized that the temperature at which the $\Delta E^*$ value was identical to just 1.5, was 256° C.

EXAMPLE 16

<Production of Resin Composition>

0.5 g of the orange-based fine pigment obtained in Example 13, and 49. 5 g of a polyvinyl chloride resin 103EP8D (produced by NIPPON ZEON CO., LTD.) were weighed and charged into a 100 ml beaker, and intimately mixed together by a spatula, thereby obtaining mixed particles.

1.0 g of calcium stearate was added to the mixed particles. The mixed particles were slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and subjected to a pressure molding while applying a pressure of 98 MPa (1 ton/cm$^2$) thereto, thereby obtaining a colored resin plate having a thickness of 1 mm. As to the hue of the resin plate, the $L^*$ value thereof was 36.2; the $a^*$ value thereof was 49.9; the $b^*$ value thereof was 40.6; and the h value thereof was 39.1°. The thus-produced colored resin plate had a dispersing condition of rank 5 and a linear absorption of 0.0211 $\mu m^{-1}$.

Then, the heat resistance of the resin composition was determined as follows. That is, five colored resin plates were prepared from the resin composition and cut into 5 cm square to prepare 5 test specimens. The respective test specimens were placed within hot presses heated to 185° C., 200° C., 215° C., 230° C. and 245° C., respectively, and heat-treated therein for 10 minutes while applying a pressure of 98 MPa (1 ton/cm$^2$) thereto. Thereafter, the resin plates were removed from the presses to measure the hue values thereof. Based on the hue values before the heat treatment as standard values, the $\Delta E^*$ value of each resin plate was measured. From the relationship between the heat-treating temperature and the $\Delta E^*$ value, it was recognized that the temperature at which the $\Delta E^*$ value was identical to just 1.5, was 229° C.

Core Particles 1 to 4

As core particles, iron oxide hydroxide particles having properties shown in Table 1 were prepared.

Core Particles 5

20 kg of acicular goethite particles (core particles 1) and 150 liters of water were mixed together, thereby obtaining a slurry containing the acicular goethite particles. The pH value of the obtained re-dispersed slurry containing the acicular goethite particles was adjusted to 10.5 using an aqueous sodium hydroxide solution, and then the concentration of the solid content in the slurry was adjusted to 98 g/liter by adding water thereto. After 150 liters of the slurry was heated to 60° C., 2,722 ml of a 1.0 mol/liter sodium aluminate solution (corresponding to 0.5% by weight (calculated as Al) based on the weight of the acicular goethite particles) was added to the slurry. After allowing the obtained slurry to stand for 30 minutes, the pH value of the obtained slurry was adjusted to 7.5 by adding acetic acid thereto. Further, after allowing the obtained slurry to stand for 30 minutes, the slurry was subjected to filtration, washing with water, drying and pulverization, thereby obtaining the acicular goethite particles whose surfaces were coated with hydroxides of aluminum.

The production condition are shown in Table 2, and various properties of the obtained surface-treated acicular goethite particles are shown in Table 3.

Core Particles 6 to 8

The same procedure as defined above for the production of the core particles 5, was conducted except that the respective iron oxide hydroxide particles (core particles 2 to 4) were used instead of the core particles 1, and kinds and amounts of coating materials to be adhered thereon were changed variously, thereby obtaining surface-coated iron oxide hydroxide particles.

The production condition are shown in Table 2, and various properties of the obtained surface-treated iron oxide hydroxide particles are shown in Table 3.

Core Particles 9 to 12

As core particles, iron oxide hydroxide fine particles having properties shown in Table 4 were prepared.

Core particles 13

20 kg of acicular goethite fine particles (core particles 9) and 150 liters of water were mixed together, thereby obtaining a slurry containing the acicular goethite fine particles. The pH value of the obtained re-dispersed slurry containing the acicular goethite fine particles was adjusted to 10.5 using an aqueous sodium hydroxide solution, and then the concentration of the solid content in the slurry was adjusted to 98 g/liter by adding water thereto. After 150 liters of the slurry was heated to 60° C., 5,444 ml of a 5.0 mol/liter sodium aluminate solution (corresponding to 5% by weight (calculated as Al) based on the weight of the acicular goethite fine particles) was added to the slurry. After allowing the obtained slurry to stand for 30 minutes, the pH value of the obtained slurry was adjusted to 7.5 by adding acetic acid thereto. Further, after allowing the obtained slurry to stand for 30 minutes, the slurry was subjected to filtration, washing with water, drying and pulverization, thereby obtaining the acicular goethite fine particles whose surfaces were coated with hydroxides of aluminum.

The production condition are shown in Table 5, and various properties of the obtained surface-treated acicular goethite fine particles are shown in Table 6.

Core Particles 14 to 16

The same procedure as defined above for the production of the core particles 13, was conducted except that the respective iron oxide hydroxide particles (core particles 10 to 12) were used instead to the core particles 9, and kinds and amounts of coating materials to be adhered were changed variously, thereby obtaining surface-coated iron oxide hydroxide fine particles.

The production condition are shown in Table 5, and various properties of the obtained surface-treated iron oxide hydroxide fine particles are shown in Table 6.

Meanwhile, in "Kind of coating material" of the "surface-treating step" as described in Tables, "A" represents hydroxides of aluminum, and "S" represents oxides of silicon.

Organic Blue Pigments A to C

The organic blue pigments having properties shown in Table 7 were prepared.

Organic Red Pigments D and E

The organic red pigments having properties shown in Table 7 were prepared.

EXAMPLES 17 to 24 and

Comparative Examples 1 to 5

The same procedure as defined in Example 1 was conducted except that kinds of the core particles, kinds and amounts of alkoxysilane compounds, polysiloxanes or silicon compounds added in the coating step, linear loads and times used for the edge runner treatment in the above coating step, kinds and amounts of organic blue pigments added in the organic blue pigment-adhering step, and linear loads and times used for the edge runner treatment in the above adhering step, were changed variously, thereby obtaining green-based pigments.

The production conditions are shown in Table 8, and various properties of the obtained green-based pigments are shown in Table 9.

Comparative Examples 6 to 8

In these Comparative Examples, chrome green (Comparative Example 6), chromium oxide (Comparative Example 7) and phthalocyanine green (Comparative Example 8) were used solely. The results are shown in Table 9.

EXAMPLES 25 to 32 and

Comparative Examples 9 to 16

The same procedure as defined in Example 2 was conducted except that kinds of green-based pigments were changed variously, thereby obtaining solvent-based paints.

Various properties of the obtained solvent-based paints and coating films are shown in Table 10.

EXAMPLES 33 to 40 and

Comparative Examples 17 to 24

The same procedure as defined in Example 3 was conducted except that kinds of green-based pigments were changed variously, thereby obtaining water-based paints.

Various properties of the obtained water-based paints and coating films are shown in Table 11.

EXAMPLES 41 to 48 and

Comparative Examples 25 to 32

The same procedure as defined in Example 4 was conducted except that kinds of green-based pigments were changed variously, thereby obtaining resin compositions.

The production conditions and various properties of the obtained resin compositions are shown in Table 12.

EXAMPLES 49 to 56 and

Comparative Examples 33 to 37

The same procedure as defined in Example 5 was conducted except that kinds of the core particles, kinds and amounts of alkoxysilane compounds, polysiloxanes or silicon compounds added in the coating step, linear loads and times used for the edge runner treatment in the above coating step, kinds and amounts of organic red pigments added in the organic red pigment-adhering step, and linear loads and times used for the edge runner treatment in the above adhering step, were changed variously, thereby obtaining orange-based pigments.

The production conditions are shown in Table 13, and various properties of the obtained orange-based pigments are shown in Table 14.

EXAMPLES 57 to 64 and

Comparative Examples 38 to 42

The same procedure as defined in Example 6 was conducted except that kinds of orange-based pigments were changed variously, thereby obtaining solvent-based paints.

Various properties of the obtained solvent-based paints and coating films are shown in Table 15.

EXAMPLES 65 to 72 and

Comparative Examples 43 to 47

The same procedure as defined in Example 7 was conducted except that kinds of orange-based pigments were changed variously, thereby obtaining water-based paints.

Various properties of the obtained water-based paints and coating films are shown in Table 16.

EXAMPLES 73 to 80 and

Comparative Examples 48 to 52

The same procedure as defined in Example 8 was conducted except that kinds of orange-based pigments were changed variously, thereby obtaining resin compositions.

The production conditions and various properties of the obtained resin compositions are shown in Table 17.

EXAMPLES 81 to 88 and

Comparative Examples 53 to 57

The same procedure as defined in Example 9 was conducted except that kinds of the core particles, kinds and amounts of alkoxysilane compounds, polysiloxanes or silicon compounds added in the coating step, linear loads and times used for the edge runner treatment in the above coating step, kinds and amounts of organic blue pigments added in the organic blue pigment-adhering step, and linear loads and times used for the edge runner treatment in the above adhering step, were changed variously, thereby obtaining green-based fine pigments.

The production conditions are shown in Table 18, and various properties of the obtained green-based fine pigments are shown in Table 19.

EXAMPLES 89 to 96 and

Comparative Examples 58 to 62

The same procedure as defined in Example 10 was conducted except that kinds of green-based fine pigments were changed variously, thereby obtaining solvent-based paints.

Various properties of the obtained solvent-based paints and coating films are shown in Table 20.

EXAMPLES 97 to 104 and Comparative Examples 63 to 67

The same procedure as defined in Example 11 was conducted except that kinds of green-based fine pigments were changed variously, thereby obtaining water-based paints.

Various properties of the obtained water-based paints and coating films are shown in Table 21.

EXAMPLES 105 to 112 and Comparative Examples 68 to 72

The same procedure as defined in Example 12 was conducted except that kinds of green-based fine pigments were changed variously, thereby obtaining resin compositions.

The production conditions and various properties of the obtained resin compositions are shown in Table 22.

EXAMPLES 113 to 120 and Comparative Examples 73 to 77

The same procedure as defined in Example 13 was conducted except that kinds of the core particles, kinds and amounts of alkoxysilane compounds, polysiloxanes or silicon compounds added in the coating step, linear loads and times used for the edge runner treatment in the above coating step, kinds and amounts of organic red pigments added in the organic red pigment-adhering step, and linear loads and times used for the edge runner treatment in the above adhering step, were changed variously, thereby obtaining orange-based fine pigments.

The production conditions are shown in Table 23, and various properties of the obtained orange-based fine pigments are shown in Table 24.

EXAMPLES 121 to 128 and Comparative Examples 78 to 82

The same procedure as defined in Example 14 was conducted except that kinds of orange-based fine pigments were changed variously, thereby obtaining solvent-based paints.

Various properties of the obtained solvent-based paints and coating films are shown in Table 25.

EXAMPLES 129 to 136 and Comparative Examples 83 to 87

The same procedure as defined in Example 15 was conducted except that kinds of orange-based fine pigments were changed variously, thereby obtaining water-based paints.

Various properties of the obtained water-based paints and coating films are shown in Table 26.

EXAMPLES 137 to 144 and Comparative Examples 88 to 92

The same procedure as defined in Example 16 was conducted except that kinds of orange-based fine pigments were changed variously, thereby obtaining resin compositions.

The production conditions and various properties of the obtained resin compositions are shown in Table 27.

TABLE 1

| | Properties of iron oxide hydroxide particles | | |
|---|---|---|---|
| Core particles | Kind of iron oxide hydroxide particles | Particle shape | Average major axial diameter ($\mu$m) |
| Core particles 1 | Goethite | Acicular | 0.43 |
| Core particles 2 | Goethite | Acicular | 0.38 |
| Core particles 3 | Goethite | Acicular | 0.40 |
| Core particles 4 | Lepidocrocite | Rectangular | 0.20 |

| | Properties of iron oxide hydroxide particles | | | |
|---|---|---|---|---|
| Core particles | Aspect ratio (–) | Geometrical standard deviation value (–) | BET specific surface area value (m$^2$/g) | Al content within particles (wt. %) |
| Core particles 1 | 5.8:1 | 1.45 | 16.8 | — |
| Core particles 2 | 6.1:1 | 1.39 | 22.3 | — |
| Core particles 3 | 5.6:1 | 1.41 | 19.8 | 2.36 |
| Core particles 4 | 4.6:1 | 1.41 | 71.2 | — |

| | Properties of iron oxide hydroxide particles | | | | |
|---|---|---|---|---|---|
| | Hue | | | | Heat |
| Core particles | L* value (–) | a* value (–) | b* value (–) | h value (°) | resistance temperature (° C.) |
| Core particles 1 | 61.2 | 15.3 | 54.8 | 74.4 | 202 |
| Core particles 2 | 58.6 | 17.1 | 52.1 | 71.8 | 195 |
| Core particles 3 | 60.6 | 14.9 | 55.0 | 74.8 | 250 |
| Core particles 4 | 54.8 | 20.4 | 37.6 | 61.5 | 193 |

TABLE 2

| | | Surface-treating step Additives | | |
|---|---|---|---|---|
| Core particles | Kind of core particles | Kind | Calculated as | Amount (wt. %) |
| Core particles 5 | Core particles 1 | Sodium aluminate | Al | 0.5 |
| Core particles 6 | Core particles 2 | Water glass #3 | SiO$_2$ | 0.2 |
| Core particles 7 | Core particles 3 | Aluminum sulfate | Al | 1.0 |
| Core particles 8 | Core particles 4 | Aluminum sulfate | Al | 0.5 |
| | | Water glass #3 | SiO$_2$ | 1.5 |

TABLE 2-continued

| | Surface-treating step Coating material | | |
|---|---|---|---|
| Core particles | Kind | Calculated as | Amount (wt. %) |
| Core particles 5 | A | Al | 0.49 |
| Core particles 6 | S | SiO$_2$ | 0.18 |
| Core particles 7 | A | Al | 0.97 |
| Core particles 8 | A | Al | 0.48 |
| | S | SiO$_2$ | 1.45 |

TABLE 3

| | Properties of surface-treated iron oxide hydroxide particles | | |
|---|---|---|---|
| Core particles | Particle shape | Average major axial diameter (μm) | Aspect ratio (—) |
| Core particles 5 | Acicular | 0.43 | 5.8:1 |
| Core particles 6 | Acicular | 0.38 | 6.1:1 |
| Core particles 7 | Acicular | 0.40 | 5.6:1 |
| Core particles 8 | Rectangular | 0.21 | 4.6:1 |

| | Properties of surface-treated iron oxide hydroxide particles | | |
|---|---|---|---|
| Core particles | Geometrical standard deviation value (—) | BET specific surface area value (m$^2$/g) | Al content within particles (wt. %) |
| Core particles 5 | 1.45 | 17.0 | — |
| Core particles 6 | 1.40 | 22.5 | — |
| Core particles 7 | 1.41 | 19.5 | 2.34 |
| Core particles 8 | 1.42 | 70.8 | — |

| | Properties of surface-treated iron oxide hydroxide particles | | | | |
|---|---|---|---|---|---|
| | Hue | | | | Heat |
| Core particles | L* value (—) | a* value (—) | b* value (—) | h value (°) | resistance temperature (° C.) |
| Core particles 5 | 61.3 | 15.1 | 54.7 | 74.6 | 221 |
| Core particles 6 | 58.7 | 17.2 | 52.3 | 71.8 | 208 |
| Core particles 7 | 60.4 | 15.0 | 55.2 | 74.8 | 260 |
| Core particles 8 | 55.0 | 20.2 | 37.5 | 61.7 | 208 |

TABLE 4

| | Kind of iron oxide | Properties of iron oxide hydroxide fine particles | |
|---|---|---|---|
| Core particles | hydroxide fine particles | Particle shape | Average diameter (μm) |
| Core particles 9 | Goethite | Acicular | 0.0813 |
| Core particles 10 | Goethite | Spindle-shaped | 0.0571 |
| Core particles 11 | Goethite | Acicular | 0.0763 |
| Core particles 12 | Lepidocrocite | Rectangular | 0.0900 |

| | Properties of iron oxide hydroxide fine particles | | |
|---|---|---|---|
| Core particles | Average minor axial diameter (μm) | Aspect ratio (—) | Geometrical standard deviation value (—) |
| Core particles 9 | 0.0095 | 8.6:1 | 1.41 |
| Core particles 10 | 0.0093 | 6.1:1 | 1.35 |
| Core particles 11 | 0.0118 | 6.5:1 | 1.36 |
| Core particles 12 | 0.0179 | 5.0:1 | 1.40 |

| | Properties of iron oxide hydroxide fine particles | |
|---|---|---|
| Core particles | BET specific surface area value (m$^2$/g) | Al content within particles (calculated as Al) (wt. %) |
| Core particles 9 | 148.9 | — |
| Core particles 10 | 192.1 | 2.56 |
| Core particles 11 | 149.2 | 1.87 |
| Core particles 12 | 100.4 | — |

| | Properties of iron oxide hydroxide fine particles Composite oxide hydroxide | |
|---|---|---|
| Core particles | Coating amount of Al (calculated as Al) (wt. %) | Coating amount of Fe (calculated as Fe) (wt. %) |
| Core particles 9 | — | — |
| Core particles 10 | — | — |
| Core particles 11 | 1.31 | 11.0 |
| Core particles 12 | — | — |

| | Properties of iron oxide hydroxide fine particles | | | | |
|---|---|---|---|---|---|
| | Hue | | | | |
| Core particles | L* value (—) | a* value (—) | b* value (—) | h value (°) | Hiding power (cm$^2$/g) |
| Core particles 9 | 50.1 | 29.4 | 54.2 | 61.5 | 171 |

TABLE 4-continued

| Core particles | | | | | |
|---|---|---|---|---|---|
| Core particles 10 | 52.6 | 29.6 | 57.0 | 65.6 | 144 |
| Core particles 11 | 54.3 | 27.3 | 58.9 | 65.1 | 158 |
| Core particles 12 | 48.4 | 33.6 | 59.4 | 60.5 | 209 |

Properties of iron oxide hydroxide fine particles

Chemical resistance

| Core particles | Acid resistance ΔE* value (−) | Alkali resistance ΔE* value (−) | Heat resistance temperature (° C.) |
|---|---|---|---|
| Core particles 9 | 2.05 | 1.83 | 192 |
| Core particles 10 | 1.96 | 1.72 | 246 |
| Core particles 11 | 1.77 | 1.67 | 270 |
| Core particles 12 | 2.24 | 2.11 | 189 |

TABLE 5

Surface-treating step Additives

| Core particles | Kind of core particles | Kind | Calculated as | Amount (wt. %) |
|---|---|---|---|---|
| Core particles 13 | Core particles 9 | Sodium aluminate | Al | 5.0 |
| Core particles 14 | Core particles 10 | Water glass #3 | $SiO_2$ | 2.0 |
| Core particles 15 | Core particles 11 | Sodium aluminate | Al | 1.0 |
| | | Water glass #3 | $SiO_2$ | 0.5 |
| Core particles 16 | Core particles 12 | Aluminum sulfate | Al | 2.0 |

Surface-treating step Coating material

| Core particles | Kind | Calculated as | Amount (wt. %) |
|---|---|---|---|
| Core particles 13 | A | Al | 4.75 |
| Core particles 14 | S | $SiO_2$ | 1.96 |
| Core particles 15 | A | Al | 0.98 |
| | S | $SiO_2$ | 0.49 |
| Core particles 16 | A | Al | 1.96 |

TABLE 6

Properties of surface-treated iron oxide hydroxide fine particles

| Core particles | Average major axial diameter (μm) | Average minor axial diameter (μm) | Aspect ratio (−) |
|---|---|---|---|
| Core particles 13 | 0.0816 | 0.0098 | 8.3:1 |
| Core particles 14 | 0.0572 | 0.0094 | 6.1:1 |
| Core particles 15 | 0.0765 | 0.0120 | 6.4:1 |
| Core particles 16 | 0.0901 | 0.0180 | 5.0:1 |

Properties of surface-treated iron oxide hydroxide fine particles

| Core particles | Geometrical standard deviation value (−) | BET specific surface area value (m²/g) | Al content[*1] within particles (calculated as Al) (wt. %) |
|---|---|---|---|
| Core particles 13 | 1.42 | 154.2 | — |
| Core particles 14 | 1.35 | 186.6 | 2.56 |
| Core particles 15 | 1.37 | 152.9 | 1.87 |
| Core particles 16 | 1.41 | 109.1 | — |

Properties of surface-treated iron oxide hydroxide fine particles
Composite oxide hydroxide

| Core particles | Coating amount of Al[*1] (calculated as Al) (wt. %) | Coating amount of Fe[*1] (calculated as Fe) (wt. %) |
|---|---|---|
| Core particles 13 | — | — |
| Core particles 14 | — | — |
| Core particles 15 | 1.13 | 0.64 |
| Core particles 16 | — | — |

Properties of surface-treated iron oxide hydroxide fine particles

Hue

| Core particles | L* value (−) | a* value (−) | b* value (−) | h value (°) | Hiding power (cm²/g) |
|---|---|---|---|---|---|
| Core particles 13 | 51.1 | 29.1 | 54.3 | 61.8 | 166 |
| Core particles 14 | 53.8 | 29.3 | 57.6 | 63.0 | 140 |
| Core particles 15 | 55.2 | 26.1 | 58.1 | 65.8 | 152 |
| Core particles 16 | 49.3 | 34.0 | 60.2 | 60.5 | 207 |

Properties of surface-treated iron oxide hydroxide fine particles

Chemical resistances

| Core particles | Acid resistance ΔE* value (−) | Alkali resistance ΔE* value (−) | Heat resistance (° C.) |
|---|---|---|---|
| Core particles 13 | 1.98 | 1.80 | 222 |
| Core particles 14 | 1.92 | 1.71 | 253 |
| Core particles 15 | 1.73 | 1.65 | 274 |
| Core particles 16 | 2.18 | 2.05 | 208 |

[*1]: Coating amount on core particles

TABLE 7

| Organic pigment | Properties of organic pigment Kind |
|---|---|
| Organic blue pigment A | Copper phthalocyanine blue (C. I. Pigment Blue 15:1) |
| Organic blue pigment B | Copper phthalocyanine blue (C. I. Pigment Blue 15:4) |
| Organic blue pigment C | Copper phthalocyanine blue (C. I. Pigment Blue 15:2) |
| Organic red pigment D | Quinacridone red |
| Organic red pigment E | Quinacridone red |

| | Properties of organic pigment | | |
|---|---|---|---|
| Organic pigment | Particle shape | Average particle size ($\mu$m) | Hiding power (cm2/g) |
| Organic blue pigment A | Granular | 0.06 | 240 |
| Organic blue pigment B | Granular | 0.08 | 272 |
| Organic blue pigment C | Granular | 0.10 | 301 |
| Organic red pigment D | Granular | 0.58 | 480 |
| Organic red pigment E | Granular | 0.50 | 220 |

| | Properties of organic pigment | | | | |
|---|---|---|---|---|---|
| | Hue | | | | Heat |
| Organic pigment | $L^*$ value (−) | $a^*$ value (−) | $b^*$ value (−) | h value (°) | resistance temperature (° C.) |
| Organic blue pigment A | 17.7 | 9.7 | −23.4 | 292.5 | 256 |
| Organic blue pigment B | 17.3 | 11.6 | −26.5 | 293.6 | 273 |
| Organic blue pigment C | 16.9 | 12.1 | −28.8 | 292.8 | 266 |
| Organic red pigment D | 37.0 | 51.9 | 20.6 | 21.6 | 488 |
| Organic red pigment E | 28.3 | 58.0 | 20.6 | 19.5 | 319 |

TABLE 8

| | | Production of green-based pigment Coating step with alkoxysilane, polysiloxane or silicon compound Additives | |
|---|---|---|---|
| Examples and Comparative Examples | Kind of core particles | Kind | Amount added (part by weight) |
| Example 17 | Core particles 1 | Methyl triethoxysilane | 2.0 |
| Example 18 | Core particles 2 | Methyl trimethoxysilane | 0.5 |
| Example 19 | Core particles 3 | Phenyl triethoxysilane | 2.0 |
| Example 20 | Core particles 4 | Methyl hydrogen polysiloxane | 1.0 |
| Example 21 | Core particles 5 | Methyl triethoxysilane | 1.0 |
| Example 22 | Core particles 6 | BYK-080 | 1.0 |
| Example 23 | Core particles 7 | Isobutyl trimethoxysilane | 2.0 |
| Example 24 | Core particles 8 | TSF4770 | 1.5 |
| Comparative Example 1 | Core particles 1 | — | — |
| Comparative Example 2 | Core particles 1 | Methyl triethoxysilane | 1.0 |
| Comparative Example 3 | Core particles 1 | Methyl triethoxysilane | 1.0 |
| Comparative Example 4 | Core particles 1 | Methyl triethoxysilane | 0.005 |
| Comparative Example 5 | Core particles 1 | γ-aminopropyl triethoxysilane | 1.0 |

| | Production of green-based pigment Coating step with alkoxysilane, polysiloxane or silicon compound | | |
|---|---|---|---|
| Examples and | Edge runner treatment | | Coating amount (calculated as |
| Comparative | Linear load | Time | Si) |
| Examples | (N/cm) (Kg/cm) | (min.) | (wt. %) |
| Example 17 | 392  40 | 15 | 0.30 |
| Example 18 | 294  30 | 20 | 0.10 |
| Example 19 | 392  40 | 20 | 0.26 |
| Example 20 | 588  60 | 20 | 0.42 |
| Example 21 | 490  50 | 15 | 0.15 |
| Example 22 | 441  45 | 15 | 0.17 |
| Example 23 | 392  40 | 20 | 0.30 |
| Example 24 | 294  30 | 30 | 0.34 |
| Comparative Example 1 | — | — | — |
| Comparative Example 2 | 392  40 | 20 | 0.15 |
| Comparative Example 3 | 392  40 | 20 | 0.15 |
| Comparative Example 4 | 392  40 | 20 | $7 \times 10^{-4}$ |
| Comparative Example 5 | 392  40 | 20 | 0.13 |

| | Production of green-based pigment Adhesion step with organic blue pigment Organic blue pigment | |
|---|---|---|
| Examples and Comparative Examples | Kind | Amount adhered (part by weight) |
| Example 17 | A | 10.0 |
| Example 18 | A | 7.5 |
| Example 19 | A | 20.0 |
| Example 20 | A | 5.0 |
| Example 21 | A | 7.5 |
| Example 22 | B | 15.0 |
| Example 23 | B | 10.0 |
| Example 24 | B | 25.0 |
| Comparative Example 1 | A | 10.0 |
| Comparative Example 2 | A | 1.0 |
| Comparative Example 3 | A | 35.0 |
| Comparative Example 4 | A | 10.0 |
| Comparative Example 5 | A | 10.0 |

TABLE 8-continued

Production of green-based pigment
Adhesion step with organic blue pigment

| Examples and Comparative Examples | Edge runner treatment | | Amount adhered (calculated as C) (wt. %) |
|---|---|---|---|
| | Linear load (N/cm) | Linear load (Kg/cm) | Time (min.) |

| | Linear load (N/cm) | Linear load (Kg/cm) | Time (min.) | Amount adhered (wt. %) |
|---|---|---|---|---|
| Example 17 | 392 | 40 | 20 | 6.03 |
| Example 18 | 294 | 30 | 30 | 4.61 |
| Example 19 | 294 | 30 | 20 | 11.07 |
| Example 20 | 392 | 40 | 20 | 3.14 |
| Example 21 | 490 | 50 | 15 | 4.62 |
| Example 22 | 441 | 45 | 20 | 8.65 |
| Example 23 | 294 | 30 | 20 | 6.04 |
| Example 24 | 588 | 60 | 30 | 13.30 |
| Comparative Example 1 | 392 | 40 | 20 | 6.02 |
| Comparative Example 2 | 392 | 40 | 20 | 0.63 |
| Comparative Example 3 | 392 | 40 | 20 | 17.26 |
| Comparative Example 4 | 392 | 40 | 20 | 6.02 |
| Comparative Example 5 | 392 | 40 | 20 | 6.03 |

TABLE 9

Properties of green-based pigment

| Examples and Comparative Examples | Average major axial diameter (μm) | Aspect ratio (-) |
|---|---|---|
| Example 17 | 0.43 | 5.8:1 |
| Example 18 | 0.38 | 6.1:1 |
| Example 19 | 0.41 | 5.6:1 |
| Example 20 | 0.20 | 4.6:1 |
| Example 21 | 0.43 | 5.8:1 |
| Example 22 | 0.38 | 6.1:1 |
| Example 23 | 0.40 | 5.6:1 |
| Example 24 | 0.21 | 4.6:1 |
| Comparative Example 1 | 0.43 | 5.8:1 |
| Comparative Example 2 | 0.43 | 5.8:1 |
| Comparative Example 3 | 0.43 | 5.8:1 |
| Comparative Example 4 | 0.43 | 5.8:1 |
| Comparative Example 5 | 0.43 | 5.8:1 |
| Comparative Example 6 | 0.20 | — |
| Comparative Example 7 | 0.21 | — |
| Comparative Example 8 | 0.60 | — |

Properties of green-based pigment

| Example and Comparative Examples | Geometrical standard deviation value (-) | BET specific surface area value (m²/g) | Al content within particles (wt. %) |
|---|---|---|---|
| Example 17 | 1.45 | 18.3 | — |
| Example 18 | 1.39 | 24.6 | — |
| Example 19 | 1.41 | 22.1 | 1.94 |
| Example 20 | 1.41 | 73.6 | — |
| Example 21 | 1.45 | 19.1 | — |
| Example 22 | 1.39 | 25.9 | — |
| Example 23 | 1.41 | 20.2 | 2.09 |
| Example 24 | 1.41 | 76.5 | — |
| Comparative Example 1 | — | 26.8 | — |
| Comparative Example 2 | 1.45 | 17.9 | — |
| Comparative Example 3 | — | 29.3 | — |
| Comparative Example 4 | — | 26.3 | — |
| Comparative Example 5 | — | 25.8 | — |
| Comparative Example 6 | 1.89 | 10.5 | — |
| Comparative Example 7 | 2.32 | 68.2 | — |
| Comparative Example 8 | 1.76 | 2.1 | — |

Properties of green-based pigment Hue

| Example and Comparative Example | *L value (-) | a* value (-) | b* value (-) | h value (°) |
|---|---|---|---|---|
| Example 17 | 35.5 | −16.1 | 12.4 | 142.4 |
| Example 18 | 38.8 | −12.6 | 18.2 | 124.7 |
| Example 19 | 28.5 | −20.1 | 0.9 | 177.4 |
| Example 20 | 36.1 | −16.4 | −1.2 | 184.2 |
| Example 21 | 38.5 | −12.3 | 18.0 | 124.3 |
| Example 22 | 31.5 | −19.6 | 4.7 | 166.5 |
| Example 23 | 35.0 | −16.6 | 12.8 | 142.4 |
| Example 24 | 27.9 | −14.8 | −10.3 | 214.8 |
| Comparative Example 1 | 30.5 | −19.6 | 7.4 | 159.3 |
| Comparative Example 2 | 51.2 | 5.7 | 43.5 | 82.5 |
| Comparative Example 3 | 21.3 | −18.6 | −6.3 | 198.7 |
| Comparative Example 4 | 30.3 | −19.1 | 7.6 | 158.3 |
| Comparative Example 5 | 31.0 | −19.8 | 7.6 | 159.0 |
| Comparative Example 6 | 39.5 | −20.0 | 22.1 | 132.1 |
| Comparative Example 7 | 11.3 | −24.8 | 25.6 | 134.1 |
| Comparative Example 8 | 38.5 | −19.1 | 20.8 | 132.6 |

Properties of green-based pigment

| Examples and Comparative Examples | Tinting strength (%) | Hiding power (cm²/g) | Chemical resistance | |
|---|---|---|---|---|
| | | | Acid resistance ΔE* value (-) | Alkali resistance ΔE* value (-) |
| Example 17 | 134 | 1,920 | 0.93 | 0.78 |
| Example 18 | 140 | 1,960 | 1.02 | 0.89 |
| Example 19 | 125 | 1,830 | 0.83 | 0.71 |
| Example 20 | 151 | 2,030 | 1.37 | 1.22 |
| Example 21 | 143 | 1,950 | 0.74 | 0.61 |
| Example 22 | 121 | 1,850 | 0.66 | 0.52 |
| Example 23 | 138 | 1,970 | 0.79 | 0.67 |
| Example 24 | 126 | 1,820 | 0.51 | 0.45 |
| Comparative Example 1 | 4 | 1,730 | 2.16 | 2.01 |
| Comparative Example 2 | 186 | 1,950 | 1.88 | 1.75 |
| Comparative Example 3 | 7 | 1,680 | 0.76 | 0.68 |
| Comparative Example 4 | 5 | 1,730 | 2.05 | 1.93 |
| Comparative Example 5 | 5 | 1,740 | 2.04 | 1.92 |
| Comparative Example 6 | 100 | 1,180 | 2.58 | 2.13 |

TABLE 9-continued

| | | | | |
|---|---|---|---|---|
| Comparative Example 7 | 98 | 420 | 1.89 | 2.15 |
| Comparative Example 8 | 78 | 680 | 1.16 | 1.88 |

| | Properties of green-based pigment | |
|---|---|---|
| Example and Comparative Examples | Heat resistance temperature (° C.) | Desorption percentage of organic pigment (%) |
| Example 17 | 231 | 7.4 |
| Example 18 | 225 | 7.1 |
| Example 19 | 268 | 8.8 |
| Example 20 | 220 | 6.5 |
| Example 21 | 249 | 3.4 |
| Example 22 | 240 | 4.3 |
| Example 23 | 275 | 3.8 |
| Example 24 | 246 | 4.6 |
| Comparative Example 1 | 203 | 68.4 |
| Comparative Example 2 | 206 | 6.3 |
| Comparative Example 3 | 234 | 24.6 |
| Comparative Example 4 | 204 | 54.8 |
| Comparative Example 5 | 205 | 50.3 |
| Comparative Example 6 | 211 | — |
| Comparative Example 7 | 228 | — |
| Comparative Example 8 | 256 | — |

TABLE 10

| | Production of paint | Properties of paint | |
|---|---|---|---|
| Example and Comparative Examples | Kind of green-based pigment | Viscosity (cP) | Storage stability (−) |
| Example 25 | Example 17 | 1,280 | 0.76 |
| Example 26 | Example 18 | 1,357 | 0.91 |
| Example 27 | Example 19 | 1,408 | 0.85 |
| Example 28 | Example 20 | 1,408 | 0.98 |
| Example 29 | Example 21 | 1,562 | 0.64 |
| Example 30 | Example 22 | 1,178 | 0.58 |
| Example 31 | Example 23 | 1,280 | 0.45 |
| Example 32 | Example 24 | 1,433 | 0.51 |
| Comparative Example 9 | Comparative Example 1 | 2,560 | 2.13 |
| Comparative Example 10 | Comparative Example 2 | 1,408 | 1.53 |
| Comparative Example 11 | Comparative Example 3 | 3,884 | 2.56 |
| Comparative Example 12 | Comparative Example 4 | 1,562 | 2.01 |
| Comparative Example 13 | Comparative Example 5 | 3,072 | 1.99 |
| Comparative Example 14 | Comparative Example 6 | 2,560 | 2.71 |
| Comparative Example 15 | Comparative Example 7 | 2,432 | 2.13 |
| Comparative Example 16 | Comparative Example 8 | 640 | 1.86 |

TABLE 10-continued

| | Properties of coating film | | | |
|---|---|---|---|---|
| | | Heat- | Chemical resistances | |
| Examples and Comparative Examples | 60° gloss (%) | resistance temperature of coating film (° C.) | Acid resistance ΔG value (%) | Alkali resistance ΔG value (%) |
| Example 25 | 86 | 253 | 8.1 | 7.0 |
| Example 26 | 88 | 248 | 9.3 | 8.0 |
| Example 27 | 90 | 270 | 7.8 | 6.6 |
| Example 28 | 85 | 244 | 10.8 | 10.1 |
| Example 29 | 91 | 263 | 6.5 | 5.6 |
| Example 30 | 89 | 256 | 5.1 | 4.2 |
| Example 31 | 93 | 276 | 5.4 | 4.5 |
| Example 32 | 94 | 261 | 4.6 | 3.1 |
| Comparative Example 9 | 68 | 213 | 16.8 | 14.8 |
| Comparative Example 10 | 83 | 220 | 14.8 | 13.9 |
| Comparative Example 11 | 56 | 255 | 7.7 | 6.7 |
| Comparative Exmple 12 | 68 | 215 | 15.9 | 14.3 |
| Comparative Example 13 | 71 | 216 | 15.5 | 14.1 |
| Comparative Example 14 | 73 | 236 | 31.6 | 28.3 |
| Comparative Example 15 | 69 | 253 | 21.8 | 16.9 |
| Comparative Example 16 | 51 | 266 | 11.6 | 10.2 |

| | Properties of coating film Hue | | | |
|---|---|---|---|---|
| Examples and Comparative Examples | L* value (−) | a* value (−) | b* value (−) | h value (°) |
| Example 25 | 37.1 | −16.3 | 12.5 | 142.5 |
| Example 26 | 39.9 | −11.3 | 18.6 | 121.3 |
| Example 27 | 29.6 | −19.8 | 1.1 | 176.6 |
| Example 28 | 37.4 | −16.1 | −0.6 | 182.1 |
| Example 29 | 39.9 | −12.0 | 17.6 | 124.3 |
| Example 30 | 32.6 | −19.3 | 4.9 | 165.8 |
| Example 31 | 36.6 | −15.6 | 12.6 | 141.1 |
| Example 32 | 28.7 | −14.3 | −10.0 | 215.0 |
| Comparative Example 9 | 31.4 | −19.0 | 7.5 | 158.5 |
| Comparative Example 10 | 51.7 | 5.9 | 43.9 | 82.3 |
| Comparative Example 11 | 22.4 | −18.1 | −6.1 | 198.6 |
| Comparative Example 12 | 31.5 | −18.9 | 7.7 | 157.8 |
| Comparative Example 13 | 32.0 | −19.1 | 7.8 | 157.8 |
| Comparative Example 14 | 41.0 | −19.3 | 21.6 | 131.8 |
| Comparative Example 15 | 12.6 | −24.6 | 25.9 | 133.5 |
| Comparative Example 16 | 40.0 | −18.3 | 21.6 | 130.3 |

TABLE 11

| | Production of water-based paint | Properties of paint | |
|---|---|---|---|
| Examples and Comparative Examples | Kind of green-based pigment | Viscosity (cP) | Storage stability (−) |
| Example 33 | Example 17 | 2,048 | 0.83 |
| Example 34 | Example 18 | 2,176 | 1.02 |

TABLE 11-continued

| | | | |
|---|---|---|---|
| Example 35 | Example 19 | 2,560 | 0.98 |
| Example 36 | Example 20 | 2,253 | 1.06 |
| Example 37 | Example 21 | 2,432 | 0.76 |
| Example 38 | Example 22 | 1,920 | 0.68 |
| Example 39 | Example 23 | 1,896 | 0.50 |
| Example 40 | Example 24 | 1,997 | 0.56 |
| Comparative Example 17 | Comparative Example 1 | 2,688 | 2.69 |
| Comparative Example 18 | Comparative Example 2 | 2,944 | 1.62 |
| Comparative Example 19 | Comparative Example 3 | 4,813 | 3.13 |
| Comparative Example 20 | Comparative Example 4 | 3,276 | 2.56 |
| Comparative Example 21 | Comparative Example 5 | 3,226 | 2.57 |
| Comparative Example 22 | Comparative Example 6 | 4,044 | 3.16 |
| Comparative Example 23 | Comparative Example 7 | 5,069 | 2.32 |
| Comparative Example 24 | Comparative Example 8 | 1,920 | 2.46 |

| | Properties of coating film | | |
|---|---|---|---|
| | | Chemical resistance | |
| | Heat- resistance | Acid | Alkali |
| Examples and Comparative Examples | 60° gloss (%) | temperature of coating film (° C.) | resistance ΔG value (%) | resistance ΔG value (%) |
| Example 33 | 82 | 251 | 8.9 | 7.5 |
| Example 34 | 83 | 246 | 9.7 | 8.9 |
| Example 35 | 83 | 266 | 8.0 | 7.1 |
| Example 26 | 81 | 238 | 11.5 | 10.6 |
| Example 37 | 85 | 257 | 7.3 | 6.0 |
| Example 38 | 86 | 246 | 6.0 | 4.9 |
| Example 39 | 88 | 271 | 6.3 | 5.2 |
| Example 40 | 87 | 252 | 5.2 | 4.4 |
| Comparative Example 17 | 61 | 208 | 18.0 | 15.8 |
| Comparative Example 18 | 78 | 218 | 15.7 | 14.3 |
| Comparative Example 19 | 50 | 249 | 8.9 | 7.6 |
| Comparative Example 20 | 62 | 210 | 17.1 | 16.8 |
| Comparative Example 21 | 66 | 211 | 16.3 | 16.5 |
| Comparative Example 22 | 68 | 226 | 32.2 | 30.8 |
| Comparative Example 23 | 63 | 246 | 22.6 | 17.8 |
| Comparative Example 24 | 53 | 253 | 12.7 | 11.0 |

| Example and Comparative Examples | Properties of coating film Hue | | | |
|---|---|---|---|---|
| | L* value (-) | a* value (-) | b* value (-) | h value (°) |
| Example 33 | 37.6 | −16.3 | 12.6 | 142.3 |
| Example 34 | 39.8 | −11.8 | 17.3 | 124.3 |
| Example 35 | 29.7 | −20.1 | 1.2 | 176.6 |
| Example 36 | 37.1 | −16.6 | −1.1 | 183.8 |
| Example 37 | 40.2 | −11.8 | 17.9 | 123.4 |
| Example 38 | 32.3 | −19.5 | 4.4 | 167.3 |
| Example 39 | 37.0 | −15.2 | 12.2 | 141.2 |
| Example 40 | 28.4 | −15.0 | −9.6 | 212.6 |
| Comparative Example 17 | 31.1 | −19.1 | 7.7 | 158.0 |
| Comparative Example 18 | 52.0 | 5.6 | 44.1 | 82.8 |
| Comparative Example 19 | 22.3 | −18.0 | −5.8 | 197.9 |
| Comparative Example 20 | 31.1 | −19.0 | 7.8 | 157.7 |
| Comparative Example 21 | 31.7 | −19.4 | 7.9 | 157.8 |
| Comparative Example 22 | 40.6 | −19.0 | 22.8 | 129.8 |
| Comparative Example 23 | 12.5 | −25.3 | 27.3 | 132.8 |
| Comparative Example 24 | 39.6 | −19.6 | 23.6 | 129.7 |

TABLE 12

| | Production of resin composition Green-based pigment | |
|---|---|---|
| Examples and Comparative Examples | Kind | Amount (part by weight) |
| Example 41 | Example 17 | 1.0 |
| Example 42 | Example 18 | 1.0 |
| Example 43 | Example 19 | 1.0 |
| Example 44 | Example 20 | 1.0 |
| Example 45 | Example 21 | 1.0 |
| Example 46 | Example 22 | 1.0 |
| Example 47 | Example 23 | 1.0 |
| Example 48 | Example 24 | 1.0 |
| Comparative Example 25 | Comparative Example 1 | 1.0 |
| Comparative Example 26 | Comparative Example 2 | 1.0 |
| Comparative Example 27 | Comparative Example 3 | 1.0 |
| Comparative Example 28 | Comparative Example 4 | 1.0 |
| Comparative Example 29 | Comparative Example 5 | 1.0 |
| Comparative Example 30 | Comparative Example 6 | 1.0 |
| Comparative Example 31 | Comparative Example 7 | 1.0 |
| Comparative Example 32 | Comparative Example 8 | 1.0 |

| | Production of resin composition Resin | |
|---|---|---|
| Example and Comparative Examples | Kind | Amount (part by weight) |
| Example 41 | Polyvinyl chloride resin | 99.0 |
| Example 42 | Polyvinyl chloride resin | 99.0 |
| Example 43 | Polyvinyl chloride resin | 99.0 |
| Example 44 | Polyvinyl chloride resin | 99.0 |
| Example 45 | Polyvinyl chloride resin | 99.0 |
| Example 46 | Polyvinyl chloride resin | 99.0 |
| Example 47 | Polyvinyl chloride resin | 99.0 |
| Example 48 | Polyvinyl chloride resin | 99.0 |
| Comparative Example 25 | Polyvinyl chloride resin | 99.0 |
| Comparative Example 26 | Polyvinyl chloride resin | 99.0 |
| Comparative Example 27 | Polyvinyl chloride resin | 99.0 |
| Comparative Example 28 | Polyvinyl chloride resin | 99.0 |
| Comparative Example 29 | Polyvinyl chloride resin | 99.0 |
| Comparative Example 30 | Polyvinyl chloride resin | 99.0 |
| Comparative Example 31 | Polyvinyl chloride resin | 99.0 |
| Comparative Example 32 | Polyvinyl chloride resin | 99.0 |

TABLE 12-continued

Production of resin composition

| Examples and Comparative Examples | Additives Kind | Amount (part by weight) | Kneading temperature (° C.) |
|---|---|---|---|
| Example 41 | Calcium Stearate | 2.0 | 160 |
| Example 42 | Calcium Stearate | 2.0 | 160 |
| Example 43 | Calcium Stearate | 2.0 | 160 |
| Example 44 | Calcium Stearate | 2.0 | 160 |
| Example 45 | Calcium Stearate | 2.0 | 160 |
| Example 46 | Calcium Stearate | 2.0 | 160 |
| Example 47 | Calcium Stearate | 2.0 | 160 |
| Example 48 | Calcium Stearate | 2.0 | 160 |
| Comparative Example 25 | Calcium Stearate | 2.0 | 160 |
| Comparative Example 26 | Calcium Stearate | 2.0 | 160 |
| Comparative Example 27 | Calcium Stearate | 2.0 | 160 |
| Comparative Example 28 | Calcium Stearate | 2.0 | 160 |
| Comparative Example 29 | Calcium Stearate | 2.0 | 160 |
| Comparative Example 30 | Calcium Stearate | 2.0 | 160 |
| Comparative Example 31 | Calcium Stearate | 2.0 | 160 |
| Comparative Example 32 | Calcium Stearate | 2.0 | 160 |

Properties of resin composition

| Examples and Comparative Examples | Dispersion condition (-) | Heat-resistance temperature of resin composition (° C.) |
|---|---|---|
| Example 41 | 5 | 224 |
| Example 42 | 5 | 223 |
| Example 43 | 5 | 232 |
| Example 44 | 4 | 218 |
| Example 45 | 5 | 230 |
| Example 46 | 5 | 226 |
| Example 47 | 5 | 239 |
| Example 49 | 5 | 229 |
| Comparative Example 25 | 2 | 190 |
| Comparative Example 26 | 3 | 200 |
| Comparative Example 27 | 2 | 233 |
| Comparative Example 28 | 3 | 192 |
| Comparative Example 29 | 2 | 196 |
| Comparative Example 30 | 3 | 218 |
| Comparative Example 31 | 3 | 210 |
| Comparative Example 32 | 3 | 228 |

Properties of coating film Hue

| Examples and Comparative Examples | L* value (-) | a* value (-) | b* value (-) | h value (°) |
|---|---|---|---|---|
| Example 41 | 39.8 | -14.6 | 12.9 | 138.8 |
| Example 42 | 41.3 | -9.8 | 16.9 | 120.3 |
| Example 43 | 31.5 | -18.4 | 1.4 | 175.6 |
| Example 44 | 38.5 | -15.3 | -0.8 | 183.0 |
| Example 45 | 41.9 | -10.8 | 18.1 | 120.8 |
| Example 46 | 34.0 | -17.6 | 4.7 | 165.0 |
| Example 47 | 38.9 | -14.4 | 12.5 | 139.0 |
| Example 48 | 30.1 | -13.6 | -9.0 | 213.5 |
| Comparative Example 25 | 32.0 | -17.4 | 8.1 | 155.0 |
| Comparative Example 26 | 53.6 | 7.3 | 44.6 | 80.7 |
| Comparative Example 27 | 23.9 | -16.2 | -5.2 | 197.8 |
| Comparative Example 28 | 32.8 | -17.3 | 8.1 | 154.9 |
| Comparative Example 29 | 33.6 | -17.5 | 8.2 | 154.9 |
| Comparative Example 30 | 42.4 | -17.8 | 23.0 | 127.7 |
| Comparative Example 31 | 13.8 | -23.9 | 27.6 | 130.9 |
| Comparative Example 32 | 41.1 | -18.6 | 24.0 | 127.8 |

TABLE 13

Production of orange-based pigment Coating step with alkoxysilane, polysiloxane or silicon compound Additives

| Examples and Comparative Examples | Kind of core particles | Kind | Amount added (part by weight) |
|---|---|---|---|
| Example 49 | Core particles 1 | Methyl triethoxysilane | 1.0 |
| Example 50 | Core particles 2 | Methyl triethoxysilane | 3.0 |
| Example 51 | Core particles 3 | Phenyl triethoxysilane | 2.0 |
| Example 52 | Core particles 4 | Methyl hydrogen polysiloxane | 1.0 |
| Example 53 | Core particles 5 | Methyl triethoxysilane | 1.0 |
| Example 54 | Core particles 6 | BYK-080 | 2.0 |
| Example 55 | Core particles 7 | Isobutyl trimethoxysilane | 1.0 |
| Example 56 | Core particles 8 | TSF4770 | 1.0 |
| Comparative Example 33 | Core particles 1 | — | — |
| Comparative Example 34 | Core particles 1 | Methyl triethoxysilane | 1.0 |
| Comparative Example 35 | Core particles 1 | Methyl triethoxysilane | 1.0 |
| Comparative Example 36 | Core particles 1 | Methyl triethoxysilane | 0.005 |
| COmparative Example 37 | Core particles 1 | γ-aminopropyl triethoxysilane | 1.0 |

Production of orange-based pigment Coating step with alkoxysilane, polysiloxane or silicon compound

| Example and Comparative Examples | Edge runner treatment Linear load (N/cm) | (Kg/cm) | Time (min.) | Coating amount (calculated as Si) (wt. %) |
|---|---|---|---|---|
| Example 49 | 588 | 60 | 20 | 0.15 |
| Example 50 | 294 | 30 | 30 | 0.59 |
| Example 51 | 441 | 45 | 30 | 0.27 |
| Example 52 | 588 | 60 | 20 | 0.44 |
| Example 53 | 294 | 30 | 30 | 0.15 |
| Example 54 | 392 | 40 | 30 | 0.36 |
| Example 55 | 588 | 60 | 30 | 0.15 |

TABLE 13-continued

| | | | | |
|---|---|---|---|---|
| Example 56 | 392 | 40 | 20 | 0.34 |
| Comparative Example 33 | — | — | — | — |
| Comparative Example 34 | 392 | 40 | 20 | 0.15 |
| Comparative Example 35 | 392 | 40 | 20 | 0.15 |
| Comparative Example 36 | 392 | 40 | 20 | 7 × 10⁻⁴ |
| Comparative Example 37 | 392 | 40 | 20 | 0.13 |

| Examples and Comparative Examples | Production of orange-based pigment Adhesion step with organic red pigment Organic red pigment | |
|---|---|---|
| | Kind | Amount adhered (part by weight) |
| Example 49 | D | 10.0 |
| Example 50 | E | 20.0 |
| Example 51 | D | 15.0 |
| Example 52 | E | 20.0 |
| Example 53 | D | 10.0 |
| Example 54 | E | 7.5 |
| Example 55 | D | 10.0 |
| Example 56 | E | 20.0 |
| Comparative Example 33 | D | 10.0 |
| Comparative Example 34 | D | 100.0 |
| Comparative Example 35 | D | 0.5 |
| Comparative Example 36 | D | 10.0 |
| Comparative Example 37 | D | 10.0 |

| Examples and Comparative Examples | Production of orange-based pigment Adhesion step with organic red pigment | | Amount adhered (calculated as C) (wt. %) |
|---|---|---|---|
| | Edge runner treatment | | |
| | Linear load (N/cm) | Linear load (Kg/cm) | Time (min.) |

| | | | | |
|---|---|---|---|---|
| Example 49 | 392 | 40 | 20 | 6.95 |
| Example 50 | 588 | 60 | 20 | 12.78 |
| Example 51 | 294 | 30 | 30 | 9.99 |
| Example 52 | 588 | 60 | 20 | 12.80 |
| Example 53 | 441 | 45 | 30 | 6.96 |
| Example 54 | 392 | 40 | 30 | 5.33 |
| Example 55 | 588 | 60 | 20 | 6.93 |
| Example 56 | 588 | 60 | 20 | 12.77 |
| Comparative Example 33 | 392 | 40 | 20 | 6.92 |
| Comparative Example 34 | 392 | 40 | 20 | 38.26 |
| Comparative Example 35 | 392 | 40 | 20 | 0.35 |
| Comparative Example 36 | 392 | 40 | 20 | 6.95 |
| Comparative Example 37 | 392 | 40 | 20 | 6.94 |

TABLE 14

| Examples and Comparative Examples | Properties of orange-based pigment | |
|---|---|---|
| | Average major axial diameter ($\mu$m) | Aspect ratio (-) |
| Example 49 | 0.43 | 5.8:1 |
| Example 50 | 0.39 | 6.1:1 |
| Example 51 | 0.40 | 5.6:1 |
| Example 52 | 0.20 | 4.6:1 |
| Example 53 | 0.43 | 5.8:1 |
| Example 54 | 0.38 | 6.1:1 |
| Example 55 | 0.40 | 5.6:1 |
| Example 56 | 0.21 | 4.6:1 |
| Comparative Example 33 | 0.43 | 5.8:1 |
| Comparative Example 34 | 0.43 | 5.8:1 |
| Comparative Example 35 | 0.43 | 5.8:1 |
| Comparative Example 36 | 0.43 | 5.8:1 |
| Comparative Example 37 | 0.43 | 5.8:1 |

| Examples and Comparative Examples | Properties of orange-based pigment | | |
|---|---|---|---|
| | Geometrical standard deviation value (-) | BET specific surface area value (m²/g) | Al content within particles (wt. %) |
| Example 49 | 1.45 | 21.3 | — |
| Example 50 | 1.39 | 23.2 | — |
| Example 51 | 1.41 | 21.6 | 2.00 |
| Example 52 | 1.41 | 71.6 | — |
| Example 53 | 1.45 | 21.8 | — |
| Example 54 | 1.39 | 24.5 | — |
| Example 55 | 1.41 | 23.8 | 2.09 |
| Example 56 | 1.42 | 72.6 | — |
| Comparative Example 33 | — | 28.6 | — |
| Comparative Example 34 | — | 34.0 | — |
| Comparative Example 35 | 1.45 | 16.3 | — |
| Comparative Example 36 | — | 26.8 | — |
| Comparative Example 37 | — | 24.6 | — |

| Examples and Comparative Examples | Properties of orange-based pigment Hue | | | |
|---|---|---|---|---|
| | L* value (-) | a* value (-) | b* value (-) | h value (°) |
| Example 49 | 45.7 | 38.3 | 38.6 | 45.2 |
| Example 50 | 39.3 | 47.2 | 35.6 | 37.0 |
| Example 51 | 40.3 | 46.2 | 38.3 | 39.7 |
| Example 52 | 36.2 | 50.9 | 34.2 | 33.9 |
| Example 53 | 46.1 | 39.6 | 36.6 | 42.7 |
| Example 54 | 47.5 | 36.2 | 43.8 | 50.4 |
| Example 55 | 42.8 | 38.4 | 41.1 | 46.9 |
| Example 56 | 37.7 | 50.5 | 33.3 | 33.4 |
| Comparative Example 33 | 46.3 | 37.6 | 40.4 | 47.1 |
| Comparative Example 34 | 31.2 | 51.2 | 27.0 | 27.8 |
| Comparative Example 35 | 52.8 | 20.1 | 45.5 | 66.2 |
| Comparative Example 36 | 46.9 | 38.2 | 39.2 | 45.7 |
| Comparative Example 37 | 47.3 | 37.9 | 40.1 | 46.6 |

| Examples and Comparative Examples | Properties of orange-based pigment | | | |
|---|---|---|---|---|
| | | | Chemical resistances | |
| | Tinting strength (%) | Hiding power (cm²/g) | Acid resistance ΔE* value (-) | Alkali resistance ΔE* value (-) |
| Example 49 | 136 | 1,990 | 1.09 | 0.91 |

TABLE 14-continued

| | | | | |
|---|---|---|---|---|
| Example 50 | 138 | 1,950 | 0.94 | 0.85 |
| Example 51 | 141 | 1,940 | 0.99 | 0.89 |
| Example 52 | 145 | 1,920 | 1.20 | 1.19 |
| Example 53 | 143 | 2,000 | 0.88 | 0.78 |
| Example 54 | 138 | 2,070 | 0.90 | 0.80 |
| Example 55 | 146 | 2,010 | 0.83 | 0.72 |
| Example 56 | 146 | 1,960 | 0.97 | 0.90 |
| Comparative Example 33 | 100 | 1,730 | 2.32 | 2.10 |
| Comparative Example 34 | 112 | 2,010 | 1.65 | 1.38 |
| Comparative Example 35 | 105 | 1,930 | 2.09 | 1.66 |
| Comparative Example 36 | 102 | 1,740 | 2.11 | 1.95 |
| Comparative Example 37 | 103 | 1,780 | 2.10 | 1.93 |

| | Properties of orange-based pigment | |
|---|---|---|
| Examples and Comparative Examples | Heat resistance temperature (° C.) | Desorption percentage of organic pigment (%) |
| Example 49 | 233 | 7.2 |
| Example 50 | 235 | 9.3 |
| Example 51 | 270 | 8.6 |
| Example 52 | 231 | 9.0 |
| Example 53 | 250 | 4.3 |
| Example 54 | 236 | 2.1 |
| Example 55 | 279 | 3.8 |
| Example 56 | 239 | 4.6 |
| Comparative Example 33 | 205 | 69.2 |
| Comparative Example 34 | 241 | 59.4 |
| Comparative Example 35 | 203 | — |
| Comparative Example 36 | 205 | 58.1 |
| Comparative Example 37 | 206 | 56.6 |

TABLE 15

| | Production | Properties of paint | |
|---|---|---|---|
| Examples and Comparative Examples | of paint Kind of orange-based pigment | Viscosity (cP) | Storage stability ΔE* value (−) |
| Example 57 | Example 49 | 1,280 | 0.81 |
| Example 59 | Example 50 | 1,196 | 0.92 |
| Example 59 | Example 51 | 982 | 0.88 |
| Example 60 | Example 52 | 1,442 | 0.90 |
| Example 61 | Example 53 | 1,386 | 0.60 |
| Example 62 | Example 54 | 1,272 | 0.49 |
| Example 63 | Example 55 | 1,071 | 0.55 |
| Example 64 | Example 56 | 1,121 | 0.65 |
| Comparative Example 38 | Comparative Example 33 | 2,560 | 2.16 |
| Comparative Example 39 | Comparative Example 34 | 2,883 | 2,93 |
| Comparative Example 40 | Comparative Example 35 | 982 | 1.62 |
| Comparative Example 41 | Comparative Example 36 | 3,160 | 2.09 |
| Comparative Example 42 | Comparative Example 37 | 2,830 | 2.06 |

TABLE 15-continued

| | | Properties of coating film | | |
|---|---|---|---|---|
| | | Heat-resistance | | Chemical resistance |
| Examples and Comparative Examples | 60° gloss (%) | temperature of coating film (° C.) | Acid resistance ΔG value (%) | Alkali resistance ΔG value (%) |
| Example 57 | 87 | 250 | 8.3 | 7.1 |
| Example 58 | 86 | 252 | 7.8 | 6.9 |
| Example 59 | 89 | 271 | 8.1 | 7.1 |
| Example 60 | 85 | 248 | 10.4 | 10.0 |
| Example 61 | 92 | 262 | 6.5 | 5.2 |
| Example 62 | 93 | 253 | 6.6 | 5.4 |
| Example 63 | 95 | 282 | 5.9 | 4.3 |
| Example 64 | 90 | 257 | 7.7 | 7.0 |
| Comparative Example 38 | 66 | 214 | 16.3 | 14.9 |
| Comparative Example 39 | 53 | 256 | 14.2 | 13.3 |
| Comparative Example 40 | 77 | 211 | 15.6 | 14.0 |
| Comparative Example 41 | 67 | 213 | 16.0 | 14.9 |
| Comparative Example 42 | 69 | 215 | 15.8 | 14.5 |

| | Properties of coating film Hue | | | |
|---|---|---|---|---|
| Examples and Comparative Examples | L* value (−) | a* value (−) | b* value (−) | h value (°) |
| Example 57 | 47.6 | 37.6 | 38.4 | 45.6 |
| Example 58 | 41.7 | 46.6 | 35.1 | 37.0 |
| Example 59 | 42.3 | 46.9 | 38.0 | 39.0 |
| Example 60 | 37.4 | 49.1 | 34.6 | 35.2 |
| Example 61 | 48.1 | 40.3 | 36.2 | 41.9 |
| Example 62 | 49.2 | 35.5 | 44.6 | 51.5 |
| Example 63 | 43.6 | 39.2 | 40.9 | 46.2 |
| Example 64 | 49.3 | 49.8 | 33.0 | 33.5 |
| Comparative Example 38 | 47.5 | 37.0 | 40.2 | 47.4 |
| Comparative Example 39 | 41.2 | 51.1 | 26.8 | 27.7 |
| Comparative Example 40 | 54.6 | 20.6 | 45.7 | 65.7 |
| Comparative Example 41 | 48.9 | 39.3 | 39.9 | 45.4 |
| Comparative Example 42 | 48.4 | 36.6 | 40.4 | 47.8 |

TABLE 16

| | Production of water- | Properties of paint | |
|---|---|---|---|
| Examples and Comparative Examples | based paint Kind of orange-based pigment | Viscosity (cP) | Storage stability ΔE* value (−) |
| Example 65 | Example 49 | 2,560 | 0.92 |
| Example 66 | Example 50 | 2,283 | 1.01 |
| Example 67 | Example 51 | 2,762 | 0.96 |
| Example 68 | Example 52 | 2,836 | 1.00 |
| Example 69 | Example 53 | 2,401 | 0.71 |
| Example 70 | Example 54 | 2,320 | 0.59 |
| Example 71 | Example 55 | 2,532 | 0.64 |
| Example 72 | Example 56 | 2,689 | 0.77 |
| Comparative Example 43 | Comparative Example 33 | 3,882 | 2.62 |
| Comparative Example 44 | Comparative Example 34 | 4,156 | 3.36 |

TABLE 16-continued

| | | | |
|---|---|---|---|
| Comparative Example 45 | Comparative Example 35 | 2,160 | 1.74 |
| Comparative Example 46 | Comparative Example 36 | 4,442 | 2.47 |
| Comparative Example 47 | Comparative Example 37 | 3,716 | 2.43 |

| | | Properties of coating film | | |
|---|---|---|---|---|
| | | Heat-resistance | Chemical resistances | |
| Examples and Comparative Example | 60° gloss (%) | temperature of coating film (° C.) | Acid resistance ΔG value (%) | Alklai resistance ΔG value (%) |
| Example 65 | 84 | 246 | 8.9 | 8.2 |
| Example 66 | 81 | 251 | 8.2 | 7.6 |
| Example 67 | 85 | 268 | 8.6 | 7.8 |
| Example 68 | 81 | 245 | 10.9 | 10.5 |
| Example 69 | 87 | 259 | 6.8 | 5.7 |
| Example 70 | 89 | 250 | 7.0 | 5.9 |
| Example 71 | 90 | 280 | 6.3 | 5.0 |
| Example 72 | 85 | 254 | 8.1 | 7.7 |
| Comparative Example 43 | 60 | 211 | 17.5 | 15.6 |
| Comparative Example 44 | 47 | 252 | 15.5 | 15.0 |
| Comparative Example 45 | 71 | 207 | 16.4 | 14.8 |
| Comparative Example 46 | 62 | 210 | 16.8 | 15.6 |
| Comparative Example 47 | 63 | 212 | 17.2 | 15.3 |

| | Properties of coating film Hue | | | |
|---|---|---|---|---|
| Examples and Comparative Examples | L* value (−) | a* value (−) | b* value (−) | h value (°) |
| Example 65 | 47.7 | 37.5 | 38.0 | 45.4 |
| Example 66 | 41.9 | 46.8 | 35.4 | 37.1 |
| Example 67 | 42.0 | 46.6 | 38.3 | 39.4 |
| Example 68 | 37.6 | 49.2 | 34.5 | 35.0 |
| Example 69 | 47.8 | 40.6 | 36.0 | 41.6 |
| Example 70 | 49.1 | 35.7 | 44.8 | 51.4 |
| Example 71 | 43.3 | 39.5 | 41.1 | 46.1 |
| Example 72 | 49.0 | 50.0 | 32.9 | 33.3 |
| Comparative Example 43 | 47.2 | 37.3 | 40.3 | 47.2 |
| Comparative Example 44 | 41.6 | 51.4 | 26.5 | 27.3 |
| Comparative Example 45 | 55.0 | 20.9 | 45.8 | 65.5 |
| Comparative Example 46 | 48.3 | 39.1 | 39.7 | 45.4 |
| Comparative Example 47 | 48.1 | 36.8 | 40.2 | 47.5 |

TABLE 17

| | Production of resin composition Orange-based pigment | |
|---|---|---|
| Examples and Comparative Examples | Kind | Amount (part by weight) |
| Example 73 | Example 49 | 1.0 |
| Example 74 | Example 50 | 1.0 |
| Example 75 | Example 51 | 1.0 |
| Example 76 | Example 52 | 1.0 |
| Example 77 | Example 53 | 1.0 |
| Example 78 | Example 54 | 1.0 |
| Example 79 | Example 55 | 1.0 |
| Example 80 | Example 56 | 1.0 |
| Comparative Example 48 | Comparative Example 33 | 1.0 |
| Comparative Example 49 | Comparative Example 34 | 1.0 |
| Comparative Example 50 | Comparative Example 35 | 1.0 |
| Comparative Example 51 | Comparative Example 36 | 1.0 |
| Comparative Example 52 | Comparative Example 37 | 1.0 |

| | Production of resin composition Resin | |
|---|---|---|
| Examples and Comparative Examples | Kind | Amount (part by weight) |
| Example 73 | Polyvinyl chloride resin | 99.0 |
| Example 74 | Polyvinyl chloride resin | 99.0 |
| Example 75 | Polyvinyl chloride resin | 99.0 |
| Example 76 | Polyvinyl chloride resin | 99.0 |
| Example 77 | Polyvinyl chloride resin | 99.0 |
| Example 78 | Polyvinyl chloride resin | 99.0 |
| Example 79 | Polyvinyl chloride resin | 99.0 |
| Example 80 | Polyvinyl chloride resin | 99.0 |
| Comparative Example 48 | Polyvinyl chloride resin | 99.0 |
| Comparative Example 49 | Polyvinyl chloride resin | 99.0 |
| Comparative Example 50 | Polyvinyl chloride resin | 99.0 |
| Comparative Example 51 | Polyvinyl chloride resin | 99.0 |
| Comparative Example 52 | Polyvinyl chloride resin | 99.0 |

| | Production of resin composition Additives | | |
|---|---|---|---|
| Examples and Comparative Examples | Kind | Amount (part by weight) | Kneading temperature (° C.) |
| Example 73 | Calcium stearate | 2.0 | 160 |
| Example 74 | Calcium stearate | 2.0 | 160 |
| Example 75 | Calcium stearate | 2.0 | 160 |
| Example 76 | Calcium stearate | 2.0 | 160 |
| Example 77 | Calcium stearate | 2.0 | 160 |
| Example 78 | Calcium stearate | 2.0 | 160 |
| Example 79 | Calcium stearate | 2.0 | 160 |
| Example 80 | Calcium stearate | 2.0 | 160 |
| Comparative Example 48 | Calcium stearate | 2.0 | 160 |
| Comparative Example 49 | Calcium stearate | 2.0 | 160 |
| Comparative Example 50 | Calcium stearate | 2.0 | 160 |
| Comparative Example 51 | Calcium stearate | 2.0 | 160 |
| Comparative Example 52 | Calcium stearate | 2.0 | 160 |

| | Properties of resin composition | |
|---|---|---|
| Examples and Comparative Examples | Dispersion condition (−) | Heat-resistance temperatures of resin composition (° C.) |
| Example 73 | 5 | 226 |
| Example 74 | 5 | 229 |
| Example 75 | 5 | 232 |
| Example 76 | 5 | 223 |
| Example 77 | 5 | 231 |
| Example 78 | 5 | 226 |
| Example 79 | 5 | 238 |

TABLE 17-continued

| | | |
|---|---|---|
| Example 80 | 5 | 230 |
| Comparative Example 48 | 2 | 192 |
| Comparative Example 49 | 2 | 224 |
| Comparative Example 50 | 3 | 193 |
| Comparative Example 51 | 2 | 195 |
| Comparative Example 52 | 2 | 196 |

| | Properties of resin composition Hue | | | |
|---|---|---|---|---|
| Examples and Comparative Examples | L* value (−) | a* value (−) | b* value (−) | h value (°) |
| Example 73 | 49.7 | 36.3 | 38.3 | 46.5 |
| Example 74 | 43.8 | 45.3 | 35.0 | 37.7 |
| Example 75 | 43.9 | 44.9 | 38.1 | 40.3 |
| Example 76 | 39.5 | 47.8 | 34.7 | 36.0 |
| Example 77 | 49.6 | 38.6 | 35.9 | 42.9 |
| Example 78 | 51.0 | 34.1 | 44.5 | 52.5 |
| Example 79 | 45.1 | 38.2 | 41.3 | 47.2 |
| Example 80 | 50.7 | 48.2 | 32.8 | 34.2 |
| Comparative Example 48 | 49.2 | 35.6 | 40.0 | 48.3 |
| Comparative Example 49 | 43.3 | 50.0 | 26.1 | 27.6 |
| Comparative Example 50 | 56.4 | 19.4 | 45.4 | 66.9 |
| Comparative Example 51 | 50.0 | 37.3 | 39.9 | 46.9 |
| Comparative Example 52 | 49.9 | 34.9 | 40.2 | 49.0 |

TABLE 18

| | Production of green-based fine pigment Coating step with alkoxysilane, polysiloxane or silicon compound Additives | | |
|---|---|---|---|
| Examples and Comparative Examples | Kind of core particles | Kind | Amount added (part by weight) |
| Example 81 | Core particles 9 | Methyl triethoxysilane | 1.0 |
| Example 82 | Core particles 10 | Methyl trimethoxysilane | 0.5 |
| Example 83 | Core particles 11 | Phenyl triethoxysilane | 2.0 |
| Example 84 | Core particles 12 | Methyl hydrogen polysiloxane | 1.0 |
| Example 85 | Core particles 13 | Methyl triethoxysilane | 2.0 |
| Example 86 | Core particles 14 | Methyl triethoxysilane | 1.0 |
| Example 87 | Core particles 15 | Methyl triethoxysilane | 1.5 |
| Example 88 | Core particles 16 | Methyl triethoxysilane | 3.0 |
| Comparative Example 53 | Core particles 9 | — | — |
| Comparative Example 54 | Core particles 9 | Methyl triethoxysilane | 1.0 |
| Comparative Example 55 | Core particles 9 | Methyl triethoxysilane | 0.005 |
| Comparative Example 56 | Core particles 9 | Methyl triethoxysilane | 1.0 |
| Comparative Example 57 | Core particles 9 | γ-aminopropyl triethoxysilane | 1.0 |

| | Production of green-based fine pigment Coating step with alkoxysilane, polysiloxane or silicon compound | | |
|---|---|---|---|
| Examples and Comparative Examples | Edge runner treatment | | Coating amount (calculated as Si) |
| | Linear load (N/cm) | Linear load (Kg/cm) | Time (min.) |
| Example 81 | 392 | 40 | 30 | 0.15 |
| Example 82 | 588 | 60 | 20 | 0.10 |
| Example 83 | 490 | 50 | 20 | 0.26 |
| Example 84 | 294 | 30 | 30 | 0.42 |
| Example 85 | 588 | 60 | 20 | 0.30 |
| Example 86 | 441 | 45 | 20 | 0.15 |
| Example 87 | 735 | 75 | 20 | 0.23 |
| Example 88 | 441 | 45 | 30 | 0.45 |
| Comparative Example 53 | — | — | — | — |
| Comparative Example 54 | 588 | 60 | 20 | 0.15 |
| Comparative Example 55 | 588 | 60 | 20 | $6 \times 10^{-4}$ |
| Comparative Example 56 | 588 | 60 | 20 | 0.15 |
| Comparative Example 57 | 588 | 60 | 20 | 0.12 |

| | Production of green-based fine pigment Adhesion step with organic blue pigment Organic blue pigment | |
|---|---|---|
| Examples and Comparative Examples | Kind | Amount adhered (part by weight) |
| Example 81 | A | 10.0 |
| Example 82 | B | 7.5 |
| Example 83 | C | 15.0 |
| Example 84 | A | 20.0 |
| Example 85 | A | 15.0 |
| Example 86 | A | 12.0 |
| Example 87 | A | 7.5 |
| Example 88 | A | 10.0 |
| Comparative Example 53 | A | 10.0 |
| Comparative Example 54 | — | — |
| Comparative Example 55 | A | 10.0 |
| Comparative Example 56 | A | 1.0 |
| Comparative Example 57 | A | 10.0 |

| | Production of green-based fine pigment Adhesion step with organic blue pigment | | |
|---|---|---|---|
| Examples and Comparative Examples | Edge runner treatment | | Amount adhered calculated as C |
| | Linear load (N/cm) | Linear load (Kg/cm) | Time (min.) |
| Example 81 | 588 | 60 | 20 | 6.04 |
| Example 82 | 441 | 45 | 30 | 4.60 |
| Example 83 | 735 | 75 | 20 | 8.62 |
| Example 84 | 588 | 60 | 20 | 11.09 |
| Example 85 | 294 | 30 | 30 | 8.61 |
| Example 86 | 441 | 45 | 20 | 7.09 |
| Example 87 | 490 | 50 | 20 | 4.61 |

TABLE 18-continued

| | | | | |
|---|---|---|---|---|
| Example 88 | 588 | 60 | 20 | 6.05 |
| Comparative Example 53 | 588 | 60 | 20 | 6.05 |
| Comparative Example 54 | — | — | — | — |
| Comparative Example 55 | 588 | 60 | 20 | 6.03 |
| Comparative Example 56 | 588 | 60 | 20 | 0.60 |
| Comparative Example 57 | 588 | 60 | 20 | 6.03 |

TABLE 19

| | Properties of green-based fine pigment | | |
|---|---|---|---|
| Examples and Comparative Examples | Average major axial diameter (μm) | Average minor axial diameter (μm) | Aspect ratio (—) |
| Example 81 | 0.0825 | 0.0100 | 8.3:1 |
| Example 82 | 0.0580 | 0.0097 | 6.0:1 |
| Example 83 | 0.0777 | 0.0125 | 6.2:1 |
| Example 84 | 0.0918 | 0.0188 | 4.9:1 |
| Example 85 | 0.0831 | 0.0102 | 8.1:1 |
| Example 86 | 0.0585 | 0.0101 | 5.8:1 |
| Example 87 | 0.0777 | 0.0125 | 6.2:1 |
| Example 88 | 0.0910 | 0.0185 | 4.9:1 |
| Comparative Example 53 | 0.0814 | 0.0096 | 8.5:1 |
| Comparative Example 54 | 0.0813 | 0.0096 | 8.5:1 |
| Comparative Example 55 | 0.0815 | 0.0097 | 8.4:1 |
| Comparative Example 56 | 0.0816 | 0.0097 | 8.4:1 |
| Comparative Example 57 | 0.0815 | 0.0097 | 8.4:1 |

| | Properties of green-based fine pigment | | |
|---|---|---|---|
| Examples and Comparative Examples | Geometrical standard deviation value (—) | BET specific surface area value (m²/g) | Al content[*1] within particles (wt. %) |
| Example 81 | 1.41 | 142.2 | — |
| Example 82 | 1.36 | 189.6 | 2.56 |
| Example 83 | 1.37 | 143.8 | 1.87 |
| Example 84 | 1.41 | 96.0 | — |
| Example 85 | 1.42 | 148.1 | — |
| Example 86 | 1.36 | 180.5 | 2.56 |
| Example 87 | 1.37 | 149.6 | 1.87 |
| Example 88 | 1.41 | 106.2 | — |
| Comparative Example 53 | — | 164.7 | — |
| Comparative Example 54 | 1.41 | 149.2 | — |
| Comparative Example 55 | — | 160.1 | — |
| Comparative Example 56 | 1.41 | 147.6 | — |
| Comparative Example 57 | — | 161.3 | — |

| | Properties of green-based fine pigment Composite oxide hydroxide | |
|---|---|---|
| Examples and Comparative Examples | Coating amount of Al[*1] (calculated as Al) (wt. %) | Coating amount of Fe[*1] (calculated as Fe) (wt. %) |
| Example 81 | — | — |
| Example 82 | — | — |

TABLE 19-continued

| | | |
|---|---|---|
| Example 83 | 1.13 | 0.64 |
| Example 84 | — | — |
| Example 85 | — | — |
| Example 86 | — | — |
| Example 87 | 1.13 | 0.64 |
| Example 88 | — | — |
| Comparative Example 53 | — | — |
| Comparative Example 54 | — | — |
| Comparative Example 55 | — | — |
| Comparative Example 56 | — | — |
| Comparative Example 57 | — | — |

| | Properties of green-based fine pigment Hue | | | |
|---|---|---|---|---|
| Examples and Comparative Examples | L* value (—) | a* value (—) | b* value (—) | h value (°) |
| Example 81 | 31.9 | −14.2 | 3.8 | 165.0 |
| Example 82 | 33.2 | −11.2 | 5.2 | 155.1 |
| Example 83 | 28.6 | −16.8 | 0.6 | 178.0 |
| Example 84 | 26.5 | −16.9 | −1.1 | 183.7 |
| Example 85 | 30.1 | −14.2 | −1.9 | 187.6 |
| Example 86 | 31.2 | −18.2 | 0.4 | 178.7 |
| Example 87 | 35.3 | −10.8 | 6.6 | 148.6 |
| Example 88 | 27.4 | −12.0 | 9.1 | 142.8 |
| Comparative Example 53 | 30.9 | −9.3 | 4.6 | 153.7 |
| Comparative Example 54 | 50.2 | 29.8 | 54.0 | 61.1 |
| Comparative Example 55 | 31.2 | −8.3 | 4.1 | 153.7 |
| Comparative Example 56 | 31.4 | 10.5 | 30.4 | 70.9 |
| Comparative Example 57 | 30.3 | −8.0 | 4.4 | 151.2 |

| | Properties of green-based fine pigment | | Chemical resistances | |
|---|---|---|---|---|
| Examples and Comparative Examples | Tinting strength (%) | Hiding power (cm²/g) | Acid resistance ΔE* value (—) | Alkali resistance ΔE* value (—) |
| Example 81 | 133 | 177 | 1.26 | 1.12 |
| Example 82 | 126 | 152 | 1.05 | 1.00 |
| Example 83 | 142 | 176 | 0.98 | 0.91 |
| Example 84 | 148 | 215 | 1.23 | 1.02 |
| Example 85 | 146 | 175 | 1.14 | 1.03 |
| Example 86 | 140 | 150 | 1.01 | 0.95 |
| Example 87 | 131 | 158 | 0.95 | 0.87 |
| Example 88 | 134 | 211 | 1.23 | 0.97 |
| Comparative Example 53 | 110 | 208 | 2.04 | 1.83 |
| Comparative Example 54 | 104 | 172 | 2.00 | 1.81 |
| Comparative Example 55 | 112 | 203 | 2,04 | 1.81 |
| Comparative Example 56 | 108 | 172 | 1.97 | 1.78 |
| Comparative Example 57 | 111 | 202 | 1.99 | 1.80 |

| | Properties of green-based fine pigment | |
|---|---|---|
| Examples and Comparative Examples | Heat resistance temperature (° C.) | Desorption percentage of organic pigment (%) |
| Example 81 | 223 | 6.8 |
| Example 82 | 259 | 6.1 |

TABLE 19-continued

| Example 83 | 283 | 7.6 |
|---|---|---|
| Example 84 | 229 | 8.1 |
| Example 85 | 243 | 4.7 |
| Example 86 | 267 | 4.6 |
| Example 87 | 284 | 2.9 |
| Example 88 | 239 | 3.4 |
| Comparative Example 53 | 193 | 68.3 |
| Comparative Example 54 | 197 | — |
| Comparative Example 55 | 194 | 49.3 |
| Comparative Example 56 | 197 | 5.7 |
| Comparative Example 57 | 198 | 46.6 |

*1: Coating amount on core particles

TABLE 20

| Examples and Comparative Examples | Production of paint Kind of green-based fine pigment | Properties of paint Viscosity (cP) | Properties of paint Storage stability ΔE* value (-) |
|---|---|---|---|
| Example 89 | Example 81 | 1,690 | 0.93 |
| Example 90 | Example 82 | 1,741 | 0.88 |
| Example 91 | Example 83 | 1,997 | 0.77 |
| Example 92 | Example 84 | 1,796 | 0.93 |
| Example 93 | Example 85 | 2,124 | 0.61 |
| Example 94 | Example 86 | 1,920 | 0.52 |
| Example 95 | Example 87 | 2,560 | 0.47 |
| Example 96 | Example 88 | 2,051 | 0.64 |
| Comparative Example 58 | Comparative Example 53 | 10,240 | 2.24 |
| Comparative Example 59 | Comparative Example 54 | 2,560 | 1.58 |
| Comparative Example 60 | Comparative Example 55 | 8,960 | 2.03 |
| Comparative Example 61 | Comparative Example 56 | 2,816 | 1.52 |
| Comparative Example 62 | Comparative Example 57 | 6,656 | 2.00 |

| Examples and Comparative Examples | 60° gloss (%) | Properties of coating film Hue L* value (-) | a* value (-) | b* value (-) | h value (°) |
|---|---|---|---|---|---|
| Example 89 | 81.6 | 33.3 | −20.2 | 4.8 | 166.6 |
| Example 90 | 85.3 | 35.4 | −17.6 | 6.0 | 161.2 |
| Example 91 | 88.2 | 30.1 | −22.4 | 1.6 | 175.9 |
| Example 92 | 81.3 | 27.5 | −22.9 | −0.8 | 182.0 |
| Example 93 | 86.7 | 32.2 | −21.5 | −1.1 | 182.9 |
| Example 94 | 88.1 | 33.8 | −24.1 | 1.3 | 176.9 |
| Example 95 | 91.6 | 36.4 | −16.9 | 2.5 | 171.6 |
| Example 96 | 85.4 | 29.6 | −20.1 | 10.1 | 153.3 |
| Comparative Example 58 | 65.2 | 32.8 | −10.1 | 6.6 | 146.8 |
| Comparative Example 59 | 79.8 | 54.3 | 28.6 | 62.3 | 65.3 |
| Comparative Example 60 | 68.9 | 33.9 | −11.6 | 5.9 | 153.0 |
| Comparative Example 61 | 80.4 | 40.3 | 28.4 | 40.1 | 54.7 |
| Comparative Example 62 | 68.5 | 31.1 | −12.4 | 6.1 | 153.8 |

TABLE 20-continued

| Examples and Comparative Examples | Properties of coating film Chemical resistances Acid resistsnce ΔG value (-) | Alkali resistance ΔG value (-) |
|---|---|---|
| Example 89 | 8.4 | 7.6 |
| Example 90 | 8.0 | 7.1 |
| Example 91 | 7.6 | 6.8 |
| Example 92 | 9.1 | 8.7 |
| Example 93 | 6.7 | 5.5 |
| Example 94 | 6.4 | 5.2 |
| Example 95 | 4.3 | 3.9 |
| Example 96 | 6.0 | 5.6 |
| Comparative Example 58 | 14.9 | 13.2 |
| Comparative Example 59 | 13.1 | 12.6 |
| Comparative Example 60 | 14.4 | 12.4 |
| Comparative Example 61 | 12.8 | 12.1 |
| Comparative Example 62 | 14.5 | 12.4 |

| Examples and Comparative Examples | Properties of coating film Heat resistance temperature (° C.) | Transparency (linear absorption) (μm⁻¹) |
|---|---|---|
| Example 89 | 241 | 0.0296 |
| Example 90 | 265 | 0.0182 |
| Example 91 | 285 | 0.0262 |
| Example 92 | 247 | 0.0360 |
| Example 93 | 258 | 0.0251 |
| Example 94 | 274 | 0.0177 |
| Example 95 | 286 | 0.0194 |
| Example 96 | 252 | 0.0312 |
| Comparative Example 58 | 213 | 0.0892 |
| Comparative Example 59 | 215 | 0.0532 |
| Comparative Example 60 | 214 | 0.0823 |
| Comparative Example 61 | 219 | 0.0666 |
| Comparative Example 62 | 215 | 0.0834 |

TABLE 21

| Examples and Comparative Examples | Production of water-based paint Kind of green-based fine pigment | Properties of paint Viscosity (cP) | Properties of paint Storage stability ΔE* value (-) |
|---|---|---|---|
| Example 97 | Example 81 | 2,867 | 1.00 |
| Example 98 | Example 82 | 3,482 | 0.96 |
| Example 99 | Example 83 | 3,200 | 0.87 |
| Example 100 | Example 84 | 3,294 | 1.04 |
| Example 101 | Example 85 | 3,123 | 0.71 |
| Example 102 | Example 86 | 2,944 | 0.61 |
| Example 103 | Example 87 | 2,816 | 0.55 |
| Example 104 | Example 88 | 2,731 | 0.72 |
| Comparative Example 63 | Comparative Example 53 | 11,385 | 2.38 |
| Comparative Example 64 | Comparative Example 54 | 3,482 | 1.69 |
| Comparative Example 65 | Comparative Example 55 | 12,800 | 2.26 |

TABLE 21-continued

| | | | |
|---|---|---|---|
| Comparative Example 66 | Comparative Example 56 | 3,123 | 1.65 |
| Comparative Example 67 | Comparative Example 57 | 6,400 | 2.21 |

Properties of coating film

Hue

| Examples and Comparative Examples | 60° gloss (%) | L* value (-) | a* value (-) | b* value (-) | h value (°) |
|---|---|---|---|---|---|
| Example 97 | 77.8 | 33.5 | −20.0 | 4.2 | 168.1 |
| Example 98 | 80.6 | 35.7 | −17.5 | 5.6 | 162.3 |
| Example 99 | 83.2 | 30.6 | −22.2 | 1.0 | 177.4 |
| Example 100 | 76.5 | 27.9 | −22.7 | −0.9 | 182.3 |
| Example 101 | 82.9 | 33.2 | −21.4 | −1.2 | 183.2 |
| Example 102 | 84.0 | 34.2 | −24.0 | 1.4 | 176.7 |
| Example 103 | 87.4 | 36.9 | −16.7 | 2.6 | 171.2 |
| Example 104 | 81.1 | 29.7 | −20.4 | 10.0 | 153.9 |
| Comparative Example 63 | 60.1 | 33.1 | −10.0 | 6.5 | 147.0 |
| Comparative Example 64 | 73.2 | 55.3 | 28.3 | 62.9 | 65.8 |
| Comparative Example 65 | 63.6 | 34.4 | −11.5 | 6.1 | 152.1 |
| Comparative Example 66 | 74.2 | 40.8 | 27.9 | 41.4 | 56.0 |
| Comparative Example 67 | 62.3 | 31.7 | −12.1 | 6.3 | 152.5 |

Properties of coating film Chemical resistance

| Examples and Comparative Examples | Acid resistance ΔG value (-) | Alkali resistance ΔG value (-) |
|---|---|---|
| Example 97 | 8.6 | 8.1 |
| Example 98 | 8.9 | 7.4 |
| Example 99 | 8.0 | 7.2 |
| Example 100 | 9.4 | 9.0 |
| Example 101 | 7.1 | 5.9 |
| Example 102 | 6.9 | 5.7 |
| Example 103 | 5.0 | 4.3 |
| Example 104 | 6.7 | 6.1 |
| Comparative Example 63 | 15.7 | 14.1 |
| Comparative Example 64 | 14.0 | 13.5 |
| Comparative Example 65 | 15.5 | 13.4 |
| Comparative Example 66 | 13.9 | 13.0 |
| Comparative Example 67 | 15.2 | 13.3 |

Properties of coating film

| Examples and Comparative Examples | Heat resistance temperature (° C.) | Transparency (linear absorption) ($\mu m^{-1}$) |
|---|---|---|
| Example 97 | 240 | 0.0314 |
| Example 98 | 262 | 0.0201 |
| Example 99 | 284 | 0.0285 |
| Example 100 | 245 | 0.0380 |
| Example 101 | 253 | 0.0262 |
| Example 102 | 271 | 0.0189 |
| Example 103 | 285 | 0.0211 |
| Example 104 | 251 | 0.0331 |
| Comparative Example 63 | 207 | 0.0951 |
| Comparative Example 64 | 210 | 0.0560 |
| Comparative Example 65 | 208 | 0.0853 |
| Comparative Example 66 | 214 | 0.0696 |
| Comparative Example 67 | 210 | 0.0854 |

TABLE 22

| Examples and Comparative Examples | Production of resin composition Kind of green-based fine pigment | Properties of resin composition Dispersion condition (-) |
|---|---|---|
| Example 105 | Example 81 | 4 |
| Example 106 | Example 82 | 5 |
| Example 107 | Example 83 | 5 |
| Example 108 | Example 84 | 4 |
| Example 109 | Example 85 | 5 |
| Example 110 | Example 86 | 5 |
| Example 111 | Example 87 | 5 |
| Example 112 | Example 88 | 5 |
| Comparative Example 68 | Comparative Example 53 | 2 |
| Comparative Example 69 | Comparative Example 54 | 3 |
| Comparative Example 70 | Comparative Example 55 | 2 |
| Comparative Example 71 | Comparative Example 56 | 2 |
| Comparative Example 72 | Comparative Example 57 | 2 |

Properties of resin composition Hue

| Examples and Comparative Examples | L* value (-) | a* value (-) | b* value (-) | h value (°) |
|---|---|---|---|---|
| Example 105 | 33.2 | −17.2 | 6.6 | 159.0 |
| Example 106 | 34.1 | −15.6 | 7.1 | 155.5 |
| Example 107 | 29.8 | −18.6 | 3.2 | 170.2 |
| Example 108 | 27.9 | −19.5 | 0.7 | 177.9 |
| Example 109 | 32.0 | −19.8 | −1.4 | 184.0 |
| Example 110 | 32.3 | −21.6 | 2.6 | 173.1 |
| Example 111 | 36.3 | −14.2 | 8.9 | 147.9 |
| Example 112 | 29.7 | −15.1 | 10.8 | 144.4 |
| Comparative Example 68 | 32.8 | −13.6 | 6.6 | 154.1 |
| Comparative Example 69 | 52.3 | 27.0 | 57.3 | 64.8 |
| Comparative Example 70 | 33.2 | −12.2 | 6.3 | 152.7 |
| Comparative Example 71 | 34.3 | 6.6 | 34.2 | 79.1 |
| Comparative Example 72 | 32.1 | −12.8 | 6.6 | 152.7 |

Properties of resin composition

| Examples and Comparative Examples | Heat resistance temperature (° C.) | Transparency (linear absorption) ($\mu m^{-1}$) |
|---|---|---|
| Example 105 | 225 | 0.0312 |
| Example 106 | 234 | 0.0199 |
| Example 107 | 238 | 0.0274 |
| Example 108 | 227 | 0.0368 |
| Example 109 | 231 | 0.0261 |
| Example 110 | 235 | 0.0183 |
| Example 111 | 240 | 0.0200 |
| Example 112 | 231 | 0.0320 |
| Comparative Example 68 | 195 | 0.0919 |
| Comparative Example 69 | 200 | 0.0550 |

TABLE 22-continued

| | | |
|---|---|---|
| Comparative Example 70 | 197 | 0.0851 |
| Comparative Example 71 | 202 | 0.0688 |
| Comparative Example 72 | 198 | 0.0857 |

TABLE 23

| | | Production of orange-based fine pigment Coating step with alkoxysilane, polysiloxane or silicon compound Additives | |
|---|---|---|---|
| Examples and Comparative Examples | Kind of core particles | Kind | Amount added (part by weight) |
| Example 113 | Core particles 9 | Methyl triethopxysilane | 2.0 |
| Example 114 | Core particles 10 | Methyl trimethoxysilane | 1.0 |
| Example 115 | Core particles 11 | Phenyl triethoxysilane | 1.5 |
| Example 116 | Core particles 12 | Methyl hydrogen polysiloxane | 1.0 |
| Example 117 | Core particles 13 | Methyl triethoxysilane | 2.0 |
| Example 118 | Core particles 14 | Methyl triethoxysilane | 1.0 |
| Example 119 | Core particles 15 | Methyl triethoxysilane | 1.5 |
| Example 120 | Core particles 16 | Methyl triethoxysilane | 2.0 |
| Comparative Example 73 | Core particles 9 | — | — |
| Comparative Example 74 | Core particles 9 | Methyl triethoxysilane | 1.0 |
| Comparative Example 75 | Core particles 9 | Methyl triethoxysilane | 0.005 |
| Comparative Example 76 | Core particles 9 | Methyl triethoxysilane | 1.0 |
| Comparative Example 77 | Core particles 9 | γ-aminopropyl triethoxysilane | 1.0 |

| | Production of orange-based fine pigment Coating step with alkoxysilane, polysiloxane or silicon compound | | |
|---|---|---|---|
| Examples and Comparative Examples | Edge runner treatment | | Coating amount (calculated as Si) |
| | Linear load | Time | |
| | (N/cm) (Kg/cm) | (min.) | (wt. %) |
| Example 113 | 588   60 | 20 | 0.30 |
| Example 114 | 588   60 | 20 | 0.19 |
| Example 115 | 441   45 | 30 | 0.20 |
| Example 116 | 588   60 | 20 | 0.44 |
| Example 117 | 294   30 | 30 | 0.30 |
| Example 118 | 588   60 | 20 | 0.15 |
| Example 119 | 441   45 | 30 | 0.23 |
| Example 120 | 588   60 | 20 | 0.30 |
| Comparative Example 73 | —   — | — | — |
| Comparative Example 74 | 588   60 | 20 | 0.15 |
| Comparative Example 75 | 588   60 | 20 | $6 \times 10^{-4}$ |
| Comparative Example 76 | 588   60 | 20 | 0.15 |
| Comparative Example 77 | 588   60 | 20 | 0.12 |

| | Production of orange-based fine pigment Adhesion step with organic red pigment Organic red pigment | |
|---|---|---|
| Examples and Comparative Examples | Kind | Amount adhered (part by weight) |
| Example 113 | D | 10.0 |
| Example 114 | E | 15.0 |
| Example 115 | D | 20.0 |
| Example 116 | E | 15.0 |
| Example 117 | D | 10.0 |
| Example 118 | E | 5.0 |
| Example 119 | D | 10.0 |
| Example 120 | E | 25.0 |
| Comparative Example 73 | D | 10.0 |
| Comparative Example 74 | D | 100.0 |
| Comparative Example 75 | D | 10.0 |
| Comparative Example 76 | D | 0.5 |
| Comparative Example 77 | D | 10.0 |

| | Production of orange-based fine pigment Adhesion step with organic red pigment | | |
|---|---|---|---|
| Examples and Comparative Examples | Linear runner treatment | | Amount adhered (calculated as C) |
| | Linear load | Time | |
| | (N/cm) (Kg/cm) | (min.) | (wt. %) |
| Example 113 | 588   60 | 20 | 6.93 |
| Example 114 | 294   30 | 30 | 10.00 |
| Example 115 | 441   45 | 30 | 12.77 |
| Example 116 | 294   30 | 30 | 9.98 |
| Example 117 | 588   60 | 20 | 6.91 |
| Example 118 | 294   30 | 30 | 3.62 |
| Example 119 | 441   45 | 20 | 6.94 |
| Example 120 | 588   60 | 20 | 15.33 |
| Comparative Example 73 | 588   60 | 20 | 6.92 |
| Comparative Example 74 | 588   60 | 20 | 38.31 |
| Comparative Example 75 | 588   60 | 20 | 6.90 |
| Comparative Example 76 | 588   60 | 20 | 0.34 |
| Comparative Example 77 | 588   60 | 20 | 6.91 |

TABLE 24

| | Properties of orange-based fine pigment | | |
|---|---|---|---|
| Examples and Comparative Examples | Average major axial diameter (μm) | Average minor axial diameter (μm) | Aspect ratio (—) |
| Example 113 | 0.0824 | 0.0098 | 8.4:1 |
| Example 114 | 0.0585 | 0.0100 | 5.9:1 |
| Example 115 | 0.0783 | 0.0127 | 6.2:1 |
| Example 116 | 0.0913 | 0.0186 | 4.9:1 |
| Example 117 | 0.0829 | 0.0102 | 8.1:1 |
| Example 118 | 0.0579 | 0.0097 | 6.0:1 |
| Example 119 | 0.0777 | 0.0125 | 6.2:1 |

TABLE 24-continued

| Examples and Comparative Examples | | | |
|---|---|---|---|
| Example 120 | 0.0919 | 0.0193 | 4.8:1 |
| Comparative Example 73 | 0.0815 | 0.0096 | 8.5:1 |
| Comparative Example 74 | 0.0849 | 0.0107 | 7.9:1 |
| Comparative Example 75 | 0.0816 | 0.0097 | 8.4:1 |
| Comparative Example 76 | 0.0814 | 0.0096 | 8.5:1 |
| Comparative Example 77 | 0.0817 | 0.0097 | 8.4:1 |

| Examples and Comparative Examples | Properties of orange-based fine pigment | | |
|---|---|---|---|
| | Geometrical standard deviation value (−) | BET specific surface area value (m²/g) | Al content*1 within particles (wt. %) |
| Example 113 | 1.41 | 151.2 | — |
| Example 114 | 1.35 | 190.6 | 2.56 |
| Example 115 | 1.36 | 150.6 | 1.87 |
| Example 116 | 1.41 | 100.6 | — |
| Example 117 | 1.41 | 152.6 | — |
| Example 118 | 1.35 | 184.3 | 2.56 |
| Example 119 | 1.37 | 152.1 | 1.87 |
| Example 120 | 1.42 | 111.1 | — |
| Comparative Example 73 | — | 135.8 | — |
| Comparative Example 74 | — | 146.8 | — |
| Comparative Example 75 | — | 140.4 | — |
| Comparative Example 76 | 1.41 | 141.2 | — |
| Comparative Example 77 | — | 146.6 | — |

| Examples and Comparative Examples | Properties of orange-based fine pigment Composite oxide hydroxide | |
|---|---|---|
| | Coating amount of Al*1 (calculated as Al) (wt. %) | Coating amount of Fe*1 (calculated as Fe) (wt. %) |
| Example 113 | — | — |
| Example 114 | — | — |
| Example 115 | 1.13 | 0.64 |
| Example 116 | — | — |
| Example 117 | — | — |
| Example 118 | — | — |
| Example 119 | 1.13 | 0.64 |
| Example 120 | — | — |
| Comparative Example 73 | — | — |
| Comparative Example 74 | — | — |
| Comparative Example 75 | — | — |
| Comparative Example 76 | — | — |
| Comparative Example 77 | — | — |

| Example and Comparative Examples | Properties of orange-based fine pigment Hue | | | |
|---|---|---|---|---|
| | L* value (−) | a* value (−) | b* value (−) | h value (°) |
| Example 113 | 34.6 | 49.1 | 38.0 | 37.7 |
| Example 114 | 35.1 | 49.4 | 36.8 | 36.7 |
| Example 115 | 34.4 | 49.3 | 33.7 | 34.4 |
| Example 116 | 32.1 | 50.1 | 35.5 | 35.3 |
| Example 117 | 35.6 | 49.2 | 37.6 | 37.4 |
| Example 118 | 43.2 | 40.6 | 42.4 | 46.2 |
| Example 119 | 38.9 | 48.4 | 38.9 | 38.8 |
| Example 120 | 31.0 | 50.9 | 31.1 | 31.4 |
| Comparative Example 73 | 35.1 | 46.7 | 40.6 | 41.0 |
| Comparative Example 74 | 28.3 | 51.2 | 23.4 | 24.6 |
| Comparative Example 75 | 34.9 | 47.2 | 39.9 | 40.2 |
| Comparative Example 76 | 46.2 | 32.9 | 51.4 | 57.4 |
| Comparative Example 77 | 34.8 | 47.3 | 39.7 | 40.0 |

| Examples and Comparative Examples | Properties of orange-based fine pigment | | Chemical resistance | |
|---|---|---|---|---|
| | Tinting strength (%) | Hiding power (cm²/g) | Acid resistance ΔE* value (−) | Alkali resistance ΔE* value (−) |
| Example 113 | 128 | 180 | 1.27 | 1.18 |
| Example 114 | 132 | 152 | 1.08 | 1.00 |
| Example 115 | 136 | 172 | 0.99 | 0.96 |
| Example 116 | 126 | 223 | 1.29 | 1.21 |
| Example 117 | 131 | 176 | 1.16 | 1.09 |
| Example 118 | 130 | 145 | 1.06 | 0.98 |
| Example 119 | 134 | 161 | 0.94 | 0.91 |
| Example 120 | 133 | 224 | 1.21 | 1.13 |
| Comparative Example 73 | 100 | 197 | 2.04 | 1.81 |
| Comparative Example 74 | 116 | 266 | 1.74 | 1.66 |
| Comparative Example 75 | 102 | 190 | 2.00 | 1.76 |
| Comparative Example 76 | 106 | 174 | 1.82 | 1.71 |
| Comparative Example 77 | 104 | 189 | 1.99 | 1.74 |

| Examples and Comparative Examples | Properties of orange-based fine pigment | |
|---|---|---|
| | Heat resistance temperature (° C.) | Desorption percentage of organic pigment (%) |
| Example 113 | 224 | 7.1 |
| Example 114 | 253 | 8.3 |
| Example 115 | 276 | 9.2 |
| Example 116 | 226 | 8.7 |
| Example 117 | 238 | 3.9 |
| Example 118 | 267 | 2.2 |
| Example 119 | 281 | 2.6 |
| Example 120 | 230 | 4.8 |
| Comparative Example 73 | 194 | 69.4 |
| Comparative Example 74 | 231 | 60.1 |
| Comparative Example 75 | 197 | 57.2 |
| Comparative Example 76 | 200 | 6.8 |
| Comparative Example 77 | 199 | 56.6 |

*1: Coating amount on core particles

TABLE 25

| Examples and Comparative Examples | Production of paint Kind of orange-based fine pigment | Properties of paint Viscosity (cP) | Properties of paint Storage stability ΔE* value (−) |
|---|---|---|---|
| Example 121 | Example 113 | 3,580 | 0.96 |
| Example 122 | Example 114 | 3,180 | 0.92 |
| Example 123 | Example 115 | 2,863 | 0.81 |
| Example 124 | Example 116 | 3,265 | 0.99 |
| Example 125 | Example 117 | 3,384 | 0.93 |
| Example 126 | Example 118 | 3,062 | 0.90 |
| Example 127 | Example 119 | 3,056 | 0.77 |
| Example 128 | Example 120 | 2,786 | 0.97 |
| Comparative Example 78 | Comparative Example 73 | 12,560 | 2.34 |
| Comparative Example 79 | Comparative Example 74 | 3,183 | 1.60 |
| Comparative Example 80 | Comparative Example 75 | 2,965 | 2.30 |
| Comparative Example 81 | Comparative Example 76 | 2,872 | 1.65 |
| Comparative Example 82 | Comparative Example 77 | 3,682 | 2.28 |

| Examples and Comparative Examples | 60° gloss (%) | Properties of coating film Hue L* value (−) | a* value (−) | b* value (−) | h value (°) |
|---|---|---|---|---|---|
| Example 121 | 81.7 | 35.8 | 48.3 | 38.0 | 38.2 |
| Example 122 | 86.1 | 36.4 | 48.5 | 36.6 | 37.0 |
| Example 123 | 88.9 | 36.3 | 48.6 | 33.8 | 34.8 |
| Example 124 | 81.2 | 33.6 | 49.3 | 35.7 | 35.9 |
| Example 125 | 87.0 | 36.8 | 48.6 | 37.6 | 37.7 |
| Example 126 | 88.8 | 44.1 | 39.8 | 42.3 | 46.7 |
| Example 127 | 92.3 | 40.3 | 47.7 | 39.1 | 39.3 |
| Example 128 | 85.7 | 32.3 | 50.1 | 30.9 | 31.7 |
| Comparative Example 78 | 64.6 | 36.6 | 45.3 | 40.2 | 41.6 |
| Comparative Example 79 | 58.5 | 29.9 | 50.2 | 23.5 | 25.1 |
| Comparative Example 80 | 68.0 | 36.3 | 46.3 | 39.4 | 40.4 |
| Comparative Example 81 | 80.3 | 47.6 | 31.8 | 51.1 | 58.1 |
| Comparative Example 82 | 68.9 | 36.1 | 46.3 | 39.2 | 40.3 |

| Examples and Comparative Examples | Properties of coating film Chemical resistances Acid resistance ΔG value (−) | Alkali resistance ΔG value (−) |
|---|---|---|
| Example 121 | 8.9 | 8.1 |
| Example 122 | 8.4 | 7.6 |
| Example 123 | 7.7 | 6.8 |
| Example 124 | 9.2 | 8.4 |
| Example 125 | 8.5 | 7.8 |
| Example 126 | 8.2 | 7.1 |
| Example 127 | 5.1 | 4.6 |
| Example 128 | 8.7 | 7.9 |
| Comparative Example 78 | 15.1 | 14.7 |
| Comparative Example 79 | 12.6 | 12.1 |
| Comparative Example 80 | 14.7 | 14.2 |
| Comparative Example 81 | 13.4 | 13.6 |
| Comparative Example 82 | 14.7 | 14.0 |

| Examples and Comparative Examples | Properties of coating film Heat resistance temperature (° C.) | Transparency (linear absorption) (μm⁻¹) |
|---|---|---|
| Example 121 | 243 | 0.0300 |
| Example 122 | 261 | 0.0186 |
| Example 123 | 281 | 0.0260 |
| Example 124 | 246 | 0.0362 |
| Example 125 | 254 | 0.0261 |
| Example 126 | 273 | 0.0170 |
| Example 127 | 283 | 0.0199 |
| Example 128 | 248 | 0.0332 |
| Comparative Example 78 | 208 | 0.0872 |
| Comparative Example 79 | 246 | 0.1032 |
| Comparative Example 80 | 215 | 0.0828 |
| Comparative Example 81 | 216 | 0.0296 |
| Comparative Example 82 | 217 | 0.0816 |

TABLE 26

| Examples and Comparative Examples | Production of water-based paint Kind of orange-based fine pigment | Properties of paint Viscosity (cP) | Properties of paint Storage Stability ΔE* value (−) |
|---|---|---|---|
| Example 129 | Example 113 | 3,670 | 1.03 |
| Example 130 | Example 114 | 3,281 | 0.98 |
| Example 131 | Example 115 | 3,659 | 0.88 |
| Example 132 | Example 116 | 3,263 | 1.05 |
| Example 133 | Example 117 | 3,486 | 1.00 |
| Example 134 | Example 118 | 3,365 | 0.96 |
| Example 135 | Example 119 | 4,163 | 0.81 |
| Example 136 | Example 120 | 3,887 | 1.04 |
| Comparative Example 83 | Comparative Example 73 | 11,197 | 2.45 |
| Comparative Example 84 | Comparative Example 74 | 3,663 | 1.69 |
| Comparative Example 85 | Comparative Example 75 | 2,816 | 2.41 |
| Comparative Example 86 | Comparative Example 76 | 3,162 | 1.72 |
| Comparative Example 87 | Comparative Example 77 | 3,386 | 2.38 |

| Examples and Comparative Examples | 60° gloss (%) | Properties of coating film Hue L* value (−) | a* value (−) | b* value (−) | h value (°) |
|---|---|---|---|---|---|
| Example 129 | 77.5 | 35.9 | 48.8 | 38.3 | 38.1 |
| Example 130 | 81.4 | 36.6 | 48.2 | 36.6 | 37.2 |
| Example 131 | 84.2 | 36.2 | 48.5 | 33.8 | 34.9 |
| Example 132 | 76.9 | 33.5 | 49.6 | 35.8 | 35.8 |
| Example 133 | 81.8 | 36.6 | 48.9 | 37.9 | 37.8 |
| Example 134 | 83.9 | 43.9 | 39.8 | 42.0 | 46.5 |
| Example 135 | 87.5 | 40.6 | 48.0 | 39.3 | 39.3 |
| Example 136 | 81.3 | 32.6 | 50.1 | 31.0 | 31.7 |
| Comparative Example 83 | 60.1 | 36.8 | 45.8 | 40.4 | 41.4 |
| Comparative Example 84 | 53.4 | 29.8 | 50.3 | 23.7 | 25.2 |
| Comparative Example 85 | 63.0 | 36.3 | 46.6 | 39.6 | 40.4 |

TABLE 26-continued

| | | | | | |
|---|---|---|---|---|---|
| Comparative Example 86 | 75.8 | 47.1 | 32.2 | 51.6 | 58.0 |
| Comparative Example 87 | 64.0 | 36.3 | 46.6 | 39.3 | 40.1 |

| | Properties of coating film Chemical resistances | |
|---|---|---|
| Examples and Comparative Examples | Acid resistance ΔG value (–) | Alkali resistance ΔG value (–) |
| Example 129 | 9.2 | 8.3 |
| Example 130 | 8.6 | 7.5 |
| Example 131 | 8.0 | 7.0 |
| Example 132 | 9.6 | 8.7 |
| Example 133 | 8.7 | 8.1 |
| Example 134 | 8.3 | 7.3 |
| Example 135 | 5.4 | 5.0 |
| Example 136 | 8.7 | 8.2 |
| Comparative Example 83 | 15.6 | 15.0 |
| COmparative Example 84 | 12.9 | 12.4 |
| Comparative Example 85 | 15.1 | 14.6 |
| Comparative Example 86 | 13.5 | 13.9 |
| Comparative Example 87 | 14.9 | 14.4 |

| | Properties of coating film | |
|---|---|---|
| Examples and Comparative Examples | Heat resistance temperature (° C.) | Transparency (linear absorption) ($\mu m^{-1}$) |
| Example 129 | 240 | 0.0319 |
| Example 130 | 259 | 0.0204 |
| Example 131 | 278 | 0.0280 |
| Example 132 | 243 | 0.0377 |
| Example 133 | 250 | 0.0282 |
| Example 134 | 271 | 0.0188 |
| Example 135 | 279 | 0.0216 |
| Example 136 | 244 | 0.0353 |
| Comparative Example 83 | 204 | 0.0893 |
| Comparative Example 84 | 240 | 0.1051 |
| Comparative Example 85 | 211 | 0.0849 |
| Comparative Example 86 | 214 | 0.0314 |
| Comparative Example 87 | 212 | 0.0833 |

TABLE 27

| Examples and Comparative Examples | Production of resin composition Kind of orange-based fine pigment | Properties of resin composition Dispersion condition (–) |
|---|---|---|
| Example 137 | Example 113 | 4 |
| Example 138 | Example 114 | 5 |
| Example 139 | Example 115 | 5 |
| Example 140 | Example 116 | 5 |
| Example 141 | Example 117 | 5 |
| Example 142 | Example 118 | 5 |
| Example 143 | Example 119 | 5 |
| Example 144 | Example 120 | 5 |
| Comparative Example 88 | Comparative Example 73 | 2 |
| Comparative Example 89 | Comparative Example 74 | 3 |

TABLE 27-continued

| Comparative Example 90 | Comparative Example 75 | 2 |
|---|---|---|
| Comparative Example 91 | Comparative Example 76 | 3 |
| Comparative Example 92 | Comparative Example 77 | 2 |

| | Properties of resin composition Hue | | | |
|---|---|---|---|---|
| Examples and Comparative Examples | L* value (–) | a* value (–) | b* value (–) | h value (°) |
| Example 137 | 35.8 | 49.5 | 38.7 | 38.0 |
| Example 138 | 36.1 | 48.9 | 37.5 | 37.5 |
| Example 139 | 36.6 | 49.6 | 35.0 | 35.2 |
| Example 140 | 33.8 | 50.6 | 36.8 | 36.0 |
| Example 141 | 36.9 | 49.9 | 39.2 | 38.2 |
| Example 142 | 44.0 | 40.7 | 43.8 | 47.1 |
| Example 143 | 40.5 | 49.1 | 40.3 | 39.4 |
| Example 144 | 32.9 | 51.6 | 32.2 | 32.0 |
| Comparative Example 88 | 36.9 | 46.5 | 41.6 | 41.8 |
| Comparative Example 89 | 29.9 | 51.5 | 24.6 | 25.5 |
| Comparative Example 90 | 36.1 | 47.9 | 41.0 | 40.6 |
| Comparative Example 91 | 47.2 | 32.6 | 52.6 | 58.2 |
| Comparative Example 92 | 36.5 | 48.0 | 40.2 | 39.9 |

| | Properties of resin composition | |
|---|---|---|
| Examples and Comparative Examples | Heat resistance temperature (° C.) | Transparency (linear absorption) ($\mu m^{-1}$) |
| Example 137 | 223 | 0.0318 |
| Example 138 | 231 | 0.0203 |
| Example 139 | 236 | 0.0284 |
| Example 140 | 228 | 0.0356 |
| Example 141 | 235 | 0.0273 |
| Example 142 | 237 | 0.0180 |
| Example 143 | 239 | 0.0212 |
| Example 144 | 225 | 0.0352 |
| Comparative Example 88 | 195 | 0.0889 |
| Comparative Example 89 | 201 | 0.1045 |
| Comparative Example 90 | 197 | 0.0842 |
| Comparative Example 91 | 199 | 0.0310 |
| Comparative Example 92 | 198 | 0.0828 |

What is claimed is:

1. Iron oxide hydroxide composite particles having an average particle diameter of 0.005 to 1.0 μm, comprising:
    iron oxide hydroxide particles as core particles, a coating formed on surface of said iron oxide hydroxide particles, comprising at least one organosilicon compound selected from the group consisting of:
        (1) organosilane compounds obtainable from alkoxysilane compounds, and
        (2) polysiloxanes or modified polysiloxanes, and
    an organic pigment coat formed on said coating layer comprising said organosilicon compound, in an amount of from 1 to 30 parts by weight based on 100 parts by weight of said iron oxide hydroxide particles.

2. Iron oxide hydroxide composite particles according to claim 1, wherein said iron oxide hydroxide particles are particles having a coat which is formed on at least a part of the surface of said iron oxide hydroxide particles and which comprises at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the iron oxide hydroxide particles coated.

3. Iron oxide hydroxide composite particles according to claim 1, wherein said modified polysiloxanes are compounds selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

4. Iron oxide hydroxide composite particles according to claim 1, wherein said alkoxysilane compound is represented by the general formula (I):

(I)

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

5. Iron oxide hydroxide composite particles according to claim 4, wherein said alkoxysilane compound is methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane or decyltrimethoxysilane.

6. Iron oxide hydroxide composite particles according to claim 1, wherein said polysiloxanes are represented by the general formula (II):

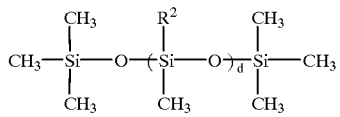
(II)

wherein $R^2$ is H— or $CH_3$—, and d is an integer of 15 to 450.

7. Iron oxide hydroxide composite particles according to claim 6, wherein said polysiloxanes are compounds having methyl hydrogen siloxane units.

8. Iron oxide hydroxide composite particles according to claim 3, wherein said polysiloxanes modified with at least one compound selected from the group consisting of polyethers, polyesters and epoxy compounds are represented by the general formula (III), (IV) or (V):

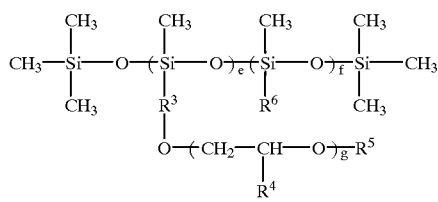
(III)

wherein $R^3$ is —$(-CH_2-)_h$—; $R^4$ is —$(-CH_2-)_i$—$CH_3$; $R^5$ is —OH, —COOH, —CH=$CH_2$, —$C(CH_3)$=$CH_2$ or —$(-CH_2-)_j$—$CH_3$; $R^6$ is —$(-CH_2-)_k$—$CH_3$; g and h are an integer of 1 to 15; i, j and k are an integer of 0 to 15; e is an integer of 1 to 50; and f is an integer of 1 to 300;

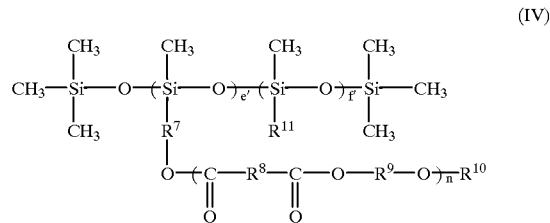
(IV)

wherein $R^7$, $R^8$ and $R^9$ are —$(-CH_2-)_q$— and may be the same or different; $R^{10}$ is —OH, —COOH, —CH=$CH_2$, —$C(CH_3)$=$CH_2$ or —$(-CH_2-)_r$—$CH_3$; $R^{11}$ is —$(-CH_2-)_s$—$CH_3$; n and q are an integer of 1 to 15; r and s are an integer of 0 to 15; e' is an integer of 1 to 50; and f' is an integer of 1 to 300; or

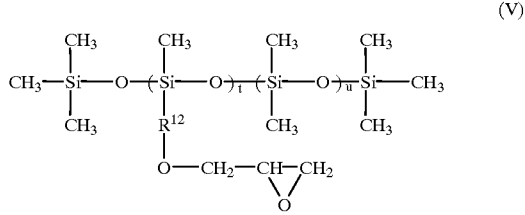
(V)

wherein $R^{12}$ is —$(-CH_2-)_v$—; v is an integer of 1 to 15; t is an integer of 1 to 50; and u is an integer of 1 to 300.

9. Iron oxide hydroxide composite particles according to claim 3, wherein said polysiloxanes whose molecular terminal is modified with at least one group selected from the group consisting of carboxylic acid groups, alcohol groups and a hydroxyl group are represented by the general formula (VI):

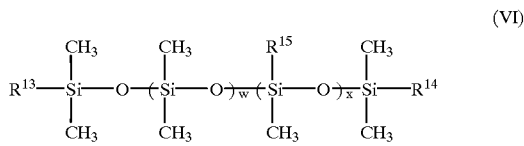
(VI)

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —$(-CH_2-)_y$—; y is an integer of 1 to 15; w is an integer of 1 to 200; and x is an integer of 0 to 100.

10. Iron oxide hydroxide composite particles according to claim 1, wherein the amount of said coating organosilicon compounds is 0.02 to 5.0% by weight, calculated as Si, based on the total weight of the organosilicon compounds and said iron oxide hydroxide particles.

11. Iron oxide hydroxide composite particles according to claim 1, wherein said organic pigment is organic blue-based pigment or organic red-based pigment.

12. Iron oxide hydroxide composite particles according to claim 1, wherein said iron oxide hydroxide composite particles have an aspect ratio (average major axis diameter/average minor axis diameter) of 2.0:1 to 20.0:1.

13. Iron oxide hydroxide composite particles according to claim 1, wherein said iron oxide hydroxide composite particles have a BET specific surface area value of 6 to 300 $m^2/g$.

14. Iron oxide hydroxide composite particles according to claim 1, wherein said iron oxide hydroxide composite particles have a geometrical standard deviation of major axis diameter of 1.01 to 2.0.

15. Iron oxide hydroxide composite particles according to claim 1, which have an average particle diameter of from 0.005 to less than 0.1 μm, comprise:
   iron oxide hydroxide particles as core particles,
   a coating formed on surface of said iron oxide hydroxide particles, comprising at least one organosilicon compound selected from the group consisting of:
      (1) organosilane compounds obtainable from alkoxysilane compounds, and
      (2) polysiloxanes or modified polysiloxanes, and
   an organic blue-based pigment coat formed on said coating layer comprising said organosilicon compound, in an amount of from 5 to 30 parts by weight based on 100 parts by weight of said iron oxide hydroxide particles.

16. Iron oxide hydroxide composite particles according to claim 15, wherein said iron oxide hydroxide particles are particles having a coat which is formed on at least a part of the surface of said iron oxide hydroxide particles and which comprises at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the iron oxide hydroxide particles coated.

17. Iron oxide hydroxide composite particles according to claim 15, wherein said organic blue-based pigment is a phthalocyanine-based pigment and an alkali blue pigment.

18. Iron oxide hydroxide composite particles according to claim 1, which have an average particle diameter of from 0.005 to less than 0.1 μm, comprise:
   iron oxide hydroxide particles as core particles,
   a coating formed on surface of said iron oxide hydroxide particles, comprising at least one organosilicon compound selected from the group consisting of:
      (1) organosilane compounds obtainable from alkoxysilane compounds, and
      (2) polysiloxanes or modified polysiloxanes, and
   an organic red-based pigment coat formed on said coating layer comprising said organosilicon compound, in an amount of from 1 to 30 parts by weight based on 100 parts by weight of said iron oxide hydroxide particles.

19. Iron oxide hydroxide composite particles according to claim 18, wherein said iron oxide hydroxide particles are particles having a coat which is formed on at least a part of the surface of said iron oxide hydroxide particles and which comprises at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the iron oxide hydroxide particles coated.

20. Iron oxide hydroxide composite particles according to claim 18, wherein said organic red-based pigment is quinacridone-based pigment, azo-based pigment, condensed azo-based pigment and perylene-based pigment.

21. Iron oxide hydroxide composite particles according to claim 1, which have an average particle diameter of from 0.1 to 1.0 μm, comprises:
   iron oxide hydroxide particles as core particles,
   a coating formed on surface of said iron oxide hydroxide particles, comprising at least one organosilicon compound selected from the group consisting of:
      (1) organosilane compounds obtainable from alkoxysilane compounds, and
      (2) polysiloxanes or modified polysiloxanes, and
   an organic blue-based pigment coat formed on said coating layer comprising said organosilicon compound, in an amount of from 5 to 30 parts by weight based on 100 parts by weight of said iron oxide hydroxide particles.

22. Iron oxide hydroxide composite particles according to claim 21, wherein said iron oxide hydroxide particles are particles having a coat which is formed on at least a part of the surface of said iron oxide hydroxide particles and which comprises at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the iron oxide hydroxide particles coated.

23. Iron oxide hydroxide composite particles according to claim 21, wherein organic blue-based pigment is a phthalocyanine-based pigment and an alkali blue pigment.

24. Iron oxide hydroxide composite particles according to claim 1, which have an average particle diameter of from 0.1 to 1.0 μm, and comprise:
   iron oxide hydroxide particles as core particles,
   a coating formed on surface of said iron oxide hydroxide particles, comprising at least one organosilicon compound selected from the group consisting of:
      (1) organosilane compounds obtainable from alkoxysilane compounds, and
      (2) polysiloxanes or modified polysiloxanes, and
   an organic red-based pigment coat formed on said coating layer comprising said organosilicon compound, in an amount of from 1 to 30 parts by weight based on 100 parts by weight of said iron oxide hydroxide particles.

25. Iron oxide hydroxide composite particles according to claim 24, wherein said iron oxide hydroxide particles are particles having a coat which is formed on at least a part of the surface of said iron oxide hydroxide particles and which comprises at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the iron oxide hydroxide particles coated.

26. Iron oxide hydroxide composite particles according to claim 24, wherein said organic red-based pigment is quinacridone-based pigment, azo-based pigment, condensed azo-based pigment and perylene-based pigment.

27. A pigment comprising the iron oxide hydroxide composite particles as defined in claim 1.

28. A green-based pigment comprising the iron oxide hydroxide composite particles as defined in claim 15 or 21.

29. A orange-based pigment comprising the iron oxide hydroxide composite particles as defined in claim 18 or 24.

30. A paint comprising:
   said pigment defined in claim 27; and
   a paint base material.

31. A paint according to claim 30, wherein the amount of said pigment is 0.5 to 100 parts by weight based on 100 parts by weight of said paint base material.

32. A rubber or resin composition comprising:
   said pigment defined in claim 27; and
   a base material for rubber or resin composition.

33. A rubber or resin composition according to claim 32, wherein the amount of said pigment is 0.01 to 200 parts by weight based on 100 parts by weight of said base material for rubber or resin composition.

34. A process for producing said iron oxide hydroxide composite particles defined in claim 1, which process comprises:
   mixing as core particles iron oxide hydroxide particles having an average particle diameter of 0.005 to 1.0 μm together with at least one compound selected from the group consisting of:

(1) alkoxysilane compounds, and
(2) polysiloxanes or modified polysiloxanes, by using an apparatus capable of applying a shear force to the core particles, thereby coating the surface of said iron oxide hydroxide particle with the said compounds;

mixing the obtained iron oxide hydroxide particles coated with the said compounds and an organic pigment in an amount of 1 to 30 parts by weight based on 100 parts by weight of the core particles by using an apparatus capable of applying a shear force to the core particles, thereby forming an organic pigment coat on the surface of a coating layer comprising the organosilicon compounds.

35. A process for producing black iron oxide hydroxide composite particles according to claim 34, wherein said iron oxide hydroxide particles as core particles are coated with at least one compound selected from the group consisting of hydroxides of aluminum, oxides of aluminum, hydroxides of silicon and oxides of silicon.

* * * * *